Feb. 21, 1967   WEI MING SHIH   3,305,840
HIGH SPEED PRINT SYNCHRONIZER
Filed July 10, 1963   19 Sheets-Sheet 13

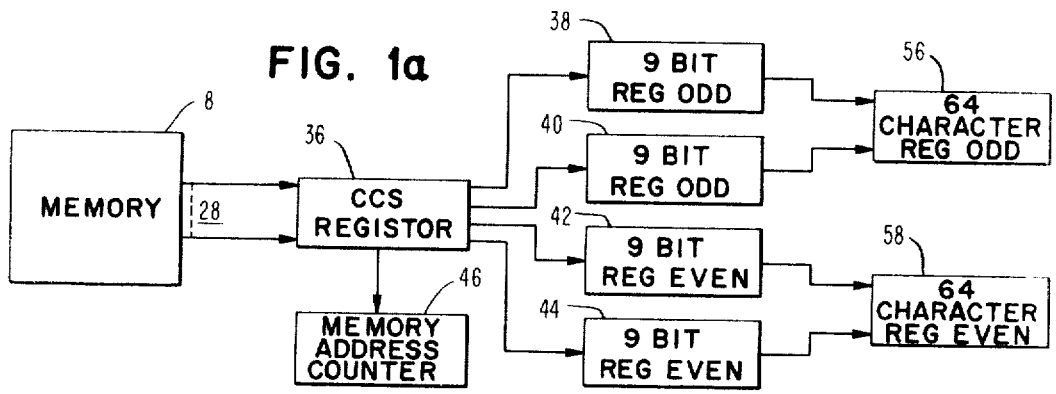
FIG. 1a
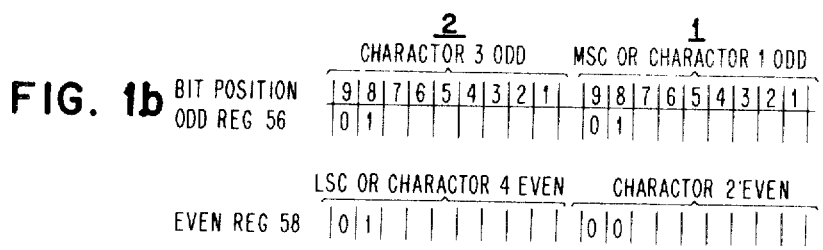
FIG. 1b
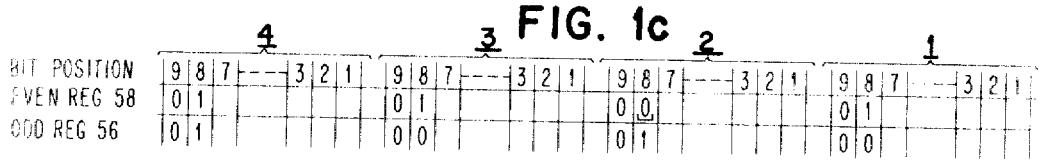
FIG. 1c
INSTRUCTION FOR PRINTING & PAPER ADVANCE
FIG. 3
| FUNCTION | LINES OF VERTICAL SPACING | FUNCTION CODE | I | L-ADDRESS |
|---|---|---|---|---|
| BITS | 28　　　25 | 24　　　　　19 | 18　　　17 | 16　15　　　　　1 |
1 - PRINT AND PAPER ADVANCE
0 - ADVANCE PAPER ONLY
FIG. 4
STATURE COUNT
| STATURE | FF1 | FF2 | FF3 |
|---|---|---|---|
| 0 | 0 | 0 | 0 |
| 1 | 1 | 0 | 0 |
| 2 | 1 | 1 | 0 |
| 3 | 0 | 1 | 0 |
| 4 | 0 | 1 | 1 |
| 5 | 1 | 1 | 1 |
| 6 | 1 | 0 | 1 |
| 7 | 0 | 0 | 1 |
INVENTOR
WEI MING SHIH, DECEASED
BY PHOEBE H.Y. SHIH, EXECUTRIX
ROBERT L. BAST, EXECUTOR
BY *David Teseng*
*Sheldon Kugeler*
ATTORNEYS Feb. 21, 1967   WEI MING SHIH   3,305,840
HIGH SPEED PRINT SYNCHRONIZER
Filed July 10, 1963   19 Sheets-Sheet 11

FIG. 14
"70" INSTRUCTION

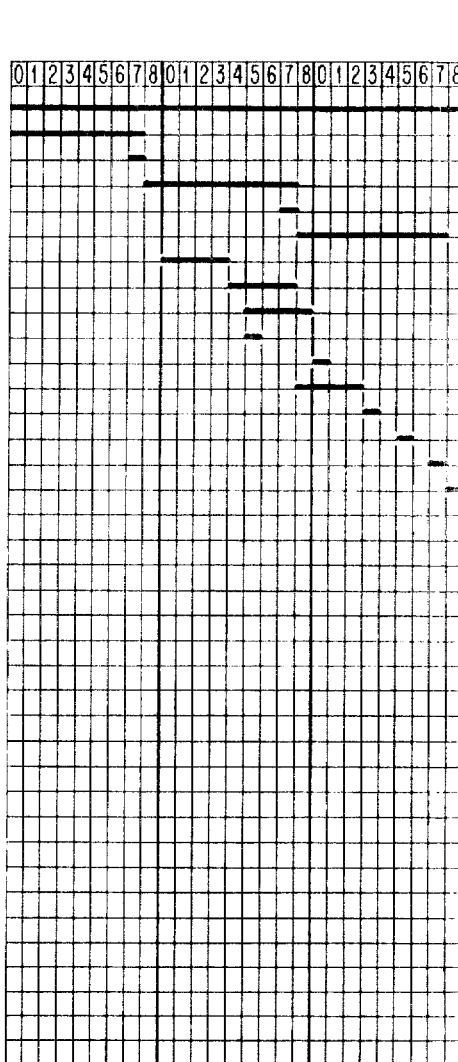

t INCREASING
1) PROG CTR PC0
2) ENDING SIG
3) REQUEST MEM FOR INST RM7
4) PR7
5) RESET PR7 FF1116
6) GR7 FF1124
7) RD CTRL CTR CONTENTS OUT (4 BIT PAR)
8) OUTPUT OF DEL 1314 (4 BIT PAR)
9) OUTPUT OF PF 1316 1 BIT DEL (4 BIT PAR)
10) ADD 1 IN ADDER 1306 (LSD)
11) ADD SHIFT REG TO MEM (15 BIT PAR)
12) ADD SHIFT REG TO CTRL CTR (4 BIT PAR)
13) CCR REG FR MEM (27 BIT PAR)
14) CCR REG TO INST DECODER (27 BIT PAR)
15) RESET GR7 FF1124
16) M ADDRESS TO OPERAND ADDRESS REG
17) REQUEST MEM OPERAND (RMG)
18) PR 6
19) RD OUT OPERAND ADDRESS REG (4 BIT PAR)
20) RD OUT DEL 1314 (4 BIT PAR)
21) OUTPUT OF PF 1316 1 BIT DEL (4 BIT PAR)
22) RESET PR6 FF1126
23) GR6
24) RESET GR6 FF1132
25) ADDRESS SHIFT REG TO MEM (15 BIT PAR)
26) CCR REG FR MEM (27 BIT PAR)
27) STEP PROG CTR AND GEN PC1
28) ALERT STANDBY LOCATION FIXED ADDRESS GEN GATE
29) APPLY 70' INST OPER FUNCTION CODE TO GEN GATE
30) RD FIXED ADDRESS OF STANDBY 5 OUT (4 BIT PAR)
31) SET STANDBY 5 FF24 (4 BIT PAR)
32) OUTPUT OF DEL 1314 (4 BIT PAR)
33) OUTPUT OF PF 1316 1 BIT DEL (4 BIT PAR)
34) ADDRESS SHIFT REG TO MEM (15 BIT PAR)
35) MEM ADDRESS SEL COMP (15 BIT PAR)
36) CCR REG TO MEM WR (4 BIT PAR)
37) RESET PROG CTR TO PC0
38) RD FR MEM WR CIRCUITS (27 BIT PAR)

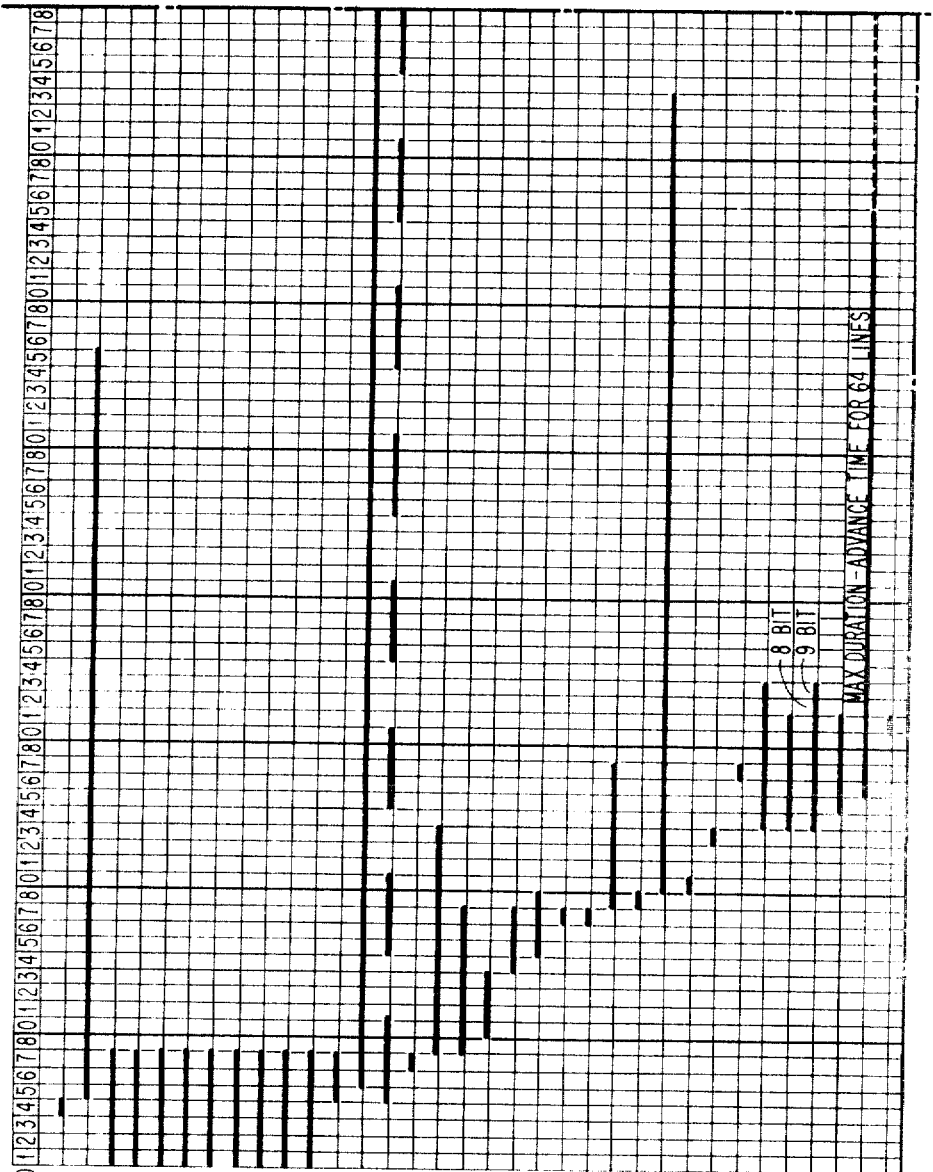

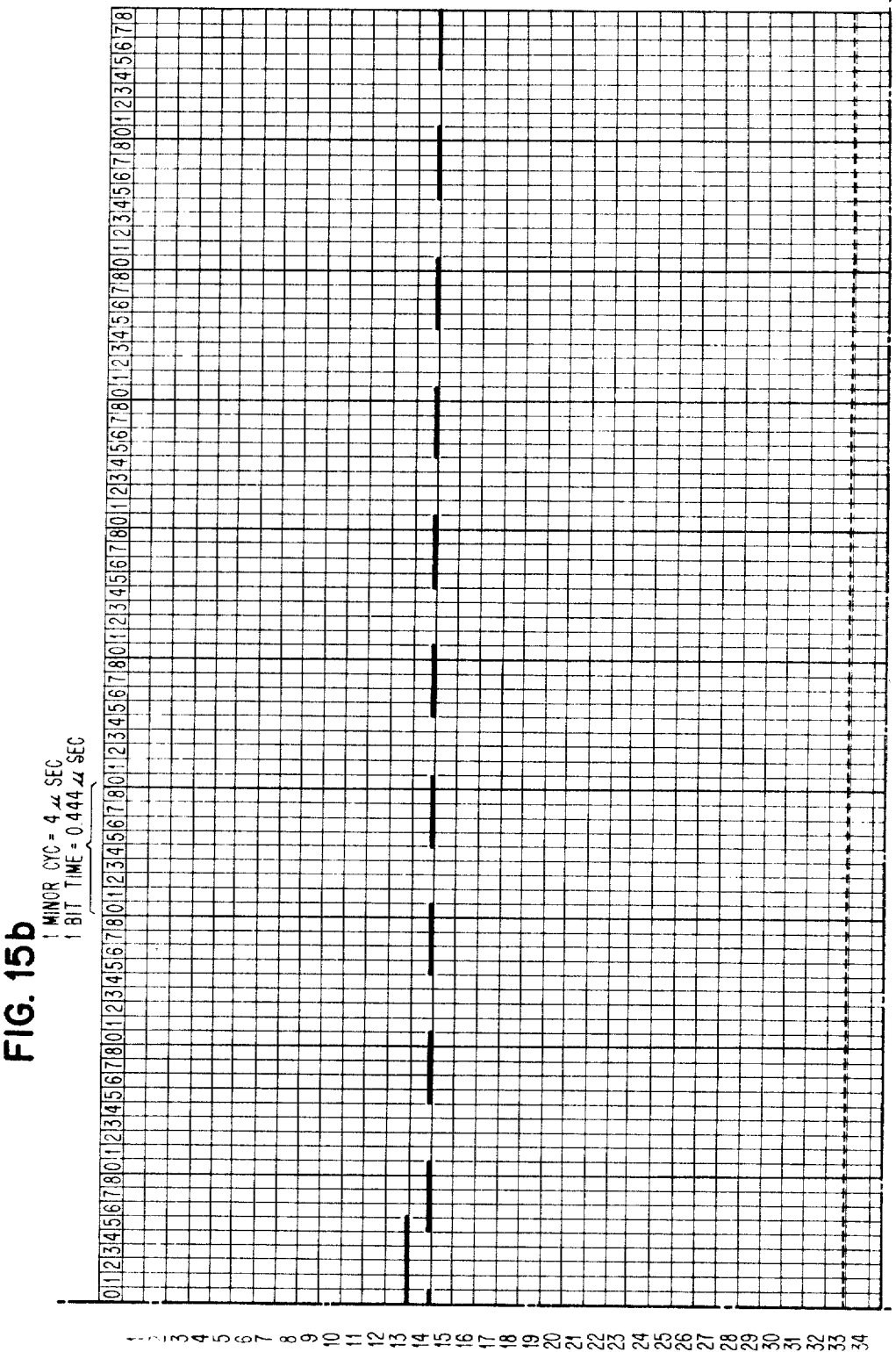

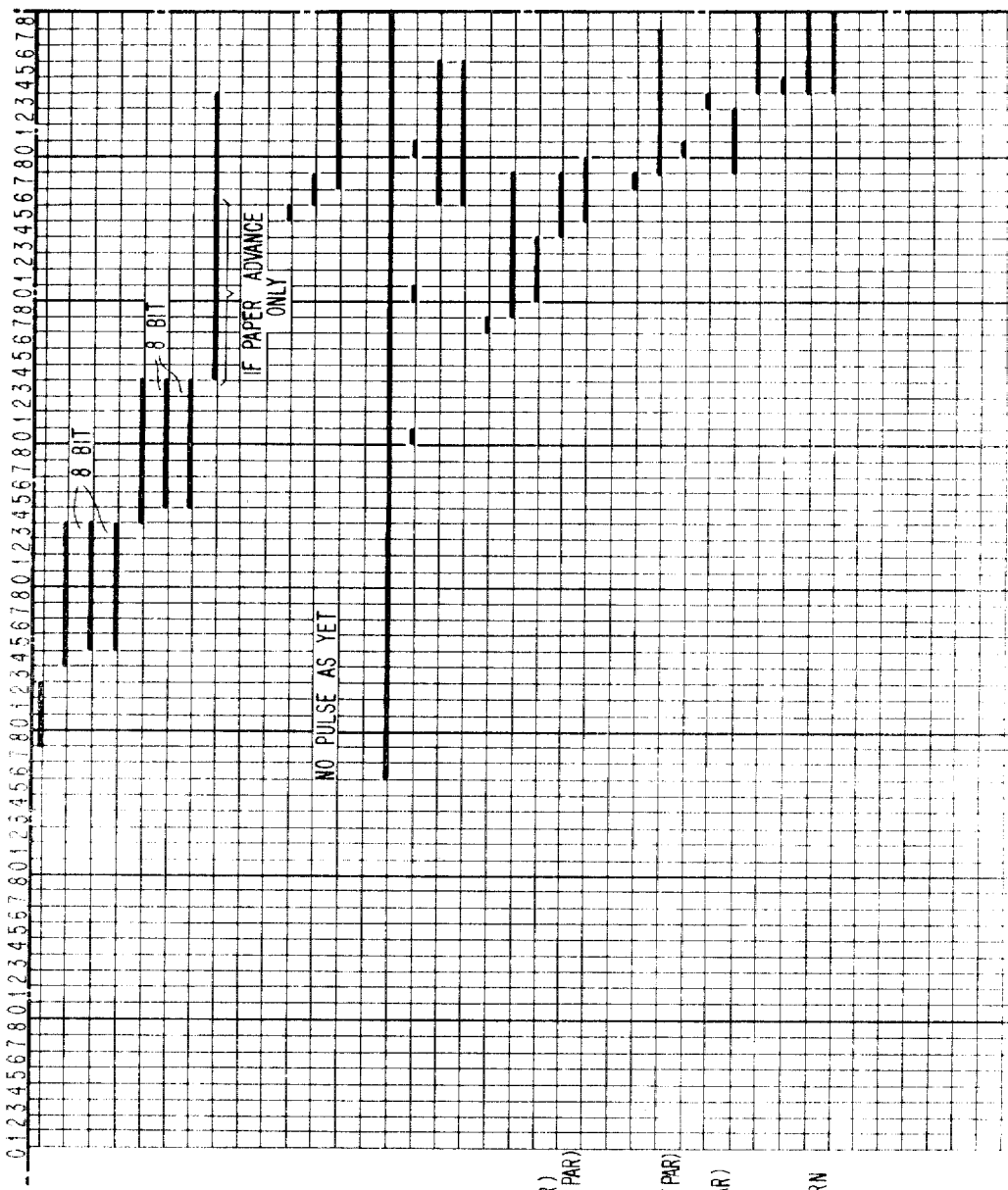

Feb. 21, 1967

WEI MING SHIH 3,305,840

HIGH SPEED PRINT SYNCHRONIZER

Filed July 10, 1963

| FIG. 16a | FIG. 16b |

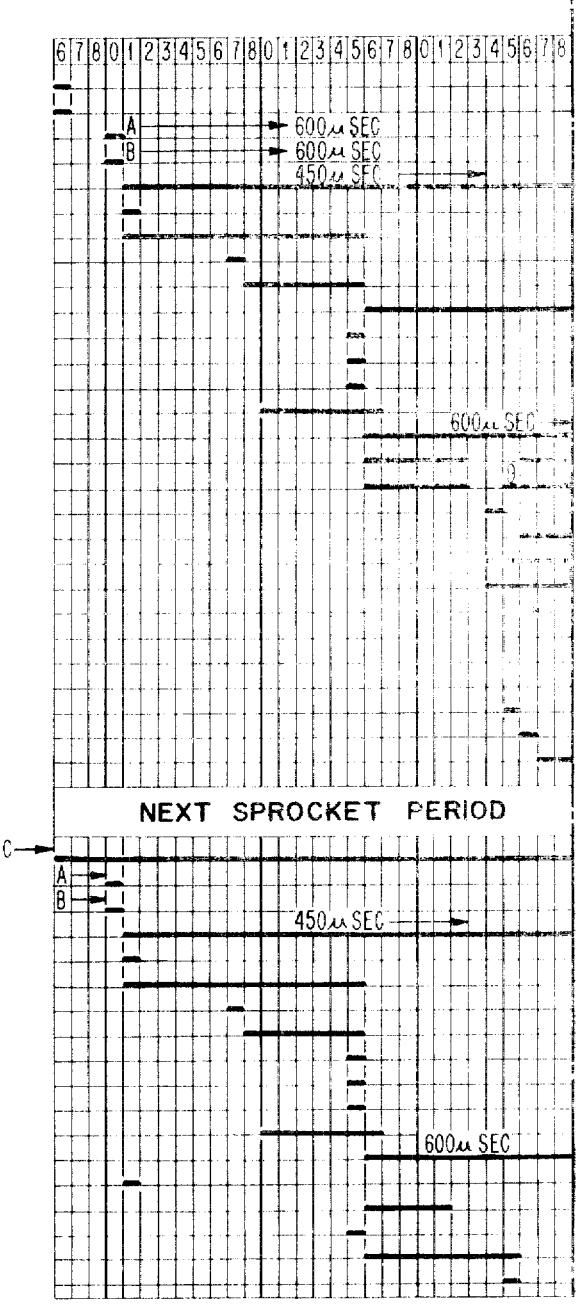

t INCREASING
1) RESET CODE WHEEL CTR
2) RESET BINARY CTR 218
3) SPCH 8
4) SPKT
5) SPKTD
6) SET SYNC FF1
7) SPKTF
8) SET SYNC FF2
9) SPST1
10) SPST2
11) RESET SYNC FF1
12) SPSTR RESET SYNC FF2
13) SET BINARY CTR ODD
14) SPSTID
15) BINARY CTR ODD SPKT OUTPUT
16) CORE WHEEL OUTPUTS
17) OD CHA — BIT
18) SPOR (9 BIT)
19) OPID (9 BIT)
20) X CTR
21) Y CTR
22) SET CORE X1 Y1
23) SET CORE X2 Y1
24) SET CORE X4 Y1
25) SET CORE X1 Y2
26) INSERT 9 BIT IN 64 CHAR REG ODD
27) SET READY FF
28) READY

29) READY
30) SPCH8
31) SPKT
32) SPKTD
33) SET SYNC FF1
34) SPKTF
35) SET SYNC FF2
36) SPST 1
37) RESET SYNC FF1
38) SPSTR-RESET SYNC FF2
39) SET BINARY CTR EVEN
40) SPSTID
41) BINARY CTR EV SPKT OUTPUT
42) SPRT
43) PRT
44) SPRTOE
45) PRTODA
46) RPRTOE

United States Patent Office 3,305,840
Patented Feb. 21, 1967

3,305,840
HIGH SPEED PRINT SYNCHRONIZER
Wei Ming Shih, deceased, late of Flourtown, Pa., by Phoebe H. Y. Shih, executrix, Flourtown, Pa., and Robert L. Bast, executor, Ambler, Pa., assignors to Sperry Rand Corporation, New York, N.Y., a corporation of Delaware
Filed July 10, 1963, Ser. No. 294,206
30 Claims. (Cl. 340—172.5)

This invention relates to a high speed print synchronizer and more particularly to a device which is capable of accepting information at a random time sequence, print infomation as it is available and keep track of information which has been received as well as that which has been printed out.

Data processing systems which are currently in use, consist mainly of a central processing unit and a plurality of devices known as peripheral equipment. Peripheral equipment may consist, for example, of typewriter or keyboard-type units, high and low speed tape units, punch card reader and sensing devices, card punching devices, printing devices and cathode ray displays. These peripheral units may be connected to supply information to the central processor or receive information therefrom.

In order to prevent the peripheral device from attempting to feed or receive information from the central processor at the same time, a system known as priority is established. A priority number is assigned to each type of equipment and to individual pieces of equipment within the type. Thus, a particular tape unit will have a priority assigned to it which reflects the priority of the tape units with regard to the other peripheral equipment and of the particular tape unit with regard to the other tape units. Priority assignments may be made on the basis of relative speed of operation of the peripheral unit with respect to the central processor, that is rate of transfer of data.

The priority assignments are used in conjunction with circuitry to control the transfer of information between the peripheral equipment and the memory of the central processor. Thus, for example when the memory is available to accept information a check will be made of all peripheral equipment desiring access to the memory and the request of the equipment with the highest priority will be granted. If during such a memory access, a unit of higher priority requests access to the memory, then the access of the first equipment will be interrupted at some convenient termination point. Then the unit of higher priority will take over until it has completed its use of the memory. At this time, the first unit may again obtain the use of the memory providing another unit of higher priority has not made a memory request.

In the usual form of computer system, information is transferred from the memory to peripheral equipment, such as the printer, in a block. The block is generally a set number of computer words which are equivalent to the number of words required to make up a single line of print. Once priority has been granted to the printer, the block of computer words is transferred to the printer without interruption. Thus, if during this, transfer equipment of higher priority requests memory access the granting of such access is delayed until the transfer of the printer is completed.

In an effort to make the transfer device more flexible, additional circuitry may be added to permit interruption during the transfer of a block of information from the memory to a particular peripheral unit. This circuitry may be quite complex in order to meet the needs of the peripheral equipment affected. Thus, in the printer device discussed above, means would have to be provided to keep track of the actual number of computer words transferred to the buffers of the printer, and those which remain to be transferred. Further, means would have to be provided to account for locations in a buffer register into which information has been placed and those which remain empty. Means would also have to be provided to prevent any printing of the data received until full line was assembled.

The present invention provides a high speed printing synchronizer which is able to overcome the difficulties and problems found in the prior art devices. It permits accounting for information as it is transferred to the high speed print buffers of a print synchronizer as well as the detection of those conditions under which all information has been printed from the buffers to the paper, with the addition of only a small amount of equipment not normally found in high speed computer and data processing systems. The present invention obviates the necessity for large numbers of complex counters with their attendant circuitry which would be required by conventional approaches to the problems involved. The device of the present invention is able to determine how much information is stored within its print buffers; to determine whether additional requests for the transfer of information from the memory to the print buffers are required to fill them; to determine which characters stored within the print buffers have been printed out and to determine when all the characters which compose a particular line have been printed out so as to permit the printer to execute further print instructions.

It is, therefore, an object of this invention to provide a high speed print synchronizer capable of receiving information in a random fashion while accounting for all information received.

It is a further object of this invention to provide a high speed print synchronizer which employs a unique coding arrangement to permit the continual interrogation of the buffers contained within such high speed print synchronizer to determine the location of the last information entered within such buffers and further, to determine when these buffers have been completely filled.

It is a further object of this invention to provide a high speed print synchronizer capable of reading information from its internal buffers and printing out such information as the print characters are available, while keeping track of all information which has been so printed out.

It is a further object of this invention to provide a unique high speed printing synchronizer which employs a coding scheme to determine when information contained within the buffers of the high speed print synchronizer have been printed out in order to prevent further attempts to print out information already printed and detect when all information contained within such buffers have been printed out.

It is a further object of this invention to provide a high speed print synchronizer which by unique coding arrangement is able to determine (1) by the use of first coded bits placed in the characters of a word the location of the last word of information entered into the buffers of said print synchronizer, and from the same bits, to determine when said buffers register are completely full, and (2) to determine from a second coded bits placed in the characters of a word when information contained within the buffers have been printed out so as to provide that the same information will not be printed out a second time, and further employing said second coded bits to determine when all of the information contained within the buffers have been printed out.

It is yet anothesr object of this invention to provide a high speed print synchronizer capable of receiving information in its buffers in a random fashion, printing out such information as the print characters are available, capable of continuously monitoring the contents of its buffers to termine the last bit of information entered within such
ffers and when the buffers have been filled and further
determine what information has been printed out from
ch buffers and also when all information contained
thin such buffers have been printed out without the requirement of additional circuitry.

It is yet another object of this invention to provide a gh speed print synchronizer capable of operating in a iority system with a central processor and other peripheral devices of varying priority which can accept information in a random fashion according to the time at which it able to control the central processor and which can be terrupted at any time during the transfer of information om said central processor to said print device while taining an indication of the location of the last bit of formation received by said buffers and further when id buffers are completely filled, employing a given bit the incoming word and requiring a small amount of lditional equipment.

It is still another object of this invention to provide a high speed printing synchronizer capable of transferring formation from the buffers of said print synchronizer a printing device when there is a correspondence between the information stored within the buffers and the formation available at the time for printing.

Other objects and features of the invention will be inted out in the following description and claims, and ustrated in the accompanying drawings, which disclose way of example, the principle of the invention, and e best mode which has been contemplated for carrying out.

In the drawings:

FIGURE 1a illustrates in simplified manner the interconnection of the memory and storage registers of the nchronizer.

FIGURES 1b and 1c illustrate the 8-bit notation emloyed for computer words stored within the high speed pe synchronizer.

Figures 2, 2A:
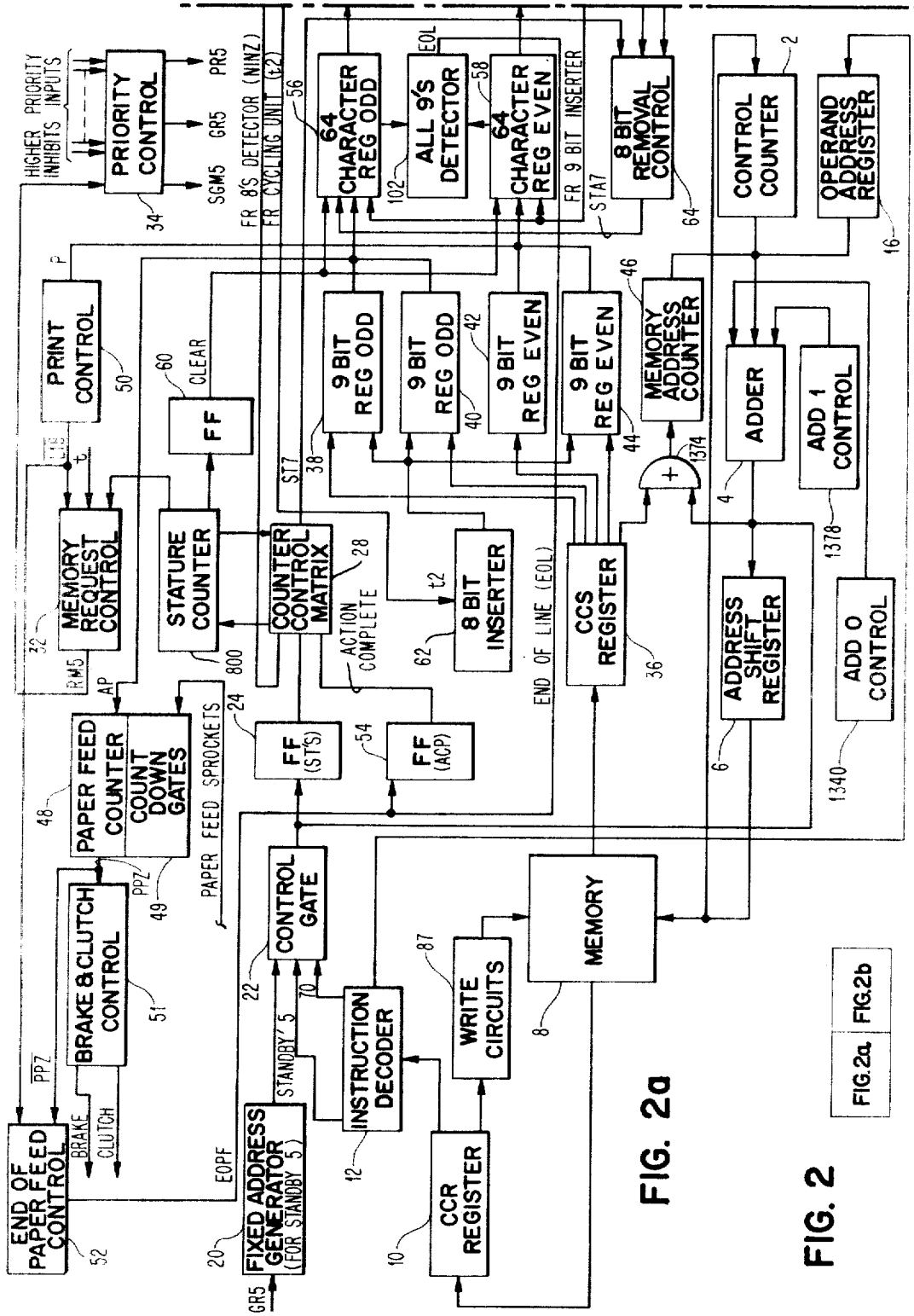
Figure 2B:
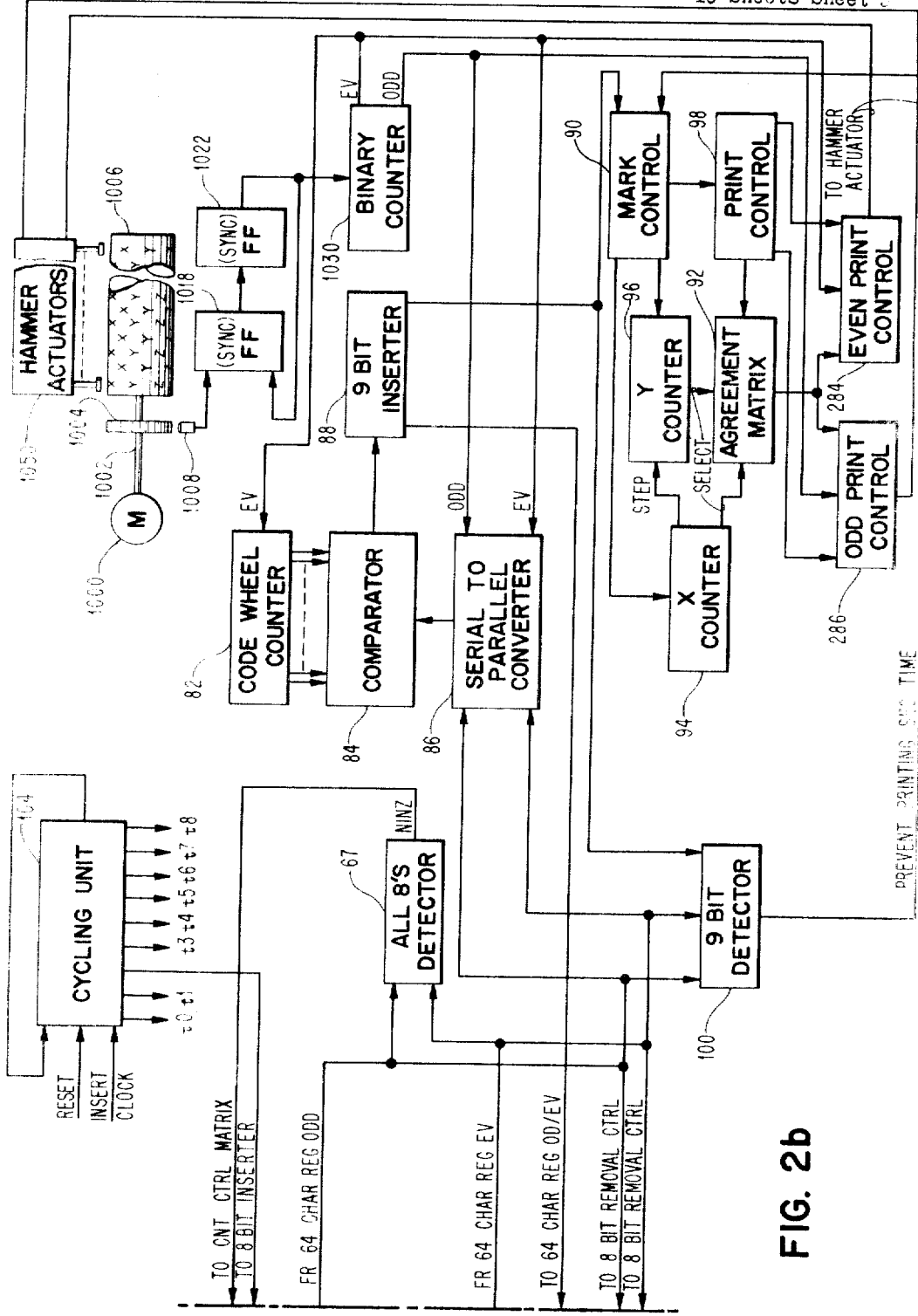

FIGURE 2 composed of FIGURES 2a and 2b is an verall block diagram of the high speed tape synchronizer ith related equipment.

FIGURE 3 illustrates the format of a print instruction.

FIGURE 4 illustrates the counting sequence of the ature counter of the synchronizer.

Figure 5:
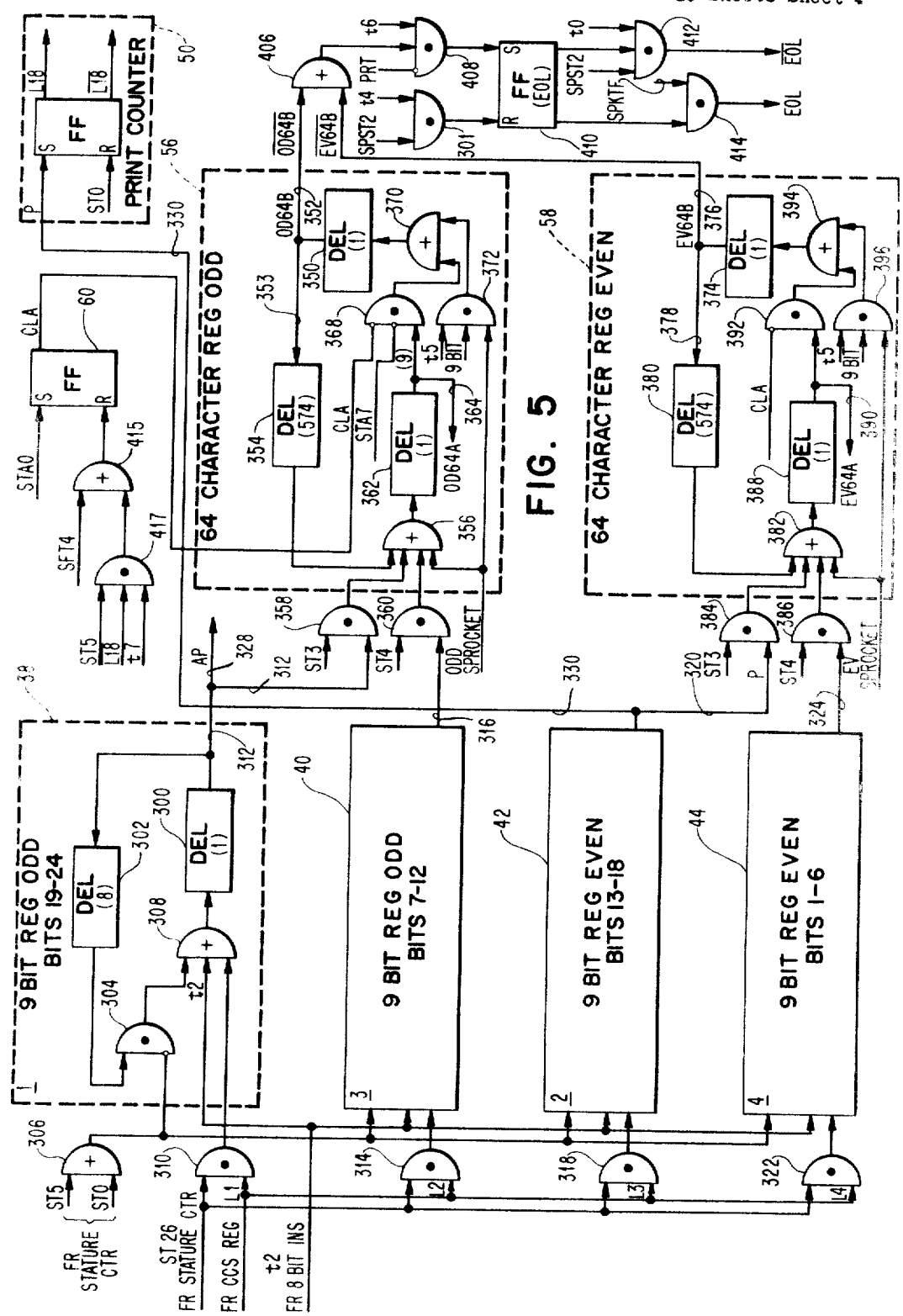

FIGURE 5 illustrates in more detail the buffer and ain store registers of FIGURE 2.

Figure 6:
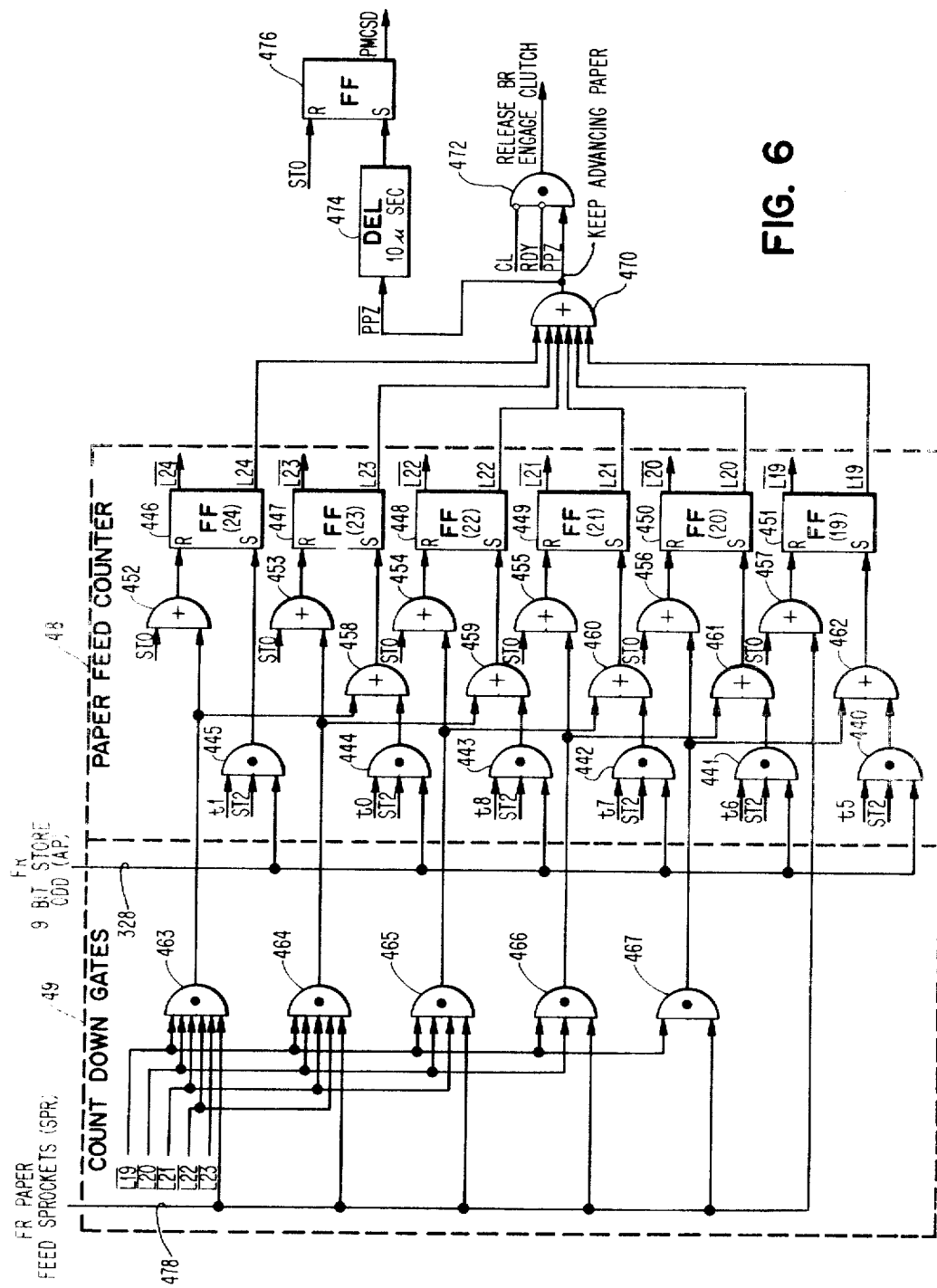

FIGURE 6 illustrates in more detail the paper feed ounter and the associated count down gates of FIGURE 2.

Figure 7:
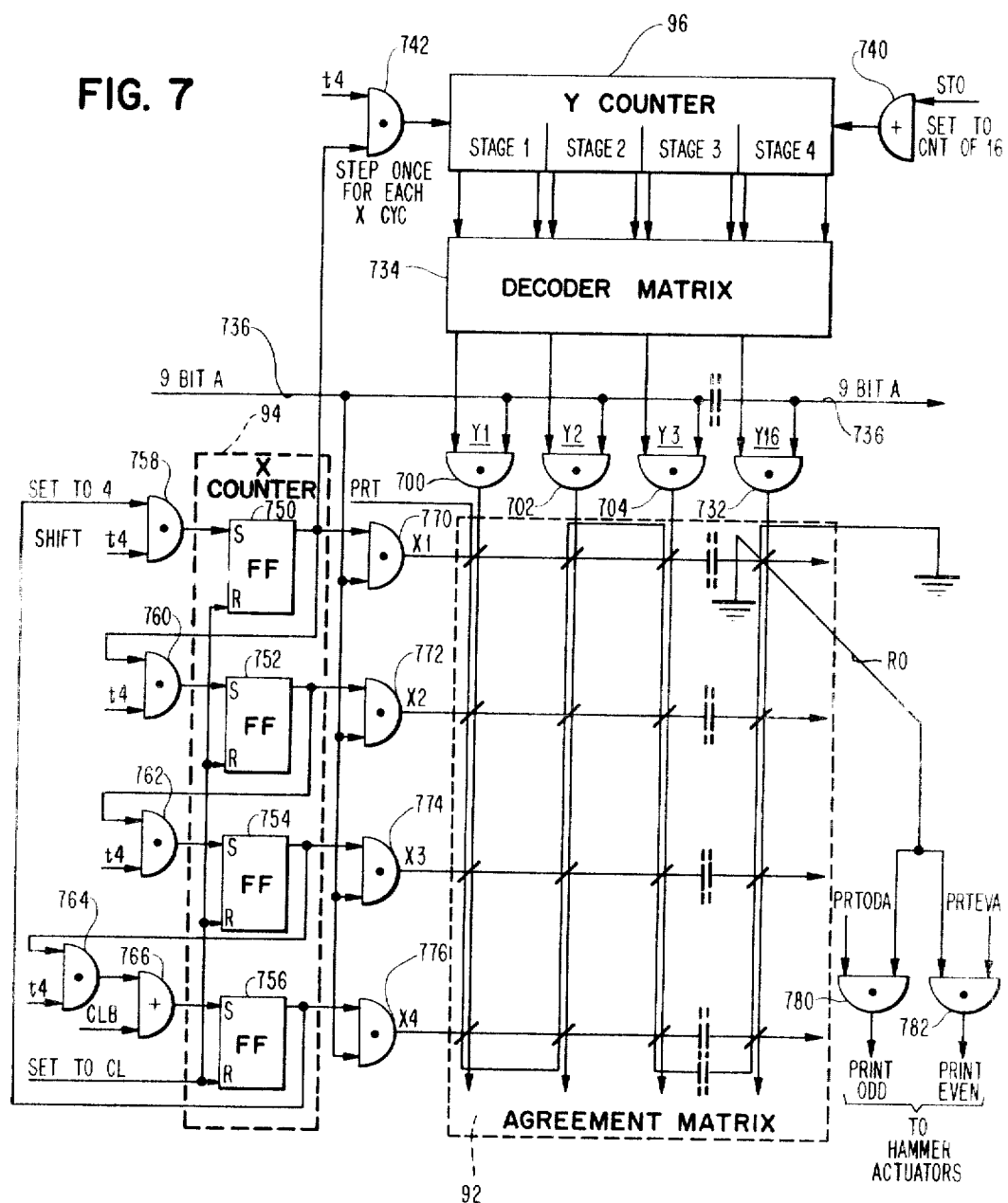

FIGURE 7 illustrates in more detail the agreement atrix, and the X and Y counters of FIGURE 2.

Figure 8:
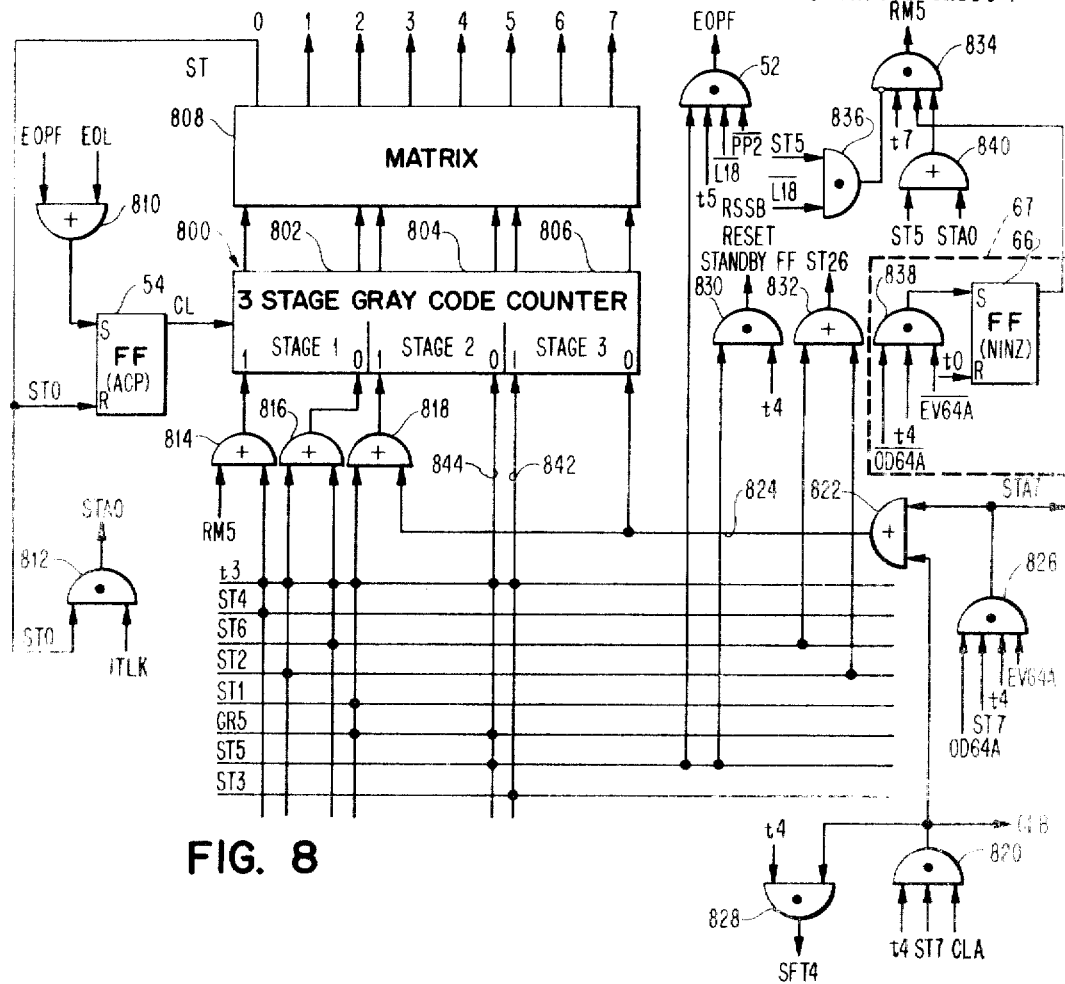

FIGURE 8 illustrates in more detail the stature counter nd request memory circuits of FIGURE 2.

Figure 9:
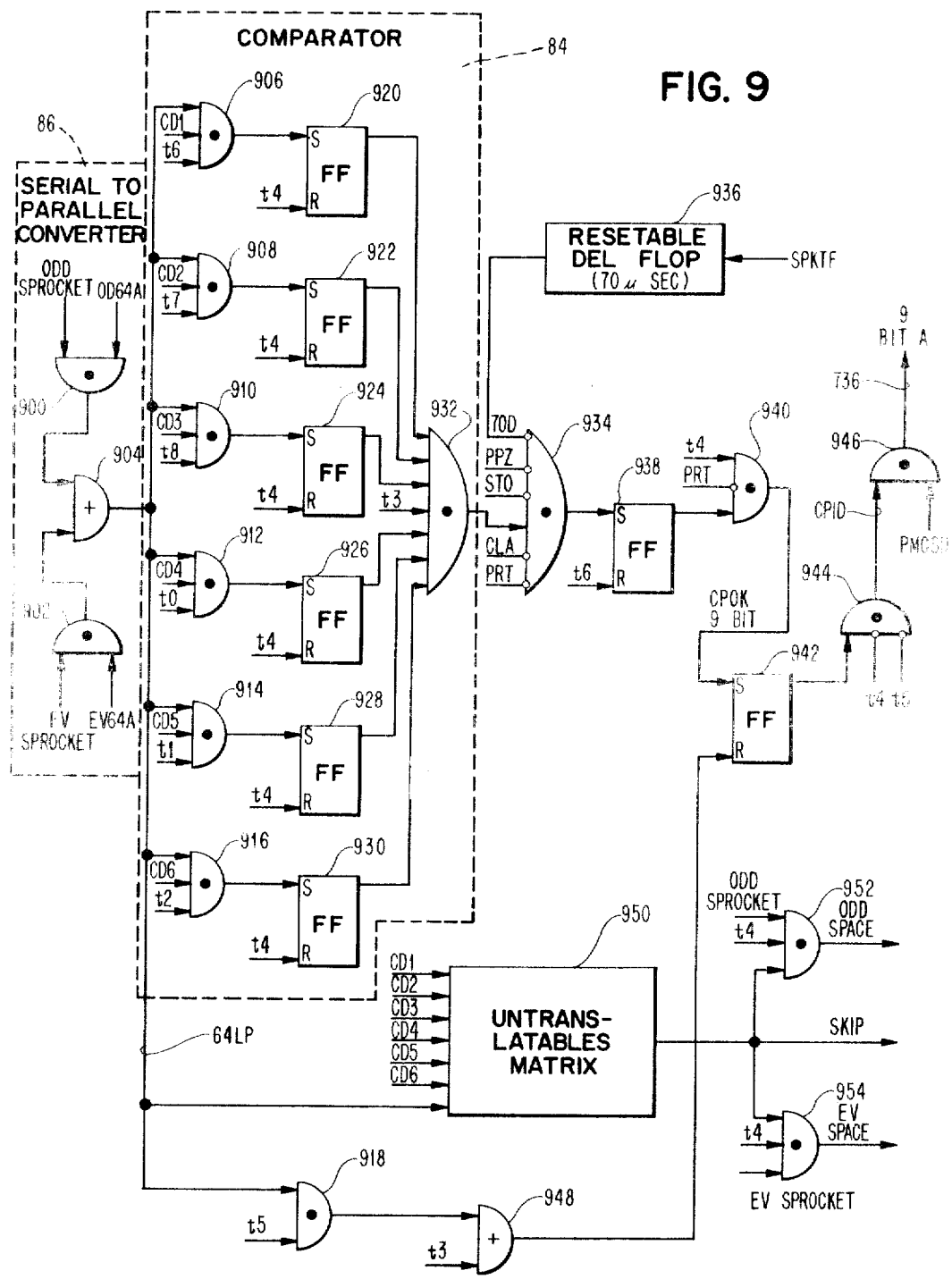

FIGURE 9 illustrates in more detail the comparator nd 9 bit insertion circuit of FIGURE 2.

Figure 10:
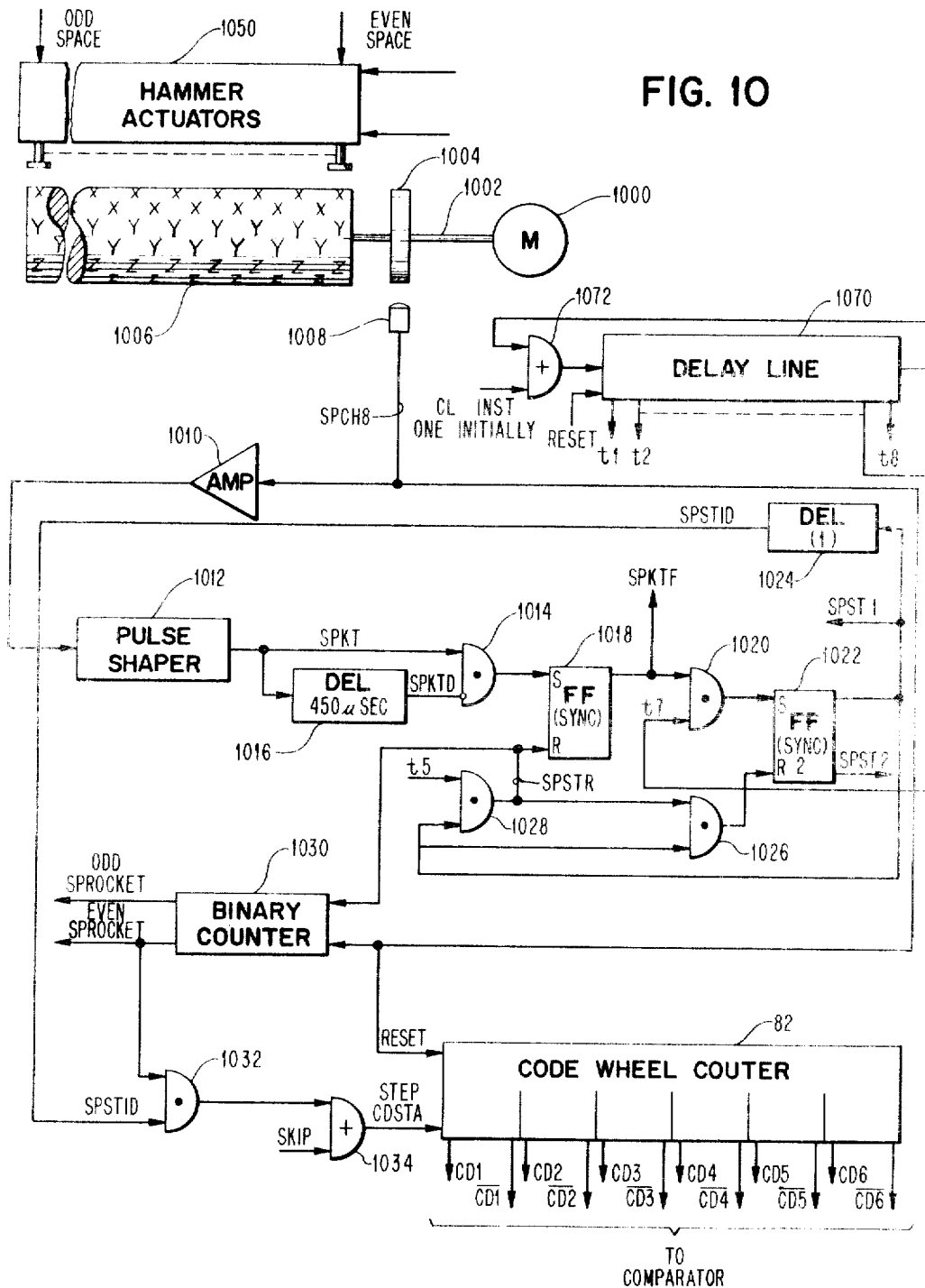

FIGURE 10 illustrates in more detail the timing and ode generating circuits of FIGURE 2.

Figure 11:
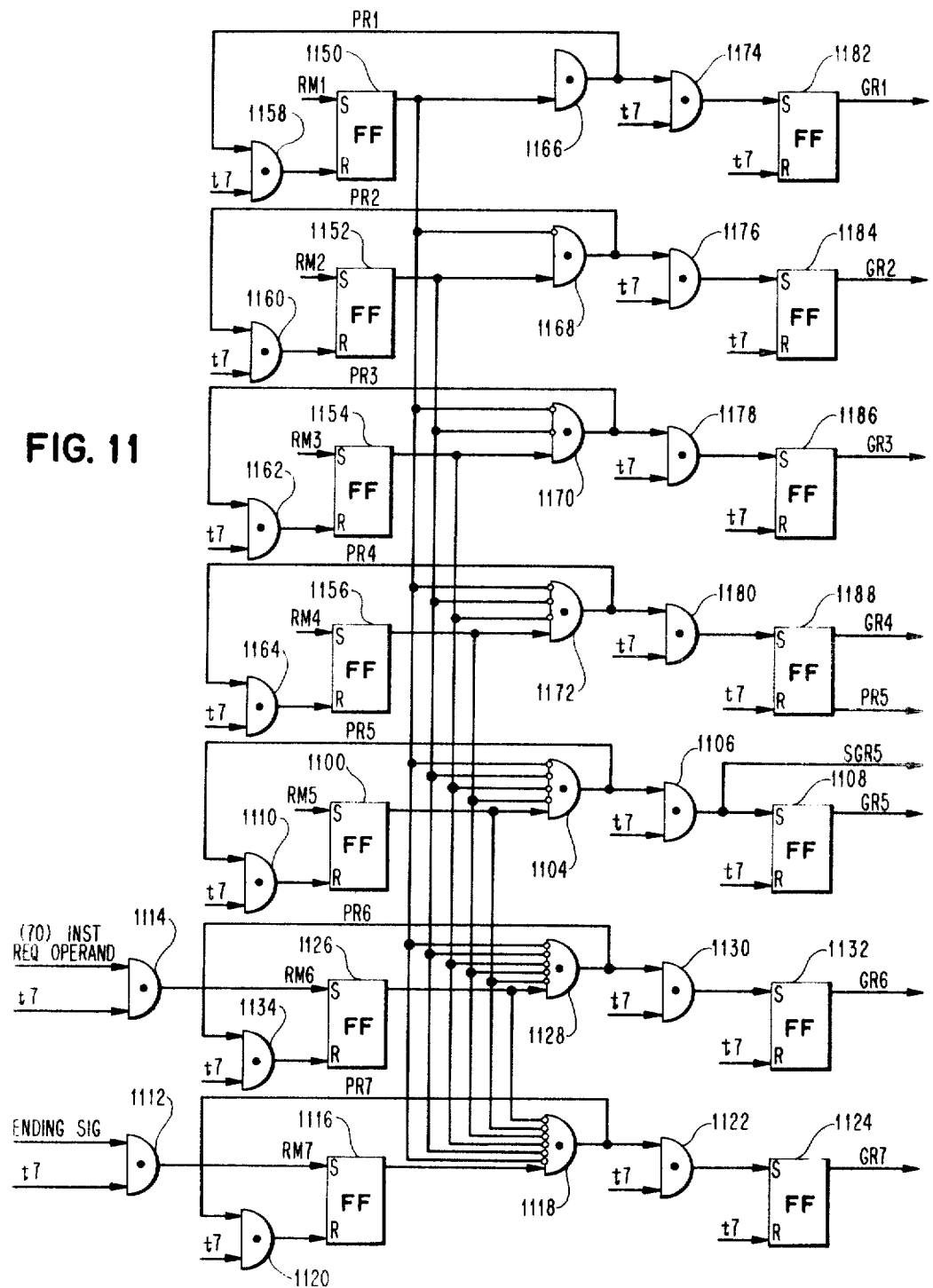

FIGURE 11 illustrates in more detail the priority conol circuits of FIGURE 2.

Figure 12:
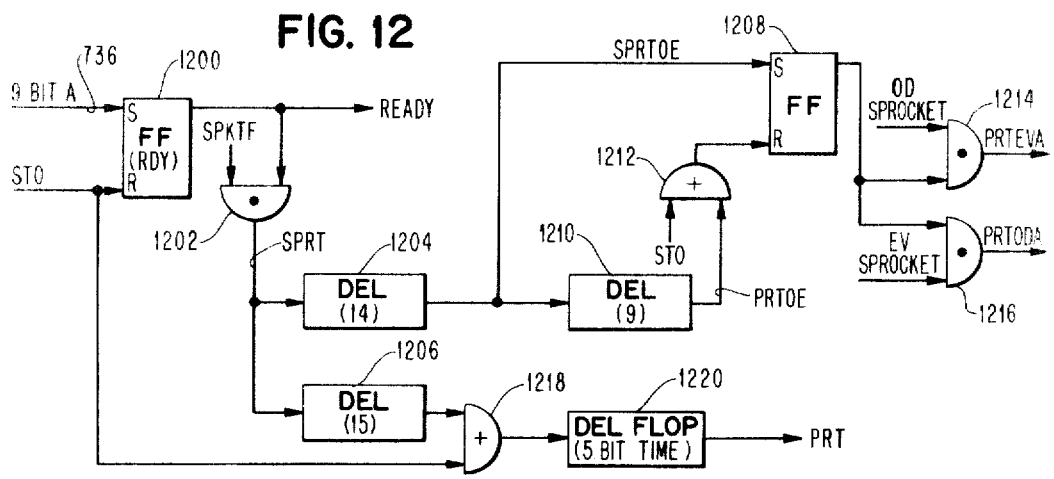

FIGURE 12 illustrates in more detail the print control ircuits of FIGURE 2.

Figure 13:
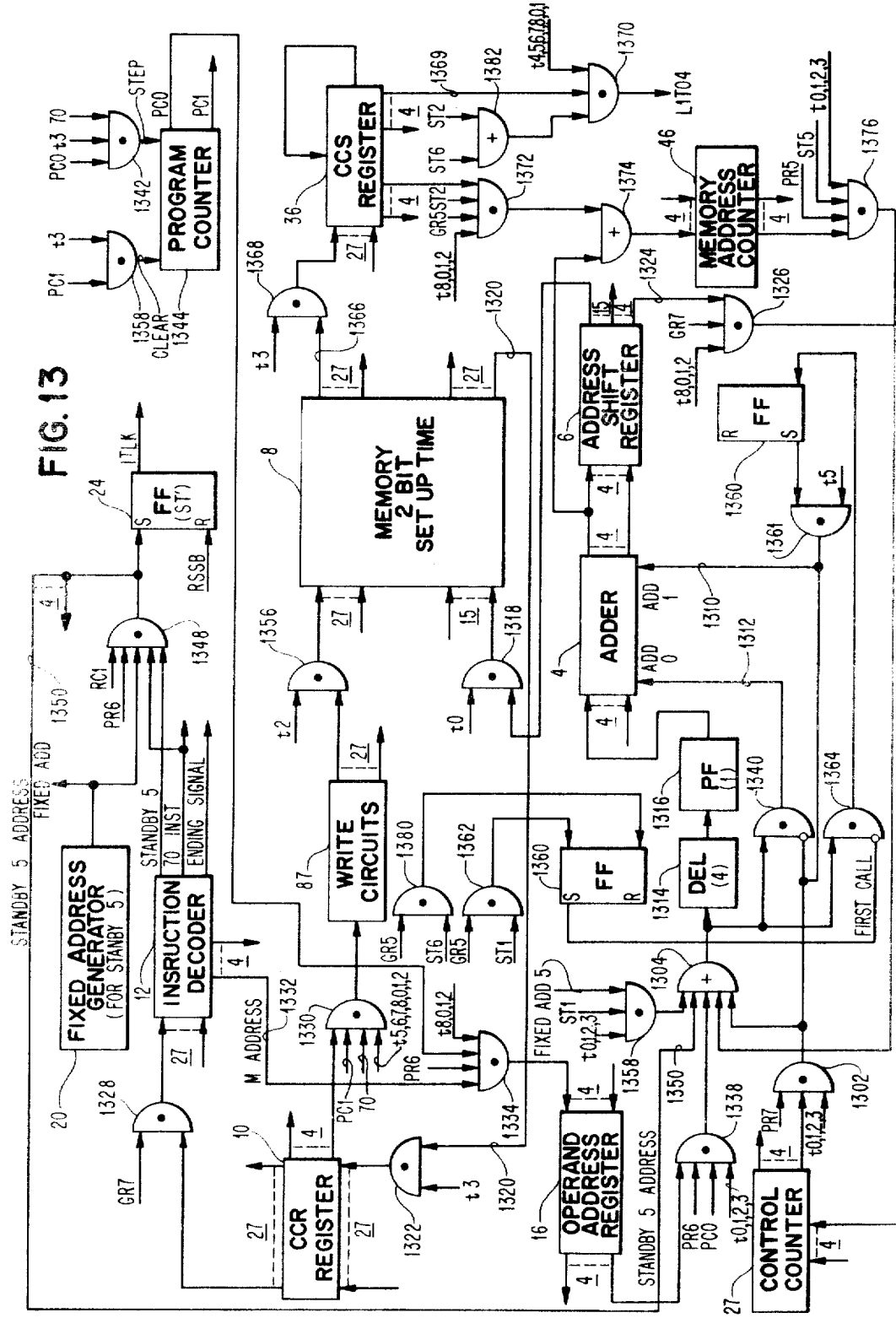

FIGURE 13 illustrates in more detail the memory ddressing and control circuits of FIGURE 2.

Figure 14B:
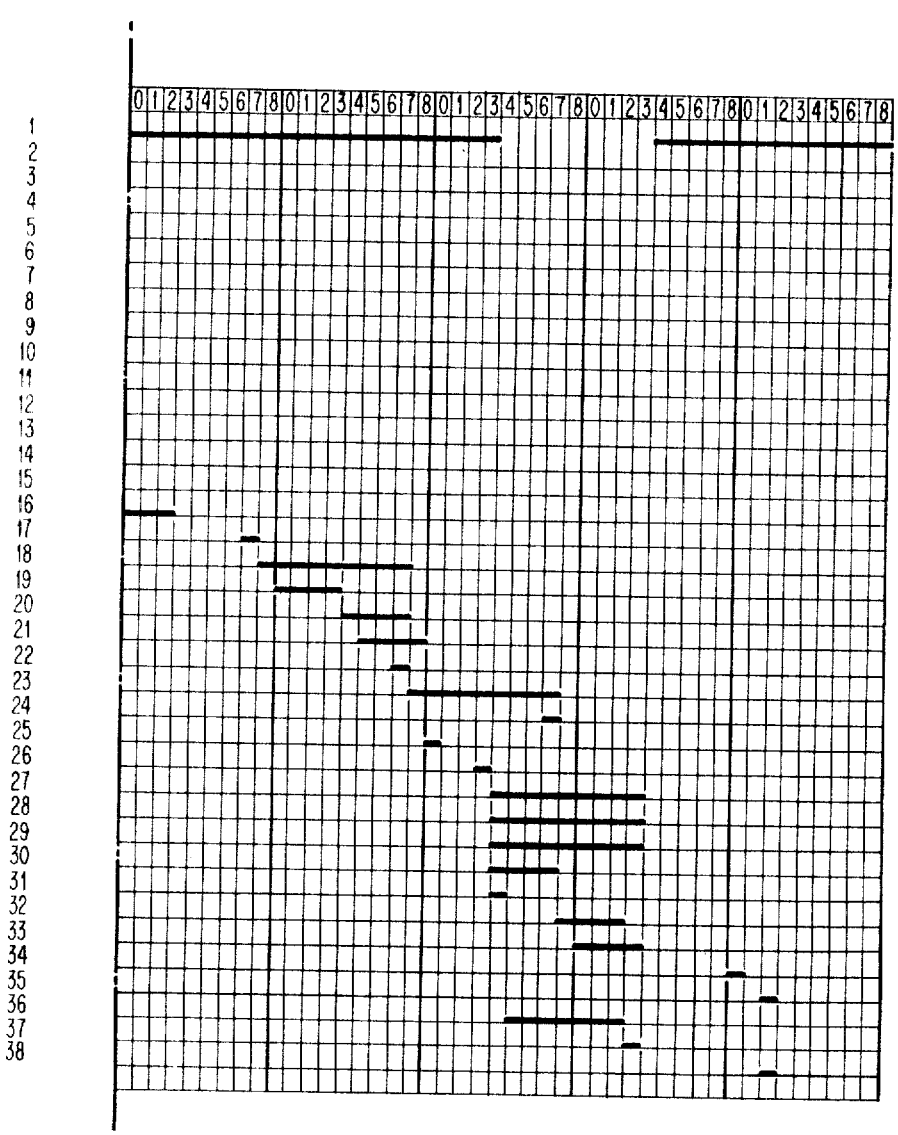

FIGURE 14 composed of FIGURES 14a and 14b is timing diagram of the "70" instruction.

Figure 15D:
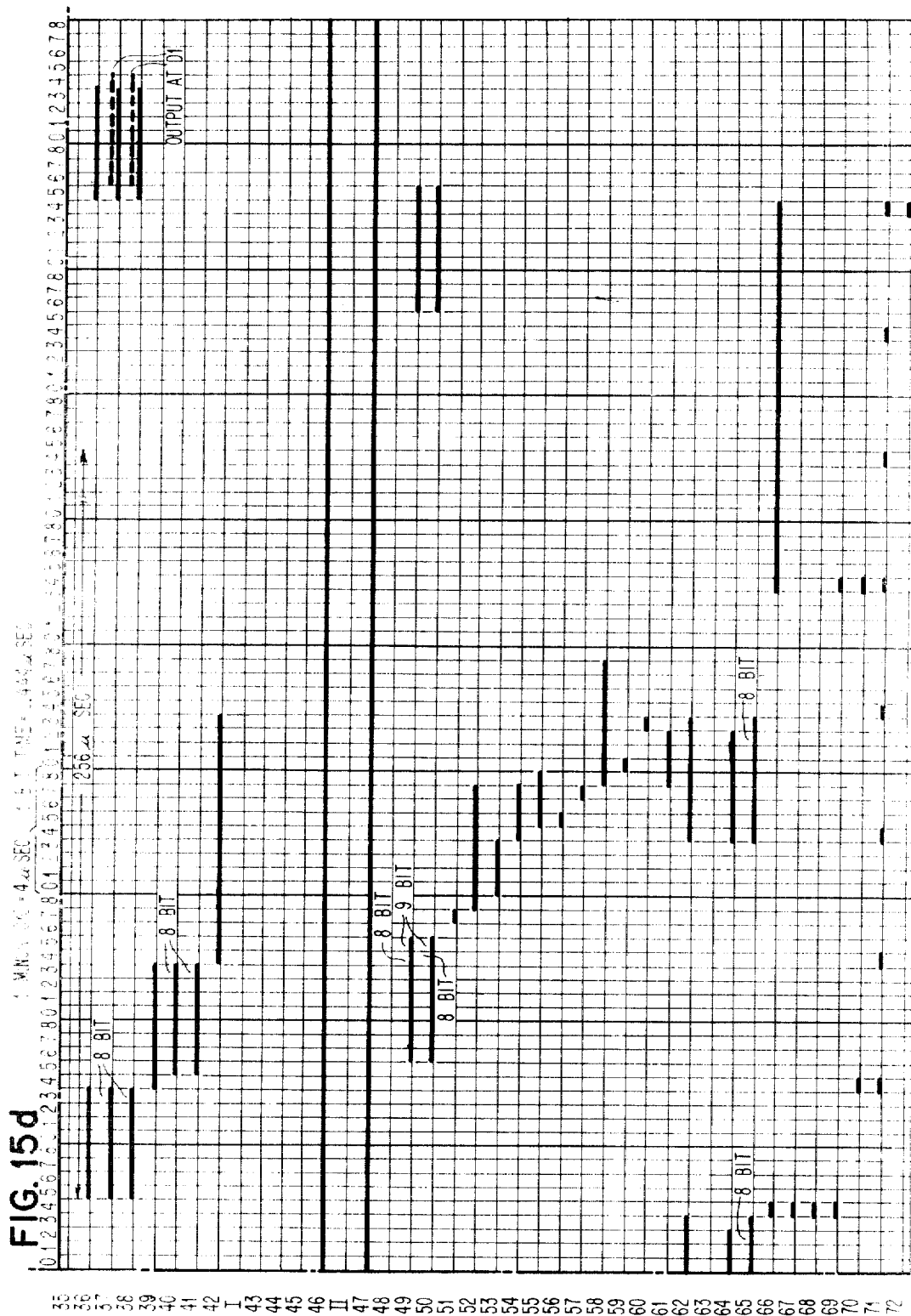

FIGURE 15 composed of FIGURES 15a, 15b, 15c and 5d is a timing diagram of the synchronizer during a uffer loading operation.

Figure 16B:
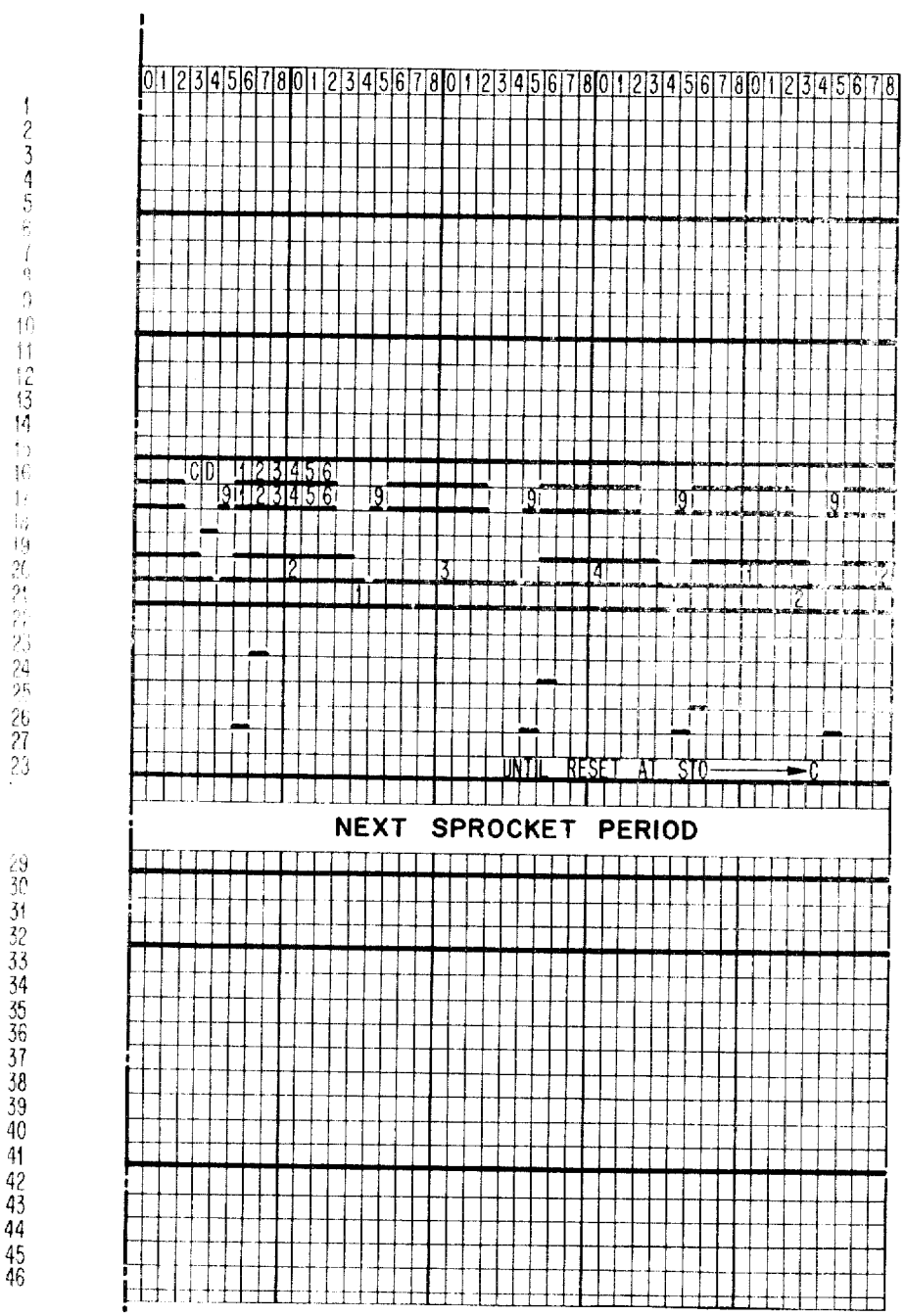

FIGURE 16 composed of FIGURES 16a and 16b is a iming diagram of the synchronizer during a print operaion.

Similar elements are given similar reference characters n each of the respective figures.

GENERAL DESCRIPTION

The high speed print synchronizer consists of most of the circuits that are necessary to synchronize and control the transfer of information from the memory of the central processor to the printing device. The synchronizer comprises timing circuitry, storage registers, special character insertion circuits, deletion and detection controls for the main printing functions, such as paper advance and printing itself.

In order to more fully understand the manner of operation of the device, it is first necessary to understand the information formats and coding schemes used within the synchronizer and its related equipment. All information which the print synchronizer will receive, both data to be printed and instructions, will come from the main memory of the computer in the form of a standard computer word. The standard computer word is composed of 28 binary bits, which are available from the memory in parallel.

The 28 bits originating from the memory 8, found in the central processor, as shown in FIGURE 1a, are read into a register 36 designated the CCS register. The CCS register 36 is a register capable of storing the 28 binary bits received from the memory of the central processor and distributing them to further circuits of the synchronizer in formats which agree with the further circuits needs. The CCS register 36 stores the 28 bits received in four separate sections each of which contains 6 bits. The 6 bit groups each define a print character. Thus each computer word is composed of four characters or digits. The bits in the positions 19 to 24 of the word read from the memory constitute the most significant character and is termed character 1 odd. Bits 13 to 18 of the memory word constitute the character of second highest significance and is termed character 2 even. Bits 7 to 12 of the memory word constitute the character of second lowest significance and is termed character 3 odd. Bits 1 to 6 of the memory word constitute the character of least significance and is termed character 4 even. Bits 25 to 28 of the memory word are not employed for character designation and no provision is made to treat these bits as part of any character group.

The bits of the four characters may be read from the CCS register 36 in the parallel-serial mode. In this manner of read out, the most significant bit of each character is read out at the same time, followed by the next most significant bit of each character. Each of the four output lines which carry the parallel bits read from the CCS register 36 is connected to a separate recirculating 9 bit storage register. The registers 38, 40, 42 and 44 thus receive, respectively, character 1 odd, character 3 odd, character 2 even and character 4 even. Thus at the completion of the transfer operation from the CCS register 36 to the 9 bit stores 38, 40, 42 and 44, 6 binary bits will be deposited in each register.

As shown in FIGURE 1a, the 9 bit registers are further connected to one of two 64 character registers 56 and 58 the buffer registers of the print synchronizer. These registers are of the dynamic recirculating type and are each capable of storing 64 characters or one half of the total number of characters required to completely fill one print line. Register 56, the odd register receives, alternately character 1 odd from 9 bit register 38 and character 3 odd from 9 bit register 40. Register 58, the even register receives, alternately character 2 even from 9 bit register 42 and character 4 even from 9 bit register 44.

The 6 binary bits stored in each 9 bit register represent alpha-numeric coded decimal combinations which are employed to describe 26 alphabetic characters, ten numeric characters and 15 special character symbols. These special symbols may include the period, the comma, the dollar sign, the percent sign, etc. The 6 bits make available the possibility of 64 separate character designations. However, as employed within the device, 13 of these code combinations are not used and are considered to represent non-printable characters.

As was stated above, only 6 bits are transferred from the CCS register 36 to each of the four 9 bit registers 38, 40, 42 and 44. The remaining 3 bit spaces in each register may be filled from other sources. The 7th bit position is employed to store a character check bit which is generated by a checking device. In that the check bit is not germane to the explanation of the synchronizer operation it will be assumed that the 7th bit is left blank thus storing a zero. The 8th bit position is allocated to a special bit which may be used for particular loading functions. The pattern of bits in the 8th bit position, as will be described below, is employed to detect the last character transferred to the buffer registers 56 and 58 of the synchronizer as well as to determine when the buffer registers 56 and 58 have been filled. It is this 8th bit position which is employed with detecting equipment to control and monitor the loading of the synchronizer buffer registers 56 and 58. Thus as stated above, a number of complex counters and associated circuitry which might be required to keep track of information stored in the buffers is eliminated. The 8th bit position of certain of the 9 bit registers will have a one inserted therein by an 8 bit insertion device to be described as the information enters the registers 38, 40, 42 and 44.

The ninth bit position is allocated for printout control purposes and is used to indicate when a particular character has been printed out, thus preventing any further reprinting. The ninth bit position is also employed to indicate when all the characters contained within the buffer registers 56 and 58 have been printed out and the device is then free to accept a further instruction. As with the 8th bit, detection equipment is provided to sense the 9th bit position, to permit performance of the functions as described. Again much complex equipment is eliminated by use of this coding technique. The 9th bit is not inserted in the 9th bit storage devices, thus this position will be blank indicating the storage of a zero.

After the 9 bit registers have been filled their contents are transferred to the 64 character buffer registers 56 and 58. As described above, the contents of registers 38 and 40 storing character 1 odd and character 3 odd are transferred sequentially to the odd 64 character register 56 in serial. Character 2 even and character 4 even stored in registers 42 and 44 are transferred sequentially to the even 64 character register 58 in serial. Thus at the completion of the transfer from the 9 bit registers to the 64 character register, the 1st and 3rd characters of the word are located in the odd 64 character register 56 whereas the 2nd and 4th characters of the same word are located in the even 64 character register 58. Each subsequent word will be transferred to the 64 character stores in the same manner as described.

Referring now to FIGURES 1b and 1c the method by which the eighth bit position is employed will be set forth. It should be recalled that the 64 character storage registers 56 and 58 are of the recirculating or dynamic type. Thus the information stored therein is in continuous motion. It is not possible to examine the contents of particular storage locations at will as it is in static type devices. The information contained in particular storage locations can only be examined when it reaches a particular point in the recirculation point, usually the read out sensing device. Thus if it is desired to load the recirculating register, so that each character entered follows immediately after the character previously entered without spaces or overlapping, some scheme must be provided to keep track of the last storage location into which a character was placed. The scheme employed in the present synchronizer to identify the last character entered into the recirculating registers involves the use of the 8 bit pattern, as will be described below.

Referring to FIGURE 1b, the arrangement of a single word in the odd and even 64 character recirculating storage register is shown. In the portion of the figure opposite the title Odd register 56 is shown the character 1 odd under the number 1 and the character 3 odd under the number 2. Opposite the title even register 58 is shown the character 2 even under the number 1 below character 1 odd and the character 4 even under the number 2, below character 3 odd. The numbers 1 and 2 serve to indicate the first and second storage locations in each of the registers 56 and 58. Thus two storage locations in each register are required to storage the four characters of one complete word.

It will be assumed for this explanation that only one word has been entered into stores 56 and 58 and that this word occupies the first and second storage locations. The 8 bit pattern to be described, however, will be the same for the last word entered regardless of the storage positions occupied.

Turning now to the 8 bit columns of the four characters shown in FIGURE 1b, it can be seen that a one is found in the 8 bit position of character 1 odd, character 3 odd and character 4 even. A zero is found in the 8 bit position of character 2 even. The one is inserted in the 8 bit position of these characters as they are loaded into their respective 9 bit registers 38, 40 and 44 by circuitry and in a manner to be described in detail below. Thus by providing circuitry to recognize the presence of a 1 bit in the 8 bit positions of character 1 odd, character 3 odd and character 4 even it is possible to readily determine that this word is the last one to be entered into the 64 character storage registers.

As further words are entered it is necessary to alter the 8 bit pattern of the previous word entered, so that only the last word entered bears the distinct 8 bit pattern indicative of the last entered word. This is accomplished by means of an 8 bit removal device, the construction and manner of operation of which will be described in detail below. This 8 bit removal device removes the one in the 8 bit position of character 3 odd as a new word is available for entry into the 64 character registers. Thus the previously entered word no longer indicates the last entered word 8 bit pattern. The remaining 8 bit pattern, that is a one in the 8 bit position of character 1 odd and character 4 even can however be used to indicate that a word is stored in the locations 1 and 2.

Turning now to FIGURE 1c, there is shown the 8 bit pattern of a first stored word under the numbers 1 and 2 which indicate the first and second storage locations in the registers 56 and 58 respectively and the last stored word under the numbers 3 and 4 which are the third and fourth storage locations. It can be seen from the 8 bit positions of word one (under numbers 1 and 2) that a one exists only in character 1 odd and character 4 even. It can further be seen that the one which originally was found in the 8 bit position of character 3 odd has been changed to a zero, to indicate this is no longer the last word entered. The last word entered (under numbers 3 and 4) has an 8-bit pattern similar to that depicted in FIGURE 1b and is thus readily distinguishable from other words stored.

To summarize, a one in 8 bit positions of character 1 odd and character 4 even indicates a word is stored, whereas a one in 8 bit positions of characters 1 odd, 3 odd and 4 even indicates this is the last word entered in the buffer registers 56 and 58. Thus, by the simple expediency of insertion and later deletion of particular 8 bit characters, it is possible to tell which is the last character that has been entered in the 64 character buffer registers 56 and 58.

As will be described below in greater detail the 8 bit detection equipment 67 will merely sense the 8 bit position of characters 3 odd and 4 even to determine the status of information within the buffer registers 56 and 58. If a one appears in the 8 bit positions of both charters, the word being sensed is the last word in the buffer registers 56 and 58. If a one appears in only the 8th bit position of character 4 even, the buffer storage location being sensed contains a word, which word is not the last word in the buffers 56 and 58.

As has been stated above, the initial condition of the 9th bit position is that it stores a 0. As will be described below, as each character is printed from the 64 character stores, a one will be inserted in this 9th bit position. This bit will indicate that the character has been printed out and is not to be printed out a second time. This is important because additional registrations or reprinting of the same character causes a character to appear unduly dark as compared to other characters not printed a second or multiple times, as well as the fact that the paper may possibly chatter or move during the printing operation, causing the blurring of the final image printed. In addition, the 9 bit is employed to determine when the entire contents of the 64 character stores have been printed out. Thus, when each position of storage within the 64 character storage stores a nine, it is obvious that the register contents have been completely printed out and that the device is now finished with the print instruction and may accept additional instructions. In this manner, by the use of a nine bit to indicate when printing has taken place, it is not necessary to require additional registers to keep track of what characters and how many characters have been printed.

Reference is now made to FIGURE 2, which generally illustrates the overall relationships between the various components of the high speed print synchronizer. The control counter 2 of the computing device produces signals indicative of the addresses in the memory where instructions for the computer to execute may be found. It will be assumed that the address which has been selected by the control counter 2 is that of the instruction calling for the print standby loading operation.

The print standby loading operation, also termed the 70 instruction, serves to place an instruction for the printing device in a preassigned standby memory location to which the printer will refer each time it is available to carry out a printing operation. The following events will take place during the print standby loading operation. The bits constituting the address set in the control counter will be conducted through an adder 4, to an address shift register 6 where it is employed to address the memory. The adder 4 operates to add a zero to the address value which does not effect the address value in any manner. The contents of the location specified, is assumed to be the print standby loading instruction. The bits of the instruction read from the memory 8 are placed in the CCR register 10. This register permits the static storing of the bits of the instruction read from the memory until they can be passed to further devices within the computer. The output of the CCR register is fed to instruction decoding device 12. This instruction decoding device will interpret the instruction and provide signals indicative of the address of a particular operand and specify the function which the device is to perform, that is, an add operation, a subtract operation, or as in this case, a print standby loading operation.

Those bits of the instruction which constitute the portion describing the operand address are transferred from decoder 12 to an operand address register 16. The contents of the operand address register 16 are then again read through the adder 4, which adds a zero to the operand address, to the address shift register 6 to permit the addressing of the memory 8.

The address shift register is capable of receiving inputs in serial and presenting its inputs as a parallel signal group to operate the memory selection device. The contents of the address in the memory 8, specified by the operand address register 16 are then read to the CCR register 10. This time the information from the CCR register will not be placed in the instruction decode device 12 but rather will be returned to the memory 8 through a write circuit 18 under the control of gating circuitry to be described below. The location in memory 8 to which the contents of the CCR register will be returned are determined by a standby location fixed address generator 20 which generates a signal code which is the assigned address. This address will be a fixed address which is associated with a particular unit in this case a printing device. There will be one standby location in the memory for each one of the peripheral equipments which is used with the computing system. Thus if it is desired to store an instruction for the printer to execute, the instruction is placed in the standby location associated with the printer. At times when the printer is able to carry out such an instruction it will sample the standby location by testing certain indicating flip-flops to determine whether or not there is an instruction available for the printer to execute at that time. Thus, under control of the first instruction called for by the control counter 2, an instruction found at the address of such first instruction location in memory 8 is placed in a standby location in the memory 8 associated with a particular peripheral equipment. Hence, for example, at standby location 5 of the memory, there is stored an instruction to be executed by the printing device at a later time.

More particularly, the control gate 22, an and circuit, is made responsive to the function bits calling for the 70 instruction from the instruction decoder 12, as well as the bits which identify the particular standby location to be loaded, in this case standby location 5, to pass the fixed address code of standby location 5 generated by the generator 20. This address code is passed to the address shift register 6 to address the memory to standby location 5. The instruction to be placed in this standby location previously loaded into the CCR register 10 is then read into the standby location via the write circuit 87 under the control of gating circuitry to be described below. The address code is also used to set the standby flip-flop 24 to indicate that the standby location now contains an instruction which the printer is to carry out.

On the completion of the print instruction which the printer last received, the printing device will furnish a signal designated the Action Complete Signal from a flip-flop 54 (FIG. 2a) to indicate that the last instruction, whether it be merely a movement of paper or a movement of paper plus printing has been completed by it. The action complete signal, the set output of the standby flip-flop and further signals to be described below will cause the printing device to execute the instruction now stored in its standby location. These signals are fed to a counter control matrix 28 which will control the stepping of the stature counter 800, which is the main program control device for the print synchronizer.

The stature 800 counter after the devices within the print synchronizer have been cleared will produce a signal which is directed to the memory request control 32. The memory request control 32, to be described below in detail, is responsible to initiate requests for memory access providing the printer is now in need of such access, depending upon the status of the stature counter 30, the print control 50 and appropriate timing signals on the *t* line. In response to the presence of its input signals a memory request signal RM5 will be issued to request memory access for a device with a priority of 5, namely the printer. The signal L18 from the print control 50 will be ineffective at this time.

The RM5 signal means that the printing device synchronizer is requesting the instruction which is stored in the memory at the specified standby location and which the printing device is to carry out. This request memory signal will be received by the priority control circuit 34. The priority control circuit is responsive not only to the request memory signal RM5 but is also responsive to the priority request or request memory signals from devices of priorities 1 through 4. The priority control 34 determines whether or not any peripheral device of a higher priority is requesting the use of the memory at the particular time the printer requires it. The higher priority peripheral devices will produce signals which will inhibit the granting of priority or access to the memory to any peripheral device of lower priority. In the event, however, that the peripheral devices of higher priority do not require access to the memory, the priority granting signal will be provided to the printing device indicated that it now has access to the memory. The granting of priority, however, does not mean that the printing device will have priority for sufficient time to complete all its necessary operations; it simply indicates that for one word time, the printing device will have access to the memory. As will be described below, the printing device will have to make a request for access to the memory and go through the same priority determination for each of the 32 computer words which it will require in order to print out a full print line. Granting of the priority 5 at this time permits the instruction which previously has been stored in the memory 8 at standby location 5 to be read from the memory 8 to the CCS register 36. The instruction fed to the CCS register will have a format such as that illustrated in FIGURE 3.

Referring to FIGURE 3, the format of the instruction of the print operation is set out. A print instruction consists of 28 bits broken down into five groups identified as the L address, I, the function code, lines of vertical spacing and a plurality of unused bit positions.

The portion of the instruction containing bits 1 through 15 is designated the L address. This L address represents the address in the memory of the first word to be printed out in the following print operation. The 16th position which constitutes the column I is an indication of whether or not an interrupt instruction operation will be performed after the printing operation has been completed. For purposes of this explanation the function of the interrupt signal will not be considered. The following two bits 17 and 18 are designated as the function code bits. In this operation, the bit position 17 is not employed and will not be further considered. The bit position 18 is used to indicate whether a print operation will take place or whether merely a paper feed operation will take place. In the event that a zero is found in the 18th position there will merely be an advance of paper, that is, the paper will be moved vertically a number of lines from 1 to 64. No printing operation will take place. In the event that the 18th bit is a one, there will be a printing operation as well as a paper advance. As will be described below, the paper advance operation is completed before any printing is done. The bit positions 19 through 24 are the positions under the lines of vertical spacing column and are used to indicate the number of line spacing which is to take place in the succeeding operation. There are 6 bit positions; therefore, there is a maximum number of 64 lines which may be advanced during a paper advance operation. The bits 25 to 28 are not employed and will also not be considered at this time.

Returning now to FIGURE 2, once the priority control 34 has determined that no peripheral equipment of higher priority desires a memory access, the signal GR5 will be generated. This indicates that the request memory of the printer (RM5) has been granted and that the printer may access the memory for one word period. In response to the GR5 signal the fixed address standby location generator 20 will be actuated to read out the code representative of the address of the fixed location corresponding to standby location 5. This address will permit the reading of the print instruction (see FIG. 3) which has been pre-loaded in the memory 8 at standby location 5 during the print standby loading operation. The print instruction thus read out is placed in the CCS register 36 under the control of circuitry to be described below. As was described above in detail, the CCS register 36 can be made to supply outputs, non-destructively, which are indicative of the successive bits of each of the four characters stored or to present its contents in a wholly serial manner also non-destructively. The first manner of transfer, that is the parallel serial mode is employed to transfer the characters of each word received by the CCS register 36 to the 9 bit registers. The bits 19 through 24 of the instruction word will be read into 9 bit register 38 while the bits 7 through 12 will be read into a further 9 bit register 40. Bits 13 through 18 will be read into an additional 9 bit register 42, while the remaining bits 1 through 6 will be read into register 44. In addition, the bits 1 through 15 which constitute the L address, will also be read in the serial mode into a device known as the memory address counter MAC46 from the CCS register 36 (to be described below). The timing to control the various transfers of information from the CCS register to the 9 bit stores and further to the 64 character registers and the remaining circuits of the device are controlled by stature counter 800 which is stepped in the manner to be described below.

At some future stature count, the information, that is, the bits 19 through 24 stored in 9 bit register 38 is read over a line designated AP to a paper feed counter 48 to indicate the number of lines which the paper will be advanced. The 18th bit stored in the 9 bit register 42 is read over a line designated P to a print control unit 50 to produce a signal L18 if the 18th bit is a one. If the 18th bit is a zero, the print control device will not be set and the $\overline{L18}$ signal will be produced. The $\overline{L18}$ signal indicative that only a paper feed operation is applied to the end of paper feed control unit 52. The end of paper feed control unit operates in response to the following events: once the paper feed counter 48 receives the signals on the line AP (indicating the number of lines the paper is to be vertically spaced), the paper feed device is operated by means of brake and clutch control 51 in response to the paper feed counter 48 output signal. For each sprocket pulse, generated by the paper feed mechanism (not shown) that is received indicating that the paper has been advanced one line (not shown), the paper feed counter is counted down one by means of the count-down gates 49 associated with the paper feed counter. When the count-down gates have caused the paper feed counter to be diminished to zero as a result of the number of lines indicated by the count paper feed counter having been advanced, an output signal designated $\overline{PPZ}$ is supplied to the end of paper feed control 52. The concurrence of the $\overline{PPZ}$ and $\overline{L18}$ signals at the end of paper feed control 52 cause an output signal designated EOPF or end of paper feed to be produced. This signal is impressed upon an action complete flip-flop 54 which produces a signal to indicate that the operation as called for by the instruction has been completed. This action complete flip-flop 54 puts out a signal to the counter control matrix 28 asociated with the stature counter 30 to cause the stature counter 800 to be completely cleared to zero and clear all the subdevices within the synchronizer. In this manner the synchronizer is then able to accept a further instruction. The sequence of events as described above with respect to requesting of instructions will then be carried out once more.

In the event, however, that the signal produced by the print control 50 in response to the P input signal is an L18 signal (indicative of the fact that the printing and paper feed operation will take place) the L18 signal is impressed upon the memory request control unit 32 to cause request for memory to be again made. This request for memory is distinguished from that made earlier, in that this is a request for data to be transferred from the memory to the synchronizer. This data will be printed out in subsequent operating steps. The request is again directed to the priority control unit 34 to determine whether or not the print device may have access to the memory at this time. As shall be recalled from the previous discussion the priority control circuit is also responsive to the remaining peripheral units of the computer of higher and lower priority. If there are no signals of higher priority that is, devices which have been arbitrarily assigned higher priority values, requesting access to the memory, the memory will be granted to the printing synchronizer for one minor cycle. In the event other peripheral units of higher priority are requesting memory access, the printer request will be stored until the memory access can be granted the printer. The minor cycle is sufficient to transfer one word of data composed of four characters to the synchronizer. It will also be recalled that there are 32 such words required to print out an entire line and as a result 32 such requests for data must be made in order to complete the operation. If we assume that the devices of higher priority are not desirous of communication with the memory at this time, the priority signal will be granted and the print synchronizer will then have access to the memory.

The L address portion of the instruction for printing, which describes the location of the first word in this memory which would be printed out, has been loaded into the memory address counter or MAC46 during an earlier operating step as has been explained above. The MAC46, as will be described below is a 28 bit storage register capable of receiving inputs and providing outputs in the parallel serial mode. The four least significant bits of the L address are transferred into or out of the MAC46 at any one time. The transfer continues until the MAC is full or empty as the case may be. This address is now read from the memory address counter through the adder W (which at this time adds a zero to the address value) to address shift register 6 where the location in the memory 8, as described by the contents of the memory address counter is found. The value at this location is read into the CCS register 36 for distribution to the 9 bit stores 38, 40, 42, 44. The information in the registers 38 through 44 will subsequently be transferred in an alternate fashion to the two 64 character buffer registers 56 and 58. It should be recalled from the description above that the first character is read from the 9 bit register 38 into the odd 64 character register 56 and the first even bit is read from the 9 bit register 42 into the even 64 character register 58. Further, the contents of the 9 bit register 40 which is the third character, is then read into the 64 character register 56 whereas the contents of the 9 bit register 44, which is the 4th character, is read into the 64 character even register 58. It should be noted that the first information received by the 9 bit registers was the instruction itself. It is not desired that this information be retained and printed out, thus a clear flip-flop 60, connected to a gate in the recirculation path of each of the registers 56 and 58 is set by the stature counter 800 before this transfer to prevent the recirculation of this information in the registers 56 and 58. Thus, in effect at the end of this first transfer, no information is found in the 64 character registers. However, preparatory to transferring the information now stored in the 9 bit registers 38 to 44 the clear flip-flop is reset by the stature counter 30 which has been advanced by the counter control matrix in response to the completion of the instruction transfer, to remove the clearing signal from the 64 character stores 56 and 58. Accordingly, when the information is now transferred to the 64 character buffer registers it will be retained.

The 64 character buffer registers 56 and 58, as will be recalled, are recirculating dynamic storage registers which are capable of storing 64 individual characters, the characters being in the format described above, namely, 9 bit positions for each character. The register 56 is designated the odd character register and will receive the first, third, fifth, etc., characters transferred from the 9 bit registers 38 and 40. It will receive in an alternate fashion, the first character of a particular word during a first time period and the third character of the same word during a following time period. In a similar fashion, the even 64 character register 56 will receive the second, fourth, etc. characters to be transferred by the 9 bit registers 42 and 44. It will receive the second and fourth characters of each particular word.

To regress for a moment, as characters are transferred from the CCS register 36 to the individual 9 bit registers 38 through 44, an 8 bit inserted 62 which comprises a gate to admit a T2 timing pulse to the 8th bit position, places a one in the 8 bit position of the first, third and fourth characters of the word. Thus, the characters transferred from the 9 bit registers 38 through 44 into the 64 character registers 56 and 58 contain the information bits of the data to be printed out as well as the inserted 8 bits. With this information now stored in the 64 character registers, the device is able to proceed, to request the memory again for the transfer of an additional word to the synchronizer and is ready to print out the word already stored. The method of requesting such additional words will be the same as that described above.

During the time the information is being loaded into the 64 character registers, the paper advance proceeds as described above. To prevent printout of words already in the registers 56 and 58, during the time a long paper advance is taking place, the printout of information is inhibited for sufficiently long a period by means of a delay in the brake and clutch control 51. This delay, actuated by the $\overline{PPZ}$ signal from the paper feed counter 48, is sufficient to permit the paper to be advanced a number of lines as described by the lines of vertical spacing bits 19 through 24 contained within the instruction and for the paper feed devices to be stabilized and thus, provide a static surface upon which the material may be printed out. If this delay were not interposed it would be possible to attempt to print information while the paper is still being moved and before it has reached the stable condition. The time required for most paper feed operation, as well as the time required for stabilization of the paper feed devices is generally sufficiently long for the entire contents of the 64 character registers to be loaded.

During each transfer of information to the 9 bit registers, the 8 bits will be inserted in the manner described. As each subsequent word is transferred to the 64 character registers 56 and 58, the 8 bit removal device 64 which comprises a controllable gate in the recirculating path of register 56, which when operated by an STA7 signal deletes a bit by preventing its transfer through the gate, will delete the bit in the 8 bit position of the third character of the previously transferred word in response to the STA7 signal, now generated. The STA7 signal is generated in response to the ST7 signal generated by the stature counter 30 and the signals from registers 56 and 58 which indicate the 8th bit is ready to pass the controllable gate. Thus, as has been described all but this last word entered will contain 8 bits only in the first and fourth characters of each word. The final word entered will contain 8 bits in the first, third, and fourth characters of each word. The final word entered will contain 8 bits in the first, third and fourth characters of the particular word.

The availability of storage locations in the 64 character registers will be continuously monitored by means of an all 8's detector 67. This device will produce an output signal called NINZ which is applied to the counter control matrix 28 to permit the device to re-cycle requesting additional data from the memory so long as it fails to detect the condition where 8 bits are located in all the testable positions associated wth allocated storage locations of the 64 character registers. The testable positions are the 8 bit positions of character 3 and 4 of each word. Thus, as long as there is a place located within the 64 character register where a character may be stored a signal NINZ is produced, permitting the requesting of additional data. However, upon the detection of eight bits, in all of the testable positions associated with the storage locations within the two 64 character registers 56 and 58, the all 8's detector 67 will cease to produce the signal NINZ, thus preventing the counter control matrix 28 from producing the necessary signals to permit the requesting of further data. The absence of the signal NINZ will indicate that the registers are full and no further information can be accepted.

If we assume now that the 64 character stores have been stabilized and the output signal indicative of this fact has been received by the synchronizer, the synchronizer is ready to control the printing of the data received by it.

It should be understood, however, that it is not necessary that the 64 character stores be completely loaded to commence a print operation. Due to the unique coding arrangement employed, the 8 bit pattern will indicate where the last word received is located in the 64 character buffer registers 56 and 58 as well as whether or not these registers may accept further information from the memory. Thus, if the loading operation is interrupted, as for example, due to the loss of memory access, the words already stored in the 64 character registers may be printed out without affecting the subsequent operation of the device once access is reacquired. Further, due to the 9 bit scheme those characters printed out will be easily recognized and will not be reprinted. Therefore, as stated above, although the 64 character buffer registers 56 and 58 are usually loaded prior to the start of a print operation, this condition is not essential or even necessary for proper operation.

The printing device employed with the overall system consists of a type cylinder 1006 (see FIG. 26) having 128 columns of type in a staggered relationship. All the corresponding type elements in the odd type columns, that is the first, third and fifth columns are positioned relative with one another to form a row of odd character type. Corresponding type elements of the even type columns, that is the second, fourth and sixth, etc. are aligned with each other and in a staggered relationship with the odd columns to form rows of even type. For example, if we consider the letter A, all 128 columns of a particular line might be printed in two steps, the first pass printing all the A's in the odd columns, then by printing the A's in the even columns. The type cylinder 1006 is continuously rotating to sequentially present each one of the 51 distinct characters capable of being printed in this device. There are 51 separate characters, each requiring two type rows (i.e., an odd and an even row) for each character giving a total of 102 positions or rows around the circumference of the type cylinder 1006 at which information may be printed. In order to print a selected character, one of the 128 hammer actuators 1050 is actuated to cause a hammer to push the paper and ribbon against the surface of the cylinder. Printing devices of this type which are continuously moving and are never stopped during the printing sequence are known as "on-the-fly" printing devices.

Printing devices of the type described are disclosed and claimed in U.S. Letters Patent Ser. No. 2,978,977 for a High Speed Printer by J. P. Eckert et al. issued Apr. 11, 1961 and Pat. 2,915,967 for an Information Reproducing System by A. J. Gehring, Jr., et al. issued Dec. 8, 1959.

It should be understood that the print synchronizer as described may be modified to operate with a print device employing a type cylinder in which the type for each of the 128 columns was located in a single row. Employing such a printer the two 64 character registers could be replaced with a single 128 character register and the agreement matrix, to be described below would, similarly be extended to 128 positions. Certain other obvious modifications would also be made to provide proper timing and transfer controls. It should be understood that the actual printer employed is not part of this invention and that modification to meet the requirements of various printers could be made to the synchronizer by those skilled in the art.

Ganged to the same shaft as the type cylinder 1006 is a code wheel 1004 with 102 magnetically recorded areas thereon corresponding to the 102 row positions of the type on the type cylinder 1006. A magnetic reading head 1008 is employed to sense the magnetized areas upon the code wheel 1004 as it rotates and produce signals which will be employed to generate sprocket pulses. The output of the magnetic reading head 1008 is fed to the synchronizing flip-flops 1018 and 1022 which produce various control and timing signals employed in the synchronizer. In addition, the signal read by the head 1008 is fed via flip-flops 1018 and 1022 to a binary counter 1030 which toggles between its two states in response to successive sprocket pulse received producing the odd sprocket signal at one output and the even sprocket signal at the other. Thus, for example, when reading the A type character in the first row or odd row, the binary counter 1030 will produce a signal at its odd sprocket output. However, when it reads even rows of A's, it will then produce a signal at its even sprocket output. The even sprocket output is fed to a code wheel counter 82 a six stage binary counter to produce a binary code display indicative of the print character now available under the print hammers. It should be understood that the counter 82 counts each successive magnetized area and produces a display which corresponds to the total number of magnetized areas read by head 1008 on a single revolution of code wheel 1004.

A flag signal (an additional magnetically recorded area which due to its special timed relationship causes reset) located on code wheel 1004 between the magnetic recording corresponding to the last character available and the magnetic recording corresponding to the first character causes the resetting of the code wheel counter 82 and the binary counter 1030. After the flag signal is read, the first magnetically recorded area read by magnetic head 1008 will cause the generation by code wheel counter 82 a code pattern which corresponds to the letter A. An odd sprocket is also produced by the binary counter 1030. When the type cylinder 1006 has been rotated to a position corresponding to the even row of the letter A, an even sprocket will be produced by binary counter 1030 and a pulse will be transferred to the code wheel counter 82. The counter 82 will count the pulse and after sufficient delay will produce a pattern which corresponds to the letter B. The letter B is the next letter which will be available for printing. This procedure will continue for each type position as the type cylinder 1006 rotates.

The output of the code wheel counter 1030 is fed to a comparator 84 which also receives signals from a serial to parallel converter 86. The serial to parallel converter 86 receives the output of the 64 character stores 56 and 58 in addition to an odd or even sprocket signal from binary counter 1030. During the odd sprocket period, preceding the time when the odd row of a particular character will be available for printing, the odd character register 56 is searched to find whether or not there is a correspondence between this particular character available for printing and the contents of the register 56. During an even sprocket period preceding the time when the even row of the same character will be available for printing the even 64 character register 58 will be compared to the code wheel display to determine whether or not there are located within it any characters corresponding to the type character. It should be pointed out at this time that the code wheel counter representation is not that of the character now available for printing but rather of the character next available for printing. This comparison can be completed between a particular character register 56 or 58 and the code wheel counter 82 combination before that character is available, so that when the character on the type cylinder 1006 is in the printing position, it is already known where such comparisons exist within the selected register 56 or 58.

In order to know where comparisons have been found between the contents of a particular register 56 or 58 and the code wheel counter 82 combination, a device known as the 9 bit inserter 88 is employed. The 9 bit inserter 88 is a logical gate responsive to a comparison between the output of registers 56 and 58 and the output of counter 82 to produce an actuating signal which will insert a one bit in the 9 bit position of the particular character where a comparison was found. This bit will be placed within the character itself and recirculated with the remaining bits of that character to prevent any reprinting of an already printed character. The signal produced by the 9 bit inserter 88, also called the 9 bit, is also employed to set a magnetic core of a special agreement matrix 92, corresponding to the position where this comparison has occurred, to permit the printing out of this character when the proper type is in print position. The output of the nine bit inserter 88 is fed to a marking control 90 which will supply drive current to set the corresponding cores in the agreement matrix 92. The agreement matrix 92 is a 64 core magnetic matrix arranged to have 16 columns of four rows.

The matrix is driven by an X counter 94 and a Y counter 96 in synchronism with the recirculation of information within the 64 character registers. Thus, as the first information is placed in the 64 character recirculating registers, the X counter 94 is started in synchronism therewith so that as each subsequent storage position in the 64 character registers become available to receive information a further core corresponding to that position is actuated to receive agreement information. Thus, when the fifth character stored in the odd 64 character register 56 is available for comparison with the code wheel 82 combination the fifth core of the agreement matrix 92 is similarly made available to receive the nine bit insertion signal if one is generated. If a comparison does exist in this fifth storage location within the 64 character store, in addition to inserting the nine bit in that particular character, a bit will be placed by means of a mark control 90 into the fifth core to indicate that at the fifth storage location of the 64 character register 56 is stored the same character as will next be available for printing.

In that the agreement matrix is merely a 64 core matrix, it can only be used in conjunction with one of the 64 character registers at a time. The normal sequence of events will be as follows: when the odd 64 character register 56 is being compared against the odd line of the particular code configuration corresponding to a particular type character, the agreement matrix 92 will be set to indicate all correspondences in the odd 64 character register 56. At the beginning of an even sprocket time, all places of agreement will be caused to be printed out and the matrix 92 will be cleared to receive indications of the correspondence between the even 64 character register 58 and the code wheel 82 combination at the even row of a particular type character.

Thus, to recap, the sequence for printing will be as follows: the code wheel counter 82 will be set to indicate a pattern indicative of the next character available for printing. It is assumed that this is the odd row of the A character. An odd sprocket will be generated which will permit the gating of the 64 character odd register 56 into the serial to parallel converter 86 and thence onto the comparator 84 where it will be compared with the coded output combination of the counter 82. A signal will be issued by the comparator 84 at all points of agreement between the coded output combination of counter 82 and the 64 character register 56 contents. In response to this agreement signal the 9 bit inserter 88 will produce a signal which will insert a 9 bit into the 9 bit position of the character itself as it circulates in the register 56. The 9 bit signal will also actuate the mark control 90 which alerts read-in gates to permit the setting of a core in the agreement matrix 92 corresponding to the storage locations in which such agreement was found. Thus, during the entire odd sprocket time, the contents of register 56 will be read and compared against the coded output combination of counter 82 and the agreement matrix set up. Upon receipt of the even sprocket corresponding to the even row of the character A, the agreement matrix 92 will be sensed in response to the print control 98 which will actuate the odd print control read out device to permit the setting of an odd hammer position in the columns where such an agreement was found. As soon as the printout has taken place, the agreement matrix 92 is cleared and the contents of the 64 character even register 58 is compared against the coded output combination of counter 82. The agreement matrix 92 is then used to store indications of agreement between the even row of a particular character and the content of the even register 58. Again in the following odd sprocket period, the positions of agreement in the agreement matrix 92 will be used to actuate even hammers and thus print out in the even columns those places where the A has been found. The latter portion of the odd sprocket which now corresponds to the odd line of the letter B (which is assumed to follow the A in the normal arrangement of the type character wheel), the 64 character odd register 56 will again be searched to find those corresponding positions where the letter B is stored.

This comparison procedure will continue a number of times to assure that all characters stored within the 64 character store have been printed out, however, as set out above, multiple reprinting of a character is not permitted due to the presence of the 9 bit in the character itself. The device to prevent such multiple printing is the 9 bit detector 100 which is employed to sense presence of 9 bits in the storage locations of the 64 character odd and even registers 56 and 58 and issue a pulse to the mark control 90 which will prevent marking of the agreement matrix 92 at those positions where a 9 bit has been found. In this manner, with the core corresponding to this character not set it is assured that in the following readout of the agreement matrix 92, this character will not be again printed. The operation of comparison, setting of the agreement matrix and print out continues for a length of time sufficient to permit all the characters in the 64 character odd and even registers 56 and 58 to be printed out on the line, thus giving full 128 character print lines.

The operation of printing is ended by use of an end of the line all 9's detector 102. This device senses that there are nine bits in each of the 9 bit locations within the 64 character odd and even registers 56 and 58 and generates an end of line or EOL signal. This end of line signal is introduced to the action complete flip-flop 54. The action complete flip-flop 54, just as it had in response to an end of paper feed signal, will cause the counter control matrix 28 to set the stature counter 30 to its initial zero condition. In addition the action complete flip-flop 54 issues a signal indicative that the device is now capable of carrying out a further instruction as desired by the central processor.

The timing of the overall device is controlled by a unit known as a cycling unit 104. The cycling unit may be a tapped delay line, with its final output fed to input to permit continuous recycling. The cycling unit is started in response to the insertion of a clock pulse from the clock of the central processor when the synchronizer is turned on and the cycling unit is turned off in response to a reset pulse from the central processor. The taps of the cycling unit are arranged to produce nine evenly spaced pulses, *t*0 to *t*8 of equal duration.

FIGURE 4 illustrates the output pattern for the stature counter 800 which is the main control for the high speed print synchronizer and is responsible for controlling the transfer of information to and within the synchronizer. The stature counter 800 is illustrated in FIGURE 8 and described in detail below. Briefly the stature conuter 800 is a three-stage counter arranged to count according to the Gray Code. The Gray Code is so chosen that each succeeding count pattern varies from the preceding count pattern by only a single position. There is no place where two successive count patterns vary by more than one position. For example, for stature 3 the count pattern is 010, reading from least significant position to the most significant position. For the next count, stature 4, the count pattern is 011. Thus only the most significant position has been changed. This is in distinction to the usual binary code in which a change from 3 (110) to 4 (001) is a change in all three positions.

To produce outputs in accordance with the Gray Code, the counter 800 is constructed of three individual flip-flop stages without interconnection between the stages for carrying propagation between the individual stages. The individual flip-flops are set and reset by inputs to their respective set and reset terminals derived from a control matrix to be described below.

Turning again to FIGURE 4, the first column, titled, stature illustrates the eight status states, zero to 7, in which the counter may exist. Columns two through four illustrate the outputs of the flip-flops FF1 (least significant order). FF2 and FF3 (most significant order) for the status states 0 to 7.

SPECIFIC STRUCTURES—STATURE COUNTER CONSTRUCTION

Referring now to FIG. 8, there is shown the structure of the stature counter 800, briefly outlined above. The stature counter 800 consists of three stages 802, 804, and 806, and counts according to the Gray Code. Each of these stages is an individual flip-flop having set and reset inputs and outputs and with no provision between individual flip-flop elements for the propagation of carry or borrow signals. The output of the counter 800 is fed to a matrix 808 of well known type, which is used to detect the outputs of the three respective flip-flops and to produce eight discrete levels from zero through 7. These signals are known as stature signals ST0 through ST7.

The various counting gates for controlling the inputs of the counter are arranged in the matrix as shown in the lower portion of FIG. 8. The counter 800 is initially set to a clear condition by a signal ACP from the action complete flip-flop 54. This flip-flop 54 is set by the output of an OR circuit 810 in response to (1) a signal designated EOL meaning end of the line and issued by the end of line or all 9's detector 102 or (2) end of paper feed signal EOPF provided by end of paper feed control unit 52.

After sufficient time has elapsed to permit the counter 800 to assume the reset condition and produce the stature signal ST0, the action complete flip-flop 54 is reset by the stature signal ST0 to prevent unwanted further clearing of the stature counter 800.

The stature signal ST0 (000) is generated for an indefinite period of time during which the synchronizer is readied to execute further instructions. The readying procedures include the clearing of synchronizer components to desired initial conditions. These include: (1) Setting the Y counter 96 of the agreement matrix 92 to a count condition of 16. The Y counter 96 is a four stage binary counter capable of counting from 1 to 16. No provision is made for a zero or idling state for the counter, hence the carry from the 16th count condition upon the receipt of the 17th pulse will cause the counter to go to a count of 1. Thus by presetting the Y counter 96 to 16 the first input will be registered as 1. Presetting the counter to 1 would produce an erroneous result in that the first count pulse would place the counter in its second count state, that is a count of 2. (2) Setting the paper feed line counters 48 to zero. This is to insure that the following instruction portion designating the number of lines of paper feed is not affected by any residual values in the counter from the previous operation. (3) Setting the X counter 94 of the agreement matrix to a count condition of 1. The X counter 94 is a four stage binary ring counter arranged to produce four discrete outputs 1 to 4. No provision is made for a zero, so the same problem exists as was described above with reference to the Y counter 96. To overcome this problem of the erroneous count the X counter 94 is set to a count condition of 4 at a later time by a further signal, before any count pulses are received. This will be described below. (4) Resetting the ready flip-flop 1200, to insure that a false signal, indicative that the device is ready to print, is not produced. The ready signal will be generated at a later time, as will be set forth below, when a comparison is found to exist between the coded output combination of code wheel counter 82 and information in one of the 64 character registers 56 or 58. The ready signal signifies that the print out of information stored in the buffer registers 56 and 58 may begin. (5) Clearing the 9 bit registers 38, 40, 42 and 44 to zero. (6) Clearing the agreement matrix 92 by employing the stature signal ST0 as a print signal, to cause the agreement matrix 92 to be read out and cleared. (7) Resetting the flip-flop 1208 of FIG. 12, which controls the print-odd and print-even signals. Thus during the resetting read out of the agreement matrix 92, no print hammer may be actuated to erroneously print out the values cleared from the agreement matrix 92. (8) Resetting flip-flop 476 of FIG. 6, to remove the PMCSD signal which enables printing to take place. The PMCSD signal is not generated until paper advancing has been completed and the paper stabilizing delay has expired. The PMCSD signal operates in conjunction with the comparison signal 9 bit to permit setting the agreement matrix 92 and the insertion of the 9 bit in the associated character. And (9) causing the generation of the signal STA0 by the And circuit 812. The And circuit 812, receives in addition to the stature signal ST0, the signal ITLK produced by the stand-by flip-flop 24. The signal ITLK indicates that there is now an instruction available in the stand-by location, in memory 8 assigned to the printer for the printer to carry out.

The STA0 signal produced by And circuit 812 is applied to set the clear flip-flop 60. The clear output CLA thus produced is applied to both of the 64 character buffer registers 56 and 58 to delete or clear the contents of the registers, preparatory to receiving new information for print out. As has been described above, the clear signal from flip-flop 60 will continuously be applied to the registers 56 and 58 up to and including the time of transfer of the print instruction to the buffers. The print instruction is handled in the same manner as any other information received by the synchronizer and thus is transferred to the buffers prior to printing of the desired information. It is not, however, desired to print this instruction, thus it is deleted as it enters the buffer.

The STA0 signal is also applied to the Or circuit 840 which passes its output to one of the inputs of the And circuit 834. The And circuit 834 is also responsive to a *t*7 signal from the cycling unit 104 and the output of the NINZ flip-flop 66 (the manner of generation of this signal will be described below). The And circuit 834 also has an inhibitory input which receives inhibiting signals from a further And circuit 836. The circuit 836 receives inputs of stature signal ST5 and $\overline{\text{LI8}}$ which indicates a paper advance operation only will take place. The And circuit 836 will thus prevent And circuit 834 from producing the request memory or RM5 signal during stature 5 if only a paper advance has been called for by the instruction.

Absent the inhibitory signal of And circuit 836, And circuit 834 produces an RM5 signal which at this time is a request for an instruction stored in the standby location of the memory 8 for the printer to execute. The RM5 signal is applied to the priority control 34 as well as to one input of the Or circuit 814. The output of the Or circuit 814 sets stage 802 of counter 800 causing the counter to be stepped to stature 1 producing stature signal ST1 (100). It should be noted that STA0 extends from the time of reset or when the standby flip-flop 24 is set until the following t7 time when an RM5 signal can be generated.

Stature 1 exists for a variable length of time, in that it is the period during which the synchronizer waits for access to the memory as evidenced by receipt of the GR5 signal. Once priority or access to the memory has granted, the GR5 signal will be effective along with the ST1 signal and timing signal t3 to cause the Or circuit 818 to which they are connected, to issue a signal. The signal from Or circuit 818 causes stage 804 of counter 800 to be set and produce a one output. Thus as a result of the granting of memory access the stature counter is advanced from the idling stature 1 to a further stature 2.

The stature signal ST2 (110) is generated as a result of the counter 800 being advanced to stature 2. Stature 2 will extend for a fixed length of time equal to one minor cycle, as defined above. During this stature count an instruction which had previously been placed in the CCS register 36 is read into the 9 bit registers 38, 40, 42 and 44. The information passes from CCS register 36 via And circuit 1370 (see FIG. 13) in a 4 bit parallel mode (1 bit of each of the 4 characters of the stored word) to a set of output lines L1 to L4. These lines connect with the input And gates 310, 314, 318 and 322 of the 9 bit registers 38, 40, 42 and 44. The second input to each of these gates is supplied by Or circuit 832, which produces a signal ST26 in response to the stature signal ST2 applied to it.

Further the contents of the 9 bit register 38, that is bits 19 through 24, are used to set the paper feed counter 48 to indicate the number of lines of paper which are to be advanced in the following operation. Paper advance starts immediately in response to the PPZ output of the paper feed counter 48 which operates the brake and clutch control 51. Paper feed will continue until the counters 48 go to zero at which time $\overline{PPZ}$ is generated. Paper feed can continue through stature counts 2, 3, 4 and 5. In addition bit 18 of 9 bit register 42 is sensed by the print control device 50 to determine if a paper advance only or paper advance and print are called for by the instruction. As explained above a zero in the 18th bit position will fail to set print control device 50 and an $\overline{L18}$ signal will be produced to indicate paper advance only. If the 18th bit is a one, print control device 50 will be set to produce an L18 signal indicative of paper advance and printing both.

The bits 1 to 15, which constitute the L address portion of the instruction are read from the CCS register 36 (FIG. 13) via the And circuit 1372, the Or circuit 1374 to the memory address counter 46, where they are stored until required. The manner in which the transfer is made and in which the contents of the MAC46 are employed will be described in detail below.

At time t3 after the start of stature 2 with stature signal ST2 present, the Or circuit 816 responsive to these two conditions will cause stage 802 of counter 800 to be reset to the zero state. Thus the counter 800 will be advanced to stature 3.

Stature 3 will produce stature signal ST3 (010) for a fixed length equal to one minor cycle, terminated by the following t3 timing signal. During stature 3, character 1 odd stored in 9 bit register 38 is transferred to the odd 64 character register 56. At the same time character 2 even, stored in 9 bit register 42 is transferred to the even 64 character register 58. As stated above, the paper advancing may continue as long as the PPZ signal is provided by counters 48 to the brake and clutch control 51. The output of the brake and clutch control 51 produces a brake signal which releases the paper advance mechanism brake and a clutch signal to engage the paper advance mechanism clutch.

Upon the arrival of the t3 timing signal, and circuit 842, response to both the ST3 and t3 signals produces an output which sets stage 806 of counter 800. The stature counter 800 is thereby placed in stature 4, in which it produces stature signal ST4 (011). During the one minor cycle stature 4 obtains, character 3 odd is transferred from 9 bit register 40 to the odd 64 character register 56. At the same time character 4 even, stored in 9 bit register 44, is transferred to the even 64 character register 58. When timing signal t3 arrives during stature 4 the stature counter 800 will be advanced to stature 5. This counter advance is accomplished in the following manner: Or circuit 814 is made responsive to the signals indicative of stature 4 (that is ST4) and timing signal t3 to produce an output to set stage 802 of counter 800.

Stature 5, during which stature signal ST5 (111) is produced, extends for an indefinite period in a manner analogous to stature count 1. The exact events which take place during stature 5, will depend upon the content of the print control device 50. Namely it will depend upon whether the output of print control device 50 is $\overline{L18}$ (zero) or L18 (one).

In the event the $\overline{L18}$ signal (paper advance only) is available from device 50, the operation of the synchronizer will be terminated as soon as the paper feed counter 48 reaches zero and generates the $\overline{PPZ}$ signal. The end of paper feed control 52, responsive to the $\overline{PPZ}$ and $\overline{L18}$ signals, as well as stature signal ST5 and timing signal t5, will produce the end of paper feed or EOPF signal which is applied to one input of Or circuit 810. The output of Or circuit 810 is employed to set the action complete flip-flop 54, which as described above causes termination of the present operation and resetting of the stature counter 800. To further insure that the synchronizer cannot proceed along the printing routine, the stature signal ST5 is applied to And circuit 836 along with the $\overline{L18}$ signal. The output of the And circuit 836 is applied to the inhibitory input of the And circuit 834 to prevent the generation of the request memory or RM5 signal. The synchronizer is now ready to accept further print instructions.

During stature 5 when the stature signal ST5 is available regardless of whether a print operation takes place or not, the 9 bit registers 38, 40, 42 and 44 are cleared. The stature signal ST5 is applied to the Or circuit 306 (FIG. 5), which applies inhibitory inputs to And circuits in the recirculation paths of each of the respective registers. For example, in 9 bit register 38, the inhibitory output of Or circuit 306 is applied to the inhibit input of And circuit 304. When the inhibitory input is present And circuit 304 is ineffective to pass the output of delay 302 to the Or circuit 308, thus effectively destroying the contents of register 38. The registers 40, 42 and 44 are cleared in a similar manner. Stature signal ST5 as well as the $\overline{L18}$ signal and timing signal t7 are applied to And circuit 417 (FIG. 5) to produce a signal which is passed through Or circuit 415 to reset the clear flip-flop 60. In addition the stature signal ST5 is applied to one input of And circuit 830, the other input of which receives a timing signal t4. The And circuit 830 produces the reset standby flip-flop signal RSSB which is applied to the standby flip-flop 24. This now makes the standby location available for the receipt of further instructions for the printer.

In the event, however, that the L18 signal (paper advance and printing) is available from device 50, further requests for access to the memory must be made. These further requests are to obtain information to be printed out as distinguished from the previous memory request (made when the STA0 signal was available) which was for an instruction for the printer to execute. These memory requests are also initiated by the RM5 or request memory signal from the And circuit 834.

The stature signal ST5 is applied to one input of Or circuit 840. The output of Or circuit 840 is applied to a first input of And circuit 834. A second input of And circuit 834 is supplied by the NINZ flip-flop 66. The manner of operation of flip-flop 66 will be described below. The third input to And circuit 834 is a $t7$ timing signal. The final input is supplied by the And circuit 836. As was described above, this input is an inhibitory one, to prevent a memory request for print out information when the instruction requires a paper advance only. The And circuit 836 will fail to produce an output to inhibit And circuit 834, due to the absence of the $\overline{L18}$ signal. Thus And circuit 834 will issue the RM5 signal. The RM5 signal may be issued as soon as the required inputs to And circuit 834 are present without regard for whether or not the paper feed operation is in progress. Thus as will be set forth below, the buffers may be loaded while paper feed continues.

The RM5 signal from And circuit 834 is applied to the priority control device 34 in the same manner as the first RM5 signal. The request for memory access will be granted when no device of higher priority requires access to the memory.

The RM5 signal is also applied to the Or circuit 814 in order to set stage 802 of the counter 800. In that stage 802 is already set, the signal RM5 is ineffective to change the output of stage 802.

After the priority control device 34 has determined to grant access to the memory to the print synchronizer, but before the signal GR5 indicative of the memory access grant has been generated, the signal PR5 is generated. The PR5 signal in conjunction with the stature signal ST5 and suitable timing signals serves to gate out the contents of the memory address counter 46. The contents of MAC46 are transferred via And circuit 1376 (FIG. 13), Or circuit 1304, delay 1314, pulse former 1316, adder 4 to the address shift register 6. The adder 4, adds a zero to the value entered so as not to alter the MAC46 contents at this time. The addition of a zero is controlled by the first call flip-flop 1360 which is active to prevent incrementing of the MAC46 contents on the first pass to the address shift register. This permits the first address to be selected at the specified L address and not at the L address +1. The other inputs to the respective circuits will be described below.

The memory 8 is addressed by the address shift register 6, to the address specified by contents of the MAC46. The contents of the specified memory 8 location will be transferred via lines 1366 to the And circuit 1368 to the CCS register 36 where it will be stored until the time it can be transferred to the 9 bit registers 38, 40, 42 and 44.

When the memory access grant is completed, the GR5 signal will be generated by the priority control device 34. This GR5 signal in conjunction with the stature signal ST5 and a timing signal $t3$ is responsible for resetting stage 804 of counter 800 via the line 844. As a result of setting stage 804 to zero, the signal pattern indicative of stature count 6 is produced. Stature signal ST6, produced during stature count 6, is represented by outputs of 101 from stages 802, 804 and 806 respectively, as shown in FIGURE 4.

During stature count 6, the first call flip-flop 1360 (FIG. 13) is reset so that the contents of MAC46 may be incremented by one each time it is passed through adder 4 to select words stored at successive memory addresses. The stature signal ST6 is also applied to one input of Or circuit 832 to produce the signal ST26. The signal ST26 is applied to input And circuits 310, 314, 318 and 322 to permit the contents of the CCS register 36 to be transferred to the 9 bit registers 38, 40, 42 and 44, as set out above. It should be recalled that during the transfer of the contents of the CCS register 36 to the 9 bit stores, the timing signal $t2$ is employed to place a one in the 8th bit position of the characters placed in 9 bit registers 38, 40 and 44.

The stature counter 800 remains in the stature count 6 position for one minor cycle, and upon the arrival of the $t3$ timing pulse is advanced to stature count 7. The resetting of stage 802 to change the output pattern of counter 800 from stature signal ST6 to ST7 is accomplished by means of Or circuit 816. Or circuit 816 is responsive to the stature signal ST6 and timing signal $t3$. The stature signal ST7 output pattern as shown in FIGURE 4 is 001.

Stature count 7 for the first cycle of the stature counter 800's operation is quite different from stature count 7 for all succeeding cycles of counter 800. Stature 7 on the first cycling of counter 800 exists for only a single bit time. Stature signal ST7 is applied to And circuit 820 along with the output signal CLA of the clear flip-flop 60 and the timing signal $t4$ to cause And circuit 820 to generate the signal CLB. The signal CLB is applied to Or circuit 766 (FIG. 7) to produce a signal to set flip-flop 756 causing the X counter 94 to be placed in count condition 4. This, as set forth above, will permit the counter to go to a count of 1 upon receipt of the first counting pulse. The CLB signal is also applied to And circuit 828 along with timing signal $t4$ to cause the generation of signal SFT4. Signal SFT4 is applied to Or circuit 417 which passes a signal to the clear flip-flop 60 to reset it. Thus any further words passed to the buffer registers 56 or 58 will be retained and recirculated therein. The CLB signal is also passed to Or circuit 822 to generate a signal on line 824 which is applied to reset stage 806 and set stage 804 via Or circuit 818. Thus the stature counter 800 has been returned to the stature count 3 condition.

The counter 800 will then be stepped again through the stature steps 3 to 7. At stature 3, the information stored in the 9 bit registers 38 and 42 during the previous stature 6 will be transferred to the buffer registers 56 and 58. At stature 4, to which the counter is stepped in the manner described above, the contents of 9 bit registers 40 and 44 also entered during the previous stature 6 will be transferred to buffer registers 56 and 58. The counter is then stepped to stature 5 again as described. At stature count 5 on the second and all subsequent cycles no determination need be made as to the type of operation to be performed. During stature count 5 a request for memory is made and the word found at the address stored in MAC incremented by one is placed in the CCS register 36 as described. Upon receipt of the GR5 signal, indicating a grant of the memory access request, the stature counter is advanced to stature count 6 and the contents of the CCS register 36 is transferred to the 9 bit registers 38, 40, 42 and 44. At time $t3$ during stature count 6 a signal is passed via Or circuit 816 to reset stage 802 of counter 800 advancing the counter 800 to stature count 7.

Stature count 7 for the second and all subsequent cycles of the stature counter is of a long duration, equal to the time required for the 8 bit positions of character 3 odd and character 4 even of the last word entered into buffer registers 56 and 58 to reach the outputs of delays 362 and 388 (FIGURE 5) in registers 56 and 58 respectively. This duration will vary with the number of words circulating in the registers 56 and 58.

During the second and all subsequent cycles of stature counter 800, the And circuit 826 will be employed to determine when the stature counter 800 will be recycled. And circuit 826 receives the stature signal ST7, a timing signal $t4$ and a pair of signals OD64A and EV64A. The signal OD64A is the output of delay 362 of buffer register 56 (FIGURE 5). The signal EV64A is the output of delay 388 of buffer register 58 (FIGURE 5). The signals OD64A and EV64A indicate that a one is present in the 8 bit position of character 3 odd and character 4 even in the buffer registers 56 and 58. As will be recalled from the discussion above of the 8 bit notation, a one can only occur in these positions when the word is the last word entered into the buffer registers. Thus it is desired to immediately enter the next word into the buffer registers and delete the 8 bit in character 3 odd of the detected word so that it no longer appears as the last word stored. The transfer of the word stored in the 9 bit registers into the 64 character buffer register is accomplished by recycling the stature counter to stature count 3. The recycling is caused by the output of And circuit 826, called the STA7 signal, being applied to Or circuit 822. As described above the output of Or circuit 822 cases stage 806 to be reset and stage 804 to be set. With the stature counter returned to stature 3 the transfer of characters from 800 to the 9 bit registers to the 64 character stores can take place as described.

The STA7 signal generated by And circuit 826 is also applied to an inhibitory input of And circuit 368 (FIGURE 5) to prevent passage of the recirculating bit through And circuit 368. In that the 8th bit of character 3 odd of the last entered word is attempting to pass And circuit 368 at this time it will be deleted. Thus as the new word is entered, the 8 bit notation of the previously last entered word is changed.

The cycling of the stature counter 800 will continue until both buffer registers 56 and 58 have been filled and there are stored therein the 128 characters required to print a full line. It should be remembered that two characters are entered into each buffer register 56 and 58 for each cycle of the stature counter. Thus a total of thirty-two memory requests for data must be made. To determine whether a further data memory request should be made the all 8's detector 67 is employed.

The all 8's detector 67 consists of an And circuit 838 and a flip-flop 66. The And circuit 838 receives a timing signal $t4$ and the signals $\overline{OD64A}$ and $\overline{EV64A}$. These signals are derived from the same components as the signals OD64A and EV64A. If a one is present in the 8 bit position sensed at time $t4$, the signals will be OD64A or EV64A. If a zero is present the signal will be $\overline{OD64A}$ or $\overline{EV64A}$. A one found in either buffer register 56 or 58 at this time indicates a character is stored. If the character is not the last stored the signals $\overline{OD64A}$ and $\overline{EV64A}$ will be present. If the character is the last stored the signals OD64A and EV64A will be present. Since the And circuit 838 requires both $\overline{OD64A}$ and $\overline{EV64A}$ it cannot produce an output to set the flip-flop 66. The flip-flop 66 cannot produce the NINZ signal (the set output) to permit And circuit 834 to produce the request memory signal RM5. Thus no further words can be transferred to the synchronizer, since there is no space available in the buffer registers 56 and 58.

If a one cannot be found in either 8 bit position being sensed at time $t4$, then the signals $\overline{OD64A}$ and $\overline{EV64A}$ will be generated. These signals as well as the $t4$ timing signal are applied to And circuit 838. And circuit 838 will produce an output to set the NINZ flip-flop 66. The flip-flop 66 will produce the NINZ signal which is applied to And circuit 834 to cause, in conjunction with the other inputs, the generation of the RM5 signal. Thus additional words may be requested from the memory due to available storage space in the buffer registers 56 and 58.

The NINZ flip-flop 66 will be reset to terminate the generation of the NINZ signal by the $t0$ timing signal. In this manner, the flip-flop will be ready to receive any output from And circuit 838 which would occur at the $t4$ timing signal. It can be seen that the NINZ flip-flop 66 will remain reset to prevent word transfers as long as no space exists in the buffer registers. Transfers to the buffer registers will thus be terminated when no storage space to receive additional words is available therein.

To summarize the operation in a general manner:

(1) If a paper advance only is called for, the stature counter advances from count 0 to count 5, from which it returns to count 0 again. Paper advance starts at count 2 and continues until completed. When paper advance is complete, the synchronizer operation is terminated and the synchronizer can accept further instruction.

(2) If a paper advance and print operation is called for the stature counter advances from count 0 to count 7 and then recycles from count 3 to count 7. On the first cycle, at count 2, as in the paper advance only, the paper advance starts. The buffer loading operator begins as soon as the stature counter reaches count 5 if the L18 signal is present. The paper advance continues during buffer loading until the required number of lines have been advanced. Once the paper feed stops and the stabilizing delay expires, the print out of the buffer contents may begin despite the fact that the buffers are still being loaded.

Buffer loading stops when all 8's are detected. Printing terminates when all 9's are detected as will be described below.

RECIRCULATING REGISTERS

Nine bit registers 38, 40, 42 and 44

Referring now to FIGURE 5, the manner of construction of the four nine bit registers 38, 40, 42 and 44 is set forth. All of the nine bit stores are constructed in the same manner and thus only the nine bit register 38 has been shown in detail. The register 38 comprises a one bit delay 300, of a type well known in the art, connected in a ring with a further delay element 302 of 8 bit duration. The output of delay 302 is fed to a first input of a recirculation AND gate 304. A second input to the AND gate 304 is an inhibit input supplied by the output of an OR circuit 306. Thus, if there is no inhibit input present to the second input of the AND circuit 304, the contents of the register 38 as read from the delay element 302 will be recirculated in the path to be described. In the event, however, that there is a signal to the input of the OR circuit 306, the recirculating of the information from the output of the delay 302 will be halted. The inputs to the OR gate 306 consist of the stature signals ST0 and ST5 of the stature counter 800 (FIG. 8). As has been described above with reference to the manner of operation of the stature counter 800, the stature signal ST0 causes the initial clearing of all the nine bit registers. Further, since all the information is transferred from the 9 bit stores to the 64 character registers at stature counts 3 and 4, it is desirable that the stature signal ST5 cause the clearing of the contents of the 9 bit registers so that they may receive further information during stature 6.

The output of the AND gate 304 is fed to one input of an OR gate 308. The second input to OR gate 308 is the $t2$ signal occurring at time period 2 which, as described above, will be used to insert a one bit in the 8th bit time slot of the incoming word. The third input signal to the OR gate 308 is derived from the output of the input AND gate 310. The inputs to the input AND gate 310 consist of the signal ST26, which, as described above is generated during the stature counts 2 and 6 corresponding to the time it is desired to transfer information from the CCS register 36 to the 9 bit registers. The second input to the AND gate 310 is a signal bit line designated LL1 which is employed to conduct bits 19 to 24 from the CCS register 36 to the nine bit register 38. The output of the OR gate 308 furnishes the input to the delay element 300. An output line 312 from the delay element 300 is funished at the serial connection between the elements 300 and 302.

Construction of the nine bit registers 40, 42 and 44 is similar to that described with reference to FIGURE 9 bit register 38. The one exception is that 9 bit register 42 has no provision to receive the $t2$ timing signal. As has been described above with reference to the 8 bit coding arrangement, the second character of each word is not used in the 8 bit detection scheme and therefore, no 8 bit is inserted in this position. The output of the 9 bit register 38 is supplied over a line 312 to the input gate of the odd 64 character recirculating register 56. In addition, the same signal content at the output of the 9 bit register 38 constitutes the AP signal which is fed over the line 328 to the input of the paper feed counter 48 in the manner to be described below. The output of 9 bit register 40 is read over line 316 to odd register 56 whereas the output of the nine bit register 42 is read over line 320 to the input of a 64 character even register 58. In addition, the 18th bit stored in the register 42 which is designated the P signal is read over a line 330 to the input of the print control element 50 (FIGURE 5). Finally, the output of 9 bit register 44 is read over a line 324 to the input of the 64 character even register 58.

*The 64 characters recirculating storage registers 56 and 58*

The 64 character registers 56 and 58 are each capable of storing 64 characters composed of 9 bits each or a total of 576 bit positions at one time. The odd 64 character register 56 is composed of a first delay element 350 with a delay of one bit time, the output of delay element 350 provides a signal on a first line 352, the signal being designated OD64B. The output of the delay 350 is also conducted over a line 353 to a delay element 354 of 574 bit delay times. The output of the delay element 354 is fed to one of the inputs of an OR gate 356. The second input to the OR gate 356 is derived from an output of an AND gate 358 which receives the stature signal ST3 at a first of its inputs and on the second of its inputs receives the output of the 9 bit register 38 via the line 312. A third input to the OR gate 356 is the output of another AND gate 360. This AND gate 360 has inputs which comprise the stature signal ST4 and the output of the 9 bit register 40 along the line 316. As has been noted above, a 64 character registers are loaded from the 9 bit registers during the stature counts 3 and 4. Thus, a first input will be fed to the 64 character register 56 via the gate 358 during the stature count 3 and via the second AND gate 360 during the stature count 4. The AND gate 356 further receives the odd sprocket signal produced by the binary counter 1030 (FIGURE 10) and generated in a manner to be described below. The output of the OR gate 356 is fed to a further delay element 362 which delay element is one bit time in duration. The output of delay element 362 is fed over a first line 364 as the signal OD64A, and also over the line 366 to one of the inputs of an AND gate 368. The second input to the AND gate 368 is the inhibitory input CLA which is the output of the clear flip-flop 60. Thus, if the clear signal CLA is present, the information will be prohibited from recirculating within the 64 character register and will thus effectively be deleted. The third input to the AND gate 368 is a signal designated STA7. This signal, as has been described above, is employed to delete the 8th bit contained in the 3rd character of each word in the memory upon the entrance of a subsequent word into the 9 bit register, which word will be transferred to the 64 character registers in a following period. The STA7 input, appearing for one bit time only, is an inhibitory input and if present will prevent the transferral of the 8th bit of the 3rd character through AND gate 368. The output of the AND gate 368 is fed to one of the inputs of an OR gate 370, the output of which is conducted to the input of the one bit delay element 350. The second input to the OR gate 370 is the output of an AND gate 372. The inputs to this AND gate 372 consist of a timing signal t5, the nine bit signal CPOK, which is the signal generated by AND gate 940 (see FIGURE 9) as a result of the comparison between the code wheel counter 82 (FIGURE 10) and the signal character found in one of the registers 56 or 58. The last input to the AND gate 372 is the odd sprocket signal produced by binary counter 1030 (FIGURE 10). By means of the AND gate 372 it is possible to insert a signal in the 9th bit time slot of a character to indicate that a comparison has been found and that the agreement matrix (FIGURE 7) has been set to permit printing in the manner to be described below.

The 64 character even recirculating register 58 is constructed in the manner analogous to that of the 64 character odd recirculating register 56. It is composed of a delay element 374 of one bit duration which produces an output on the line 376, the signal being designated EV64B. The signal output of the element 374 is also conducted via the line 378 to a further delay element 380 which is 574 bit times in duration. The output signal of this delay is fed to an OR gate 382 which receives inputs from an AND gate 384 which is active during stature count 3 to transfer the contents of 9 bit register 42 via the line 320. The OR gate 382 also receives the output of a further AND gate 386 which is active during stature count 4 to transfer the contents of the 9 bit register 44 via the line 324 to the 64 character even register 58. Additionally the OR gate 382 receives the even sprocket signal from binary counter 1030 of FIGURE 10. The output of the OR gate 382 is fed via a one bit delay element 388 to provide outputs on line 390 indicative of the signal EV64A and further to one input of an AND gate 392. The second input to the AND gate 392 is the inhibiting input CLA which is a clear signal serving to clear the contents of the 64 character register at the beginning of a new cycle of operation. AND gate 392 differs from its counterpart AND gate 368 of odd register 56 in that no provision is made for the application of the inhibitory signal STA7. This is due to the 8 bit coding scheme used wherein 8 bits are not removed from any even character positions. The output of the AND gate 392 is fed to one input the OR gate 394, the output of which is entered into a delay element 374. A further input is received by the OR gate 394 from an AND gate 396 which has inputs of timing signal t5, nine bit signal CPOK (see FIGURE 9), and the even sprocket generated by binary counter 1030 (FIGURE 10). These signals act in a manner as described with reference to the odd 64 character register to provide a bit in the 9th time slot of each character, when a comparison is found. The outputs of the 64 character odd recirculating register on the line 352 and the output of the 64 character even recirculating register on the line 376 are fed to the inputs of an OR gate 406, the output of which is introduced to the input of an AND gate 408. The OR circuit 406 is made responsive to the barred condition of both of these input signals. The barred condition of a signal (e.g. $\overline{OD64B}$) indicates that the absence of the signal is being detected for. Thus if the inputs to a particular gate are indicated as the barred inputs then the gate will function only when the signal is absent and the barred form is thus present. The gate will be inhibited when the signal is present and the barred signal is absent. Thus, if there are 9 bits present in the characters of the two 64 character registers being examined at this time, then the output OD64B and EV64B will be present and will not operate the OR gate 406 to produce an output to the AND gate 408. However, in the event that either of these signals or both are absent, indicating that there is no nine bit present in the character being examined, then an output signal will be furnished by the OR gate 406 to the input of the AND gate 408. The signal will occur at time t6 and therefore the AND gate 408 is clocked at that time. The output of AND gate 408 serves to set the end of line flip-flop 410 to produce a signal fed to the input of the AND gate 412. This output timed with a sprocket derived timing signal SPST2 generated by the sync flip-flop 1022 (see FIGURE 10) and t0 timing signal is the signal designated not end of the line or $\overline{EOL}$. This result is to be expected in that the OR gate 406 is only responsive to the absence of a 9 bit signal. If a 9 bit signal is absent, in one of the characters stored within the 64 character registers, it indicates (1) the storage location is empty or (2) that this character has as yet not been compared against the code wheel counter and a comparison found and thus the end of the line has not been reached. The end of line flip-flop 410 is reset by the output of AND gate 301 which responds at the time *t*4 to the signal SPST2. The reset output of the end of line flip-flop 410, is gated through AND gate 414 by the sprocket derived timing signal SPKTF generated by the sync flip-flop 1018 (see FIGURE 10) to produce the end of line signal EOL. Thus, in the normal mode of operation, at time period *t*4 (the beginning of any sprocket time), flip-flop 410 is first set to indicate the end of the line. As the registers themselves are searched, if there is any position at which a 9 bit is not found, the flip-flop 410 is placed in the set condition to cause the generation of the not end of line signal $\overline{EOL}$. If an entire recirculation of the characters in the 64 character registers can be completed without setting the flip-flop then the end of line signal will indicate that the operation is complete and will cause the Action complete flip-flop 54 to be reset terminating the cycle of operation.

PAPER FEED COUNTER 48 AND COUNTDOWN GATES 49

The paper feed counter 48, the countdown gates 49, and certain ancillary gating devices are illustrated in FIGURE 6. The paper feed counter 48 is essentially a 6 stage counting device having 6 flip-flops which are not connected to provide for carry propagations between the various flip-flops. Necessary borrow connections are taken care of by means of a series of countdown gates 49 which produce set and reset signals to the flip-flops of the counter 48 in accordance with the previous settings of the various flip-flops and the incoming signals. The paper feed counter 48 consists of a first flip-flop 446 which receives bit 24 of the instruction. The second flip-flop 447 receives bit number 23 of the instruction. Similarly, the next flip-flop 448 receives bit 22 whereas flip-flop 449 receives bit 21. Flip-flop 450 receives bit 20 and flip-flop 451 receives bit 19. Associated with the set side of the flip-flop 451 is an AND gate 440 which receives the time signal *t*5, the stature signal STZ and finally, the AP signal via line 328 from the 9 bit register 38 (FIGURE 5). Thus, at the time *t*5 of stature count 2 the bit 19 is gated through the AND gate 440 to an OR gate 462. An additional input to the OR gate 462 is provided the AND gate 467 of the countdown gates 49. The manner in which a signal will provide this gate will be described below. The output of the OR gate 462 is used to set the flip-flop 451 to its set condition. Thus, if there is a one in the 19th bit position of the instruction, the flip-flop 451 will be set. In a similar fashion, the flip-flop 450 receives the 20th bit of the instruction. The 20th bit is conducted over the line 328, during the time period *t*6 of stature count (represented by stature signal STZ) 2, through an AND gate 441, and OR gate 461 to the set terminal of flip-flop 450. The additional input terminal to the OR gate 461 is connected to the countdown gates (specifically AND gate 467) as will be described below. The flip-flop 449 receives the bit 21 at time *t*7 of stature count 2. This signal, with the *t*7 and STZ present, is passed through the AND gate 442 to the OR gate 460. OR gate 460 also receives an output of the AND gate 465 of the countdown gates 49.

The bit 22 is passed via AND gate 443 during time *t*8 of stature count 2 to the input of OR gate 459 where it passes to set the flip-flop 448. OR gate 459 also receives the output of AND gate 464 of the countdown gates 49. The bit 23 is permitted to pass through the AND gate 444 to the OR gate 458 during time *t*0 of stature count 2, to set the flip-flop 447. OR gate 458 also receives the output of AND gate 463 of the countdown gates 49. Finally, the 24th bit is permitted to pass through the AND gate 445 during time *t*1 of stature count 2 to set the flip-flop 446 in the event there is one bit in the bit position 24 of the instruction. The output of AND gate 445 is not passed via an OR gate to its associated flip-flop as are the other similar AND gates. The reason for this, is that once the flip-flop 446 (storing the highest order bit) has been reset it cannot again be set during the countdown of the contents of the paper feed counter 48. Each of the flip-flops 446 through 451 receive at their reset terminal signals from the countdown gates as well as stature signal ST0. The stature signal ST0 resets the count to the zero condition so that it may correctly register the number of lines of vertical spacing which will be contained within the next print instruction to be carried out. Thus, at each of the timing signals *t*5 through *t*1 of stature count 2, the various flip-flops 446 through 451 are set in accordance with the bits of the instruction which indicate the number of lines of vertical spacing. The set output signals of these gates designated L24, L23, L22, L21, L20, L19 are passed to an OR gate 470 which produces a signal designated PPZ. This signal PPZ indicates that there is a count other than zero existing in the paper feed counter 48. The PPZ signal is fed to one input of an AND gate 472 which also receives inhibitory inputs of CLA and ready. The CLA signal (produced by clear flip-flop 60 of FIGURE 5) provides that no paper advance can be made during the time that the device is being cleared and further, the inhibitory input of ready (produced by the ready flip-flop 1200 of FIGURE 12 and indicative that a comparison has been found between the code wheel counter 82 output and the contents of registers 56 and 58 and that the agreement matrix 92 has been set and a print step may begin) indicates that once the printing operation is ready to start there can be no further advance of paper during the print operation. When the signal PPZ finally terminates the OR gate 470 produces a $\overline{PPZ}$ signal, which will be introduced to the input of a ten millisecond delay element 474. It should be recalled that the barred notation ($\overline{PPZ}$) is used to indicate that the PPZ signal is not present. At the end of the ten millisecond period, delay element 474 will furnish a signal to the set input terminal of a flip-flop 476 whose set output will be a signal PMCSD. This signal PMCSD will be generated at a time when the paper mechanism has reached a static condition and the printing of information can be made without the possibility of a blurred or otherwise mutilated printing. In response to the signal provided by the AND gate 472, the brake will be released and the clutch will be engaged in the paper advance mechanism (not shown). As the paper is advanced one line at a time, a sprocket pulse will be generated by the paper advance mechanism which sprocket pulse is applied to line 478 to cause the countdown gates 49 to start counting the value stored in the paper feed counter 48 from its set value to zero. The value stored in the paper feed counter 48 will thus be diminished by one for each line the paper has been advanced.

The sprocket signal derived from the paper advance mechanism is provided over a line 478 to each of the countdown AND gates 463, 464, 465, 466 and 467 as well as an OR gate 457 for re-setting the flip-flop 451. The countdown gate 463 is connected to the sprocket signal on the line 478 as well as the barred outputs $\overline{L19}$, $\overline{L20}$, $\overline{L21}$, $\overline{L22}$ and $\overline{L23}$ for bit positions 19, 20, 21, 22 and 23. Thus, when the flip-flops which store the bits 19 through 23 are in their reset conditions producing their barred outputs, the arrival of the following sprocket pulse on line 478 will cause the AND gate 463 to provide an output signal which will reset the flip-flop 446 which stores the 24th bit. At the same time, the output of the AND gate 463 will also furnish a signal to the input of the OR gate 458 to cause the flip-flop 447 storing the 23rd bit to be placed in the set condition. The same sprocket pulse, applied to the AND gate 464 will attempt to reset the flip-flop 447. However, the makeup of the flip-flops which compose the paper feed counter 48 are such, that the set signal will override a reset signal, so as to render the reset ineffective to return the flip-flop 447 to its reset condition. It can be seen from FIGURE 6 that the AND gate 464 is responsive to the barred conditions of bit positions 19, 20, 21 and 22, in addition to the sprocket pulse. AND gate 464 passes a signal to an OR gate 453, thence to the reset terminal of the flip-flop 447 storing the 23rd bit. The output of AND gate 464, in addition, is passed to the input of an OR gate 459 used to set the flip-flop 448 which stores the 22nd bit. AND gate 465, employed to reset flip-flop 448, is also responsive to the sprocket pulse in addition to the barred conditions of the flip-flops in positions 19, 20, 21 to reset the flip-flop 448. However, due to the arrival of a setting signal from the output of the AND gate 464, the flip-flop 448 is set despite the attempted resetting by the OR gate 454. The output of AND gate 465 although ineffective to reset the flip-flop 448 is passed to the set terminal of the flip-flop 449 (storing the 21st bit position) through an OR gate 460. This signal will cause the flip-flop 449 to be placed in its set condition. A further AND gate 466 responsive to the barred conditions of the positions 20 and 19 and the sprocket pulse resets the flip-flop 449 storing the 21st bit via an OR gate 455. In addition, the output of AND gate 466 is also passed to the input of an OR gate 461 to place the flip-flop 450 storing the 20th bit position in the set condition. The attempted resetting of the flip-flop 449 by the output of the OR gate 455 is ineffective due to the presence of the output of the AND gate 465 setting the flip-flop 449. The AND gate 467 receives the barred output of the 19th position as well as the sprocket pulse and passes a signal to the input of OR gate 456 to attempt to reset the flip-flop 450. This signal is ineffective due to the presence of the output signal from the AND gate 466 which sets flip-flop 450. The output of AND gate 467, as in the previous stages, is also passed to the next lower stage, that is, the setting input of the flip-flop 451, employed to store the 19th bit. This signal overrides the attempted resetting by the sprocket pulse applied directly to the OR gate 457 connected to the resetting terminal of the flip-flop 451.

Thus, it can be seen when the flip-flop counter is in the state where the 24th bit position is a one and the positions 23, 22, 21, 20 and 19 are all in the zero condition, indicating a count of 32 and the following sprocket pulse arrives, it will cause the counter to register a count 1 less, that is a count of 31 binarily represented as 0 1 1 1 1 1. The incoming sprocket pulse will cause the resetting of the flip-flop 446 stored in the 24th bit. Each of the remaining countdown gates will cause the setting of the flip-flop in the next lower portion of the register, for example, the AND gate countdown gate associated with the flip-flop bit position 24 will provide an output which attempts to set a flip-flop in the next lower position. At the same time, a signal will be provided by that same position to reset the flip-flop, but due to the fact that the setting signal overrides the resetting signal the remaining flip-flops in the lower positions will be placed in the set condition. The arrival of the sprocket pulse on the line 478 will cause the flip-flops from positions 23, 22, 21, 20 and 19 to be placed in their set conditions indicating a count of 31. A similar sequence of events will be observed for each of the remaining counts of the flip-flops for the full range of counts from 63 down to the count of zero.

64 DIGIT AGREEMENT MATRIX 92

As has been described above, the 64 character agreement matrix 92 is used to store indications of positions where there has been found a comparison between the information stored in a 64 character recirculating register and the particular counter pattern indicative of the next character which will be printed. Thus, during an odd sprocket period, the 64 character agreement matrix is used to store indications of agreement between the character stored in the odd 64 character recirculating register 56 and the odd line of a particular type character. The agreement matrix is shown in FIGURE 7. The 64 bit position core matrix is arranged to have 16 cores along its "Y" dimension and four cores along its "X" dimension, that is the matrix is in the 16 x 4 configuration. The matrix operates on a coincident current scheme with approximately one half of the necessary switching current being provided by the X selection drivers and further one half by the Y selection drivers.

A plurality of Y selection gates 700, 702, 704 through 732 are used to produce signals on the Y drive lines Y1, Y2 through Y16. Each of these gates receives an output of the decoder matrix 734 and a further signal indicated as the 9 bit A signal on the line 736. The 9 bit signal is produced by the AND gate 946 (see FIGURE 9) upon the concurrence of the PMCSD signal from flip-flop 476 (see FIGURE 6) and the CP1D signal from the comparison circuit (FIGURE 9). The 9 bit A signal, to be described below, thus signifies that the paper advance mechanism is stabilized (PMCSD) and that a comparison has been formed between the register contents (registers 56 and 58) and the output of code wheel counter 82 (FIGURE 10). In that each of the gates 700 to 732 are AND gates it is only upon the coincidence of these inputs that the gate will produce an output capable of furnishing the Y portion of the selection current for switching a core.

The decoder matrix 734 which is of conventional type and may be a resistor or diode matrix for example, is driven by a binary counter 96 of conventional type. The counter 96 is a four-stage binary counter capable of producing outputs indicative of a count for the values of 0 through 15. These outputs are coupled to a decoder matrix 734 to produce one output, that is an output on a single line indicative of one of 16 discrete steps. Thus, for each count established in the Y counter 96 there will be a single line from the decoder matrix 734 operating a single one of the Y selection gates 700, 702, etc. The counter 96, as will be recalled from the discussion of the stature counter 800 (FIGURE 8) above, is initially set by the stature signal ST0 to a count of 16, that is, the last count value of the counter. This is to permit the first incoming signal to cause the counter to be reset to its initial stage. If the counter, had been set originally to a count of one that is its first stage, the first incoming signal would cause the counter to count to a count of 2 thus producing an erroneous count. Thus, at stature count zero, an ST0 signal is fed to the OR gate 740 to establish a count of 16 in the Y counter 96. The counter 96 is stepped by the output of an AND gate 742 which is responsive to the output of the X counter 94 and a timing signal $t4$. Thus, for each complete cycle of the X counter 94 a signal will be introduced to step the Y counter 96 at the next time $t4$. The counting sequence established by this manner of connection will be, the X counter will go through a complete count of one to four before the Y counter is stepped once. Thus, the storage locations employed for storing consecutive bits of information will be X1, Y1; X2, Y1; X3, Y1; and X4, Y1 and then X1Y2 etc.

The X counter 94 is made up of four flip-flops 750, 752, 754 and 756. They are arranged in a counting chain capable of counting four discrete steps. The setting of each particular flip-flop is accomplished by means of an AND gate associated with each one of the flip-flop stages. Thus, AND gate 758 is associated with flip-flop 750, AND gate 760 is associated with flip-flop 752, AND gate 762 is associated with flip-flop 754, and finally the AND gate 764 is associated with the flip-flop 756. Each of these respective AND gates 758 through 764 receives the set output of the previous flip-flop and a timing signal $t4$. AND gate 760 receives at one input terminal the set output of the flip-flop 750 and at its second input terminal the timing signal $t4$ to provide a setting signal for the flip-flop 752. In a similar manner the AND gate 762 receives the output of the flip-flop 752 and a timing signal $t4$ to set the flip-flop 754. The output of the flip-flop 754 is connected to one input of the AND gate 754 which also receives the timing signal $t4$. The output of the AND gate 764 is passed to an OR gate 766 to cause the setting of the flip-flop 756, the final flip-flop in the chain. The second input to the OR gate 766 is the signal CLB. The CLB signal sets the counter 94 to a count of 4, for the same reason that the Y binary counter 96 is set to a count of 16. The counter originally is cleared to zero by means of the stature signal ST0 applied to the reset terminal of all the flip-flops of the chain. The set output of the final flip-flop 756 as well as a timing signal t4, are impressed upon AND gate 758 associated with flip-flop 750. The signal CLB sets the counter 94 to a count of four, causing an input to be applied at one of the inputs of the AND gate 758 which at the following time t4 will cause the flip-flop chain to be set to its one condition. Each subsequent t4 signal will cause the flip-flop chain to advance and thus to produce outputs to the respective X selection gates 770, 772, 774 and 776. The t4 timing signal is used to advance the counter and make available a new storage position, because the 9 bit A signal is blanked out during time t4 and t5. Thus the t4 timing signal will make available the output of a counter stage at time t5 (it takes one bit time for the flip-flop to become stable and produce a usable output). And at time t6 when the 9 bit A signal is generated, the new storage position is partly selected for switching. The X selection gates 770, 772, 774 and 776 in the manner analogous to the gate 700 to 732 also receive the 9 bit A signal on line 736. The function of the 9 bit A signal has been described above and will be described in greater detail below. Thus, in order to set the cores, it is necessary that there by the 9 bit A signal to help trigger the gates 700 through 732 as well as the gates 770 to 776. With this signal (the 9 bit A signal) the outputs of the particular X and Y counter stages will be effective to set the associated core to indicate the location of a comparison.

To readout the agreement matrix 92, the signal PRT is employed to cause the readout of all of the cores in the matrix. The PRT signal is provided by delay flop 1220 (FIGURE 12) in response to the output of the ready flip-flop and the timing signal SP1CTF. The PRT signal as will be described in detail below, is made available at the start of the next comparison cycle to cause the print out of the results of the past print cycle. Each one of the cores has associated with it the readout gating configuration illustrated in the rightmost portion of FIGURE 7. Each core is separately connected by a line designated R0 to a set of AND gates, such as 780 and 782. The additional input to the gate 780 is provided by a signal PRTODA which means print odd and will thus cause a PRINT ODD signal to be produced at the output of the gate 780 to activate the odd print hammers associated with set cores. The PRTODA signal is produced by AND gate 1216 (see FIGURE 12) at the beginning of an even sprocket period to permit the cores which were set during the comparison between odd register 56 and the odd code wheel line to be read out. The PRT serves to switch the cores of the matrix while the PRTODA allows the outputs to actuate odd print hammers. In a similar fashion, the gate 782 receives as its second actuating signal a signal PRTEVA which produces an output designated PRINT EVEN to actuate the even print hammers associated with set cores.

The PRTEVA signal is produced by And gate 1214 (see FIGURE 12) at the beginning of an odd sprocket period to permit the cores which were set during the comparison between even register 58 and the even code wheel line to be read out. Thus the PRTEVA allows the contents of the cores switched by the signal PRT to be gated to and actuate even print hammers. The reason for signals PRTODA and PRTEVA is made more evident from the following general considerations. The 64 bit agreement matrix 92 is used to record first the agreements between the odd 64 character register 56 and the odd type wheel position and then the agreements between the even 64 character register 58 and the even line positions of the type cylinder. It is thus necessary to use the same agreement matrix twice. It is desired that during sensing of the odd type line and the odd register 56, that it only be possible that odd positions be printed. Further, during the even register 58 comparison it is desirable that only even print hammers be actuated. Thus, when the device has stored indications of agreement during the odd cycle, that is the odd register, as compared to the odd line of the code wheel counter, this information will be read out during the following period when the even sprocket pulse is available. The even sprocket will cause the generation of the PRTODA and in turn the PRINT ODD signal. In this manner, the information read out by the application of the PRT signal to all the cores will cause all the associated odd hammers to be actuated wherever an agreement indication has been stored in the matrix 92. During the following odd sprocket cycle when the matrix 92 is used to store the results of the comparison between the even register 58 and the even line of type, the PRTEVA signal will be generated during the odd sprocket time to cause the even hammers to be operated for those points of agreement. Thus, by use of this system of print-odd and print-even controls through the gates 780, 782, it is possible to use a single core during both the odd and even cycles and have it correctly control only the odd hammer or even hammer with which it should be associated.

THE COMPARATOR 84 AND SERIAL TO PARALLEL CONVERTER 86

The comparator 84 serves to compare the output of the code wheel counter 82 (see FIGURE 10) indicative of the next character available for printing and the information stored in one of the 64 character registers 56 or 58. In those positions in which an agreement is found, a signal indicative of this agreement will be generated and employed in the manner described below. The comparator as shown in FIGURE 9, consists of a set of input AND gates 900 and 902. To the inputs of AND gate 900 are applied the odd sprocket pulse from binary counter 1032 (FIGURE 10) and a signal OD64A. The signal OD64A is the output of the delay element 362 of the odd 64 character register 56 and serves to serially present the bits of a character circulating in the register. A signal will be produced at the output of the AND gate 900 when comparison is being made between the information stored in the odd 64 character register 56 and the code wheel counter 82 at an odd line position. Similarly, the inputs to the AND gate 902 are the even sprocket pulse from binary counter 1030 (see FIGURE 10) and a signal EV64A. The signal EV64A is the output of the delay element 388 of the 64 character even register 58 and serves to serially present the bits of a character circulating in the register. An output will be furnished by the AND gate 902 in the event that the even 64 character register 58 is being compared with the even type line. The outputs of the AND gates 900 and 902 are buffed in an OR gate 904 to produce the output signal 64LP which is distributed to a further series of AND gates 906, 908, 910, 912, 914 and 916, as well as an additional AND gate 918 and an untranslatable matrix 950. The AND gates 906 through 916 are employed as the actual comparison structure between the output signals of the 64 character registers 56 and 58 and the signals set up in the code wheel counter 82 (see FIGURE 10). In that the signals OD64A and EV64A are presented to the AND gates 900 and 902 in a serial fashion, the AND gates 906 through 916 serve to convert these serial signals to the parallel mode and to set the flip-flops 920, 922, 924, 926, 928, and 930 in accordance with comparisons which may be found.

The AND gate 906 is made responsive to the output of the OR gate 904, the first digit order CD1 of the code wheel counter 82 and a timing signal t6. Thus, the first pulse applied at the time t6 will be the lowest significant bit of the character being examined and the lowest significant bit of the code wheel counter output. In the event that agreement is found, the output of AND gate 906 will cause flip-flop 920 to be set. In a similar fashion, the AND gate 908 is responsive to the second bits of the character under examination and the code wheel counter at time *t*7. In the event that these bits are the same, a signal will be passed by AND gate 908 to set flip-flop 922. The AND gate 910 serves to test the comparison between the 3rd bit of the stored character and the code counter 3rd position CD3. This takes place at time *t*8 and in the event that such bits agree the flip-flop 924 will be set. The AND gate 912 serves to compare the bit in the 4th bit position against the code wheel position CD4 at time *t*0, and to set a flip-flop 926 if agreement is found. The AND gate 914 at time *t*1 compares the output of the 5th code wheel position CD5 against the 5th bit position of the stored character in the 64 character registers. In the event that agreement is found, the flip-flop 928 is set. Finally, the AND gate 916 serves to compare the 6th bit position CD6 of the code wheel counter against the 6th bit position of the stored character at the time *t*2. In the event such comparison is found, a flip-flop 930 is set.

AND gate 932 is made responsive to the outputs of the flip-flops 920 and 930 as well as a timing signal *t*3. Thus, at time *t*3 the AND gate 932 will serve to sample the various flip-flops 920 to 930 to determine whether there has been found a complete comparison between the code wheel counter 82 signals and a character stored in either one of the 64 character registers 56 or 58. In the event that there is exact comparison between the signals from the particular 64 character register then being examined and the code wheel counter 82, at the time *t*3, a signal will be furnished to a further AND gate 934 to indicate complete comparison. In addition to the output of the AND gate 932, the AND gate 934 receives the following inhibitory inputs. The first inhibitory input is applied from a 70 microsecond delay unit 936 which receives as an input the signal SPKTF, to be described below. For the duration of the 70 microsecond delay period the output of the delay unit 936 will prevent the passage of the signal from the AND gate 932 through the AND gate 934. This inhibiting signal is employed to prevent the passage of a possible comparison value during that time when the code wheel combinations are being changed as a result of stepping the code wheel counter 82 or when the cores of the agreement matrix 92 are being driven, for example, during readout. A further inhibitory input is the signal PPZ produced by OR gate 470 (see FIGURE 6) which is the output indicative of the fact that the paper advance counter still has a value in it and that the paper is advancing. A further inhibitory input is stature signal ST0 which inhibits the output of the comparator during the idling condition of the synchronizer between print operations. This would prevent the possible generation of a comparison signal and the setting of the agreement matrix 92 by any extraneous signals during the resetting period. Another inhibitory input to the AND gate 934 is the clearing signal CLA to prevent the outputs produced during clearing to erroneously set the agreement matrix 92. The final inhibitory signal is the signal PRT, which is the signal generated to control the printing out of the information stored in the agreement matrix 92. This inhibiting is desired to prevent the attempted setting of the cores while the old information stored in the cores is being read out.

The output of the AND gate 934 is used to set a flip-flop 938 the set output of which indicates that an agreement has been found. The set output of flip-flop 938 is sensed by an AND gate 940 during time period *t*4 to produce a signal designated CPOK or the 9 bit signal. The flip-flop 938 is reset during the time period *t*6 so that it does not indicate an erroneous agreement condition for a subsequent character. The AND gate 940 in addition to receiving the *t*4 timing signal and the output of the flip-flop 938 also receives an inhibitory input signal PRT to prevent the signal CPOK being generated during such time as the information within the agreement matrix 92 is being printed out. Thus, it is not until sufficient time has been allotted for the information stored in the agreement matrix 92 to be printed out that further signals showing agreement may be generated to again set the matrix. The output signal CPOK is employed to set a flip-flop 942. The set output of the flip-flop 942 is supplied to an AND gate 944 which receives inhibitory inputs at time periods *t*4 and *t*5. The inhibitory input at the time *t*4 insures that the flip-flop 942 is not sensed at a time during which flip-flop 942 is being set by the output CPOK of the gate 940. The inhibitory input at time *t*5 is to prevent an output from being derived from the AND gate 944 in the event that the flip-flop 942 is to be reset due to the presence of a 9 bit in the word being compared, as will be described below. Thus, effectively at time period *t*6, the output of the AND gate 944 which is labeled CPID is applied to AND gate 946 which also receives the output signal PMCSD from the flip-flop 476 (see FIGURE 6) of the paper feed counter 48. The signal at the output of the gate 946 is the 9 bit A signal, the function of which will be described below. The signal PMCSD as explained above, is not generated until paper advance equipment has been stabilized and the device is now ready to print on a stable static surface. As described above, the signal PMSCD does not occur until 10 milliseconds after the paper advance operation has been completed. The 9 bit A signal is applied over the line 736 as has been described above to permit the X and Y selection gates for the agreement matrix 92. Thus, when a comparison has been found between the character from a 64 character register and the output code for a particular line on the type cylinder the associated core in the agreement matrix 92 will be set.

As has been described above, the output of the AND gate 904, designated 64LP, is also fed to a further AND gate 918 which also receives a timing signal *t*5. The output of this AND gate is fed through a further OR gate 948 to the reset terminal of the flip-flop 942. In addition, the OR gate 948 also receives the timing signal *t*3. At the time *t*5 the 9 bit position of the particular character read from one of the 64 character storage registers is passed through the gate 904 to cause the signal 64LP to be generated. Although this signal is not passed to any of the input gates 906 to 916 for comparison purposes, it must nonetheless be detected to sense whether or not this character has been compared and printed out in a previous sensing of the content of the 64 character register. As was stated at time *t*5, the 9th bit position is being read at the output of the gate 904. If there is a bit located in this position at time *t*5, a signal will be generated which will cause the resetting of the flip-flop 942 which in turn will prevent the application of the 9 bit A signal to the line 736 and thus will fail to permit the X and Y selection gates to cause the storage of a value in the cores to indicate comparison. Thus, once a character has been compared favorably and a 9 bit has been set in the 9th bit position to indicate this comparison, it cannot again be used to set the matrix to cause a second or multiple printing of the same character. The timing signal *t*3 is applied to the OR gate 984 for the purpose of resetting the flip-flop 942 at periodic intervals prior to the receipt of the following character which starts at a time signal *t*6. The flip-flops 920 to 930 are reset by the *t*4 timing signal.

The output of the OR gate 904 (signal 64LP) is also directed to one input terminal of a further device known as the untranslatable matrix 950. This matrix is of a well-known type, and is pre-wired to generate signals which will prevent the reading out of certain selected combinations which are not to be used. The matrix 950 also receives the outputs of the code wheel counter 82 (FIGURE 10), that is the signals CD1 to CD6. Thus, as has been described above, the code wheel counter 82 can generate in its six stages a possible 64 different combinations. However, only 51 characters including the alphabetic, numeric and certain special characters are employed. Therefore, the 13 other combinations which are possible must be discriminated against to prevent them from effecting a print operation. Thus, upon the detection by the matrix 950 of one of these undesired combinations a signal will be provided to a pair of AND gates 952 and 954. The AND gate 952 receives inputs from the untranslatable matrix 950 as well as a timing signal t4 and the odd sprocket signal from binary counter 1030 (FIGURE 10) to generate a pulse designated odd space signal to cause the print hammers to be locked up at this particular time and prevent printing. In addition, the AND gate 954 receives the output of the untranslatable matrix 950 the even sprocket signal from binary counter 1030 (FIGURE 10) and a t4 timing signal to provide an even space signal to cause the print hammers to be locked up at this time and prevent printing. In addition, the output of the untranslatable matrix 950, also termed the skip signal, is applied to the OR gate 1034 (see FIGURE 10) to cause the code wheel counter 82 (see FIGURE 10) to advance to a further code count.

PRINTING STRUCTURE AND TIMING CIRCUITS

As is briefly described above, the printing device consists of a motor unit 1000 driving a shaft 1002 upon which are located a code wheel 1004 and a type cylinder 1006. The type is arranged along the surface of the type cylinder 1006 in staggered rows and staggered columns. Considering, for example, the character X illustrated in FIGURE 10, all of the odd columns that is, 1, 3, 5 through 63 are found along a first line of type. The letter X for printing in the even columns 2, 4, 6 through 64 is located in a second column and are fitted between the characters of the first row. The same arrangement is followed for each succeeding character, that is, there will be a first row for all odd column positions and a second row for all even column positions. Thus, for each character it is necessary that both the odd and the even line be employed to print all possible occurrences of the selected character in the 128 columns which make up a type row. In that there are 51 separate characters which may be printed out by this device, 102 rows along the cylinder circumference are required to describe the 51 desired characters. The particular character which is ready for printing by the print cylinder 1006 is determined from the code wheel 1004. The output of the magnetic recordings on print cylinder 1006 are read by a read head 1008 which serves to provide signals to the input of an amplifier 1010. The output of the head 1008 is labeled SPCH8. The output of the amplifier 1010 is fed to a pulse shaper 1012 to produce a discrete pulse SPKT. In addition to the normally spaced sprocket pulses, one of which is provided for each sprocket position (that is a single sprocket pulse for each odd and for each even row of 102 such sprocket pulses along the complete circumference of the type cylinder), there will be a special pulse known as a flag pulse recorded between the last sprocket and the first sprocket indications. This flag pulse will be used for synchronization purposes as well as resetting the counters 82 and 1030. The pulse SPKT provided by the normal sprocket pulse, is applied to a first input of an AND gate 1014 as well as the input of a 450 microsecond delay element 1016. This delay will cause an inhibitory pulse SPKTD to be applied to the AND gate 1014 for a period of 450 microseconds to insure that the flag pulse as well as any other spurious signal which may be detected as a sprocket pulse cannot be passed through the AND gate 1014 and thus give erroneous timing information. The output of the AND circuit gate 1014 is used to set a first synchronizing flip-flop 1018. This flip-flop immediately (no delay time between input and output as with the other devices discussed) develops an output designated SPKTF the function of which will be described below. It is to be noted that the synchronizing flip-flop 1018 is not set at any particular time but may be set whenever the sprocket pulse is available. The output SPKTF is gated, however, by means of a timing signal t7 through an OR gate 1020 to the set input of a second synchronizing flip-flop 1022 to cause the generation of a signal SPST1 at a preset time. The signal SPST1 is also impressed upon a delay element 1024 to produce the output SPST1D. In addition, the signal SPST1 is fed back to inputs of a pair of AND gates 1026 and 1028. The signal SPST1 at the occurrence of the next t5 timing pulse will be gated through the AND gate 1028 to provide a signal SPSTR which functions, first to reset the first sync flip-flop 1018 and second to permit the gating of the SPST1 signal through the AND gate 1026 to produce an output which will reset the second sync flip-flop 1022. In the reset condition the second sync flip-flop 1022 produces at its output a signal SPST2. This signal will be available at all times except when the flip-flop 1022 is set. In addition, the signal SPSTR is fed to the input terminal of a one stage binary counter 1030. One of the states of the binary counter 1030 is designated the odd sprocket while the second is designated the even sprocket. The binary counter 1030 is originally set by means of the flag pulse to its reset condition to produce the even sprocket signal. Thus, upon the occurrence of the first signal SPSTR from AND gate 1028, the binary counter 1030 will be set to generate the odd sprocket. In that the flag pulse occurs between the last type line sprocket pulse (even) and the first type line sprocket pulse (odd) it is assumed that the first line will be an odd print line and the odd sprocket pulse is required. Upon the arrival of the following sprocket pulse approximately 600 microseconds later, the binary counter 1030 will be caused by the signal SPSTR to count to its second condition and thus produce the even sprocket signal. This even sprocket signal is introduced to the input of an AND gate 1032 along with the signal SPST1D. Upon the concurrence of these signals a signal will be produced which will be impressed upon the OR gate 1034 permitting the stepping of the code wheel counter 82. Thus, each time the binary counter 1030 arrives at the even sprocket condition the code wheel counter 82 will be stepped. This is to be expected in that two lines are required to fully present, in all columns, a particular character. It is only upon traversal of both of these lines that a second or further character is presented. Thus, the code wheel counter 82 will only be stepped by every second sprocket pulse. The stepping output of the OR gate 1034 is designated step or CDSTA. In addition to the signal output of the AND gate 1032, OR gate 1034 also receives the skip signal from the untranslatable matrix 950 (FIGURE 9) which causes the code wheel counter 82 to skip the particular count which now exists; and assume a further count.

The code wheel counter 82 is a 6 stage binary counter in which each of the outputs of the one and zero state are brought out as CD1 and $\overline{CD1}$, through CD6 and $\overline{CD6}$. The outputs CD1 through CD6 are fed to the comparator and untranslatable matrix of FIGURE 9, as has been described above.

PRIORITY CONTROL CIRCUIT

The priority control circuit is illustrated in FIGURE 11. As has been discussed above, it is important to determine which device will have access to the memory for a given word time to prevent attempted simultaneous use by a number of peripheral units. Therefore, each of the peripheral equipments of the system are arbitrarily assigned a priority depending upon the importance of the data it may receive or transmit to the central processing device, the speed at which it is capable of operating compared to the normal sequence of operation of the machine itself. A system of 7 priority levels is shown in FIGURE 11, although it should be understood that this number is for illustrative purposes only and may be extended or reduced as required. Each priority level is composed of the following equipment. A flip-flop to receive a request for memory signal RM having a particular assigned priority. The priority assignment is indicated by the Arabic numeral which follows the RM designation on the set input to each of the respective flip-flops. The output of the flip-flop is then fed to the input of an AND gate associated with that particular priority level as well as to similar AND gates in all lower priority levels where it operates as an inhibitory signal. Thus, for example, the AND gate 1104 associated with the priority level 5 receives the direct set output of the flip-flop 1100 as well as the inhibitory inputs derived from the outputs of the flip-flops associated with the priority levels of 1, 2, 3 and 4. Thus, if any one of the devices of higher priority is making a request for access to the memory at that time, the AND gate 1104 will be inhibited and it will not be possible for the device of priority 5 to obtain access to the memory during that time. However, if at this time no device of higher priority level is requesting the memory, then the signal generated by the output of the flip-flop 1100 would be permitted to pass through the AND gate 1104 to cause the generation of a signal indicative of priority 5 or PR5. This signal, PR5, will be applied to a further AND gate 1106 along with a timing signal $t7$. The output of this AND gate 1106 is a signal designated SGR5. The signal output of the AND gate 1106 is also applied to set a further flip-flop 1108 to produce a signal GR5. The flip-flop 1108 is reset by a timing signal $t7$ whereas the flip-flop 1100 can only be reset by a timing signal $t7$ providing the PR5 signal is available. These signals, that is timing signal $t7$ and PR5 are applied to a further AND gate 1110 to cause the resetting of flip-flop 1100.

Thus, in the usual pattern of operation assuming there is no device of higher priority requesting access to the memory, a signal RM5 would come in to the set terminal of the flip-flop 1100 causing it to be set. The signal would be passed by the flip-flop 1100 allowing one bit time for the device to rise to full output level to and through AND gate 1104 to produce a signal PR5 as well as to apply a signal to one input terminal of the AND gate 1106. The signal PR5 is returned to a one terminal of AND gate 1110. These signals remain in this condition until the following $t7$ pulse arrives. Due to the arrival of the $t7$ pulse the output of the AND gate 1104 is gated through the AND gate 1106 to generate for one bit period only a signal designated SGR5 and further to set the flip-flop 1108 so that after one bit time it will produce a signal GR5. At the same time as the $t7$ signal has permitted the PR5 signal to set the flip-flop 1108, it also resets the flip-flop 1100 via AND gate 1110. The arrival of the following $t7$ pulse will cause the flip-flop 1108 to be reset and cease production of the output signal GR5.

Thus, it is obvious that upon the receipt of a request memory signal, the memory may be granted for a period of one minor cycle or that time period sufficient to pass one word from the memory to the using device. The device then loses priority and must make a further request for memory access, which request will be continued by the action of the flip-flop 1100 (for example, when considering the printing device) until such time as priority may be granted and the PR5 signal permits the flip-flop 1100 to be turned off. The PR5 signal persists for one minor cycle whereas the SCR5 signal persists for a single bit time and GR5 persists for one minor cycle and starts at the end of the PR5 signal. The request memory RM5 signal is generated in accordance with the requirement for instruction information for the printer itself in the manner described with reference to FIGURE 8. In addition, the request memory condition of priority levels 6 and 7 are also required in the operation of the print synchronizer described below. The operation of these circuits are the same as that described with reference to the 5 level priority device. However, the 7th level is considered to be a level for the request of an instruction (it may be made by any peripheral equipment) and requires at the input of a further AND gate 1112 a timing signal $t7$ and the signal indicating the termination of the last operation. Once the request for an instruction has been completed, it is necessary to obtain an operand. The device then functions at the priority 6 level. When an instruction requiring an operand is described, the signal on the instruction requiring operand line is produced and at time $t7$ this signal will be gated to AND gate 1114 to cause a request memory at a priority level of 6. The devices in the priority level of 6 and 7 will function as described with respect to the priority level 5.

The remaining priority levels, that is, levels 1, 2, 3 and 4 have similar elements and function in the manner described with reference to priority level 5, hence they will not be described in detail.

PRINT CONTROL

FIGURE 12 shows the print control device for producing the signals necessary to read out the agreement matrix 92 (FIGURE 7) and cause the printing of the information stored therein. The ready flip-flop 1200 is set by a signal on the line 736 indicating the 9 bit A condition. It should be recalled from the description of FIGURE 9 above, that the nine bit A signal results whenever there is an agreement between the character stored in one of the 64 character recirculating registers and the outputs of the code wheel counter 82 (FIGURE 10). Thus, after the first agreement has been found, the device is ready to print out and the flip-flop 1200 will be set to produce the ready signal. The output of the flip-flop 1200 will be furnished to an AND gate 1202 which also receives a signal SPKTF from flip-flop 1018 generated in accordance with the sprocket pulses as described with reference to FIGURE 10. The output of the AND gate 1202, known as the signal SPRT, is fed to a delay element 1204 of 14 bit times and a further delay element 1206 of 15 bit times. The output of the delay element 1204 designated SPRTOE is fed to the set terminal of a flip-flop 1208 as well as the input to a further delay element 1210 of 9 bit times. The output of the delay 1210 is designated RPRTOE and is fed to one of the inputs of an OR gate 1212. The output of the OR gate 1212 is fed to the reset terminal of the flip-flop 1208. The set output of flip-flop 1208 is fed to two AND gates 1214 and 1216. The first of these gates, 1214, is responsive to the output of the flip-flop 1208 as well as an odd sprocket pulse from binary counter 1030 (FIGURE 10) to produce a signal designated PRTEVE.

It should be noted that the printer does not have to wait for the registers 56 and 58 to be completely filled prior to printout because of the ability of the device to keep track of available space in the registers 56 and 58 and also of those characters already printed out. Hence, if all other criteria are met (paper advance terminated and paper stabilized) printout may begin at once. It should be noted that if the printer synchronizer gets consecutive memory accesses the registers 56 and 58 will be filled before the device is ready to print. However, if higher priority devices require memory access, then the registers 56 and 58 may not be filled until long after the character is ready to be printed. Thus these characters are not held up until the latter ones are available.

The second AND gate 1216 is responsive to the output of the flip-flop 1208 as well as an even sprocket pulse from binary counter 1030 (FIGURE 10) to produce a signal PRTODA. The function of these signals will be described below. The output of the delay element 1206 is fed through an OR gate 1218 to the input of the delay flop of five bit duration 1220. The output of this delay flip is a signal designated PRT.

The following sequence of events take place in the operation of this timing circuit. When there is a comparison between a word in one of the 64 character registers and the display of the code wheel counter 82, flip-flop 1200 will be set to produce a ready signal by the 9 bit A signal (FIGURE 9) indicative of this comparison. The ready signal, thus acts as a permanent indication that a first comparison has been found and that there is now a character ready for printing. Nothing further will happen during this period due to the fact that the signal SPKTF (FIGURE 10) is not present. The comparison operation, however, will continue between, for example, the odd register 56 and the outputs of the code wheel counter 82. Upon the arrival of the following sprocket pulse, indicative of the even row, a signal SPKTF will be generated by the first sync flip-flop 1018 of FIGURE 10, causing the signal SPRT to be generated by the AND gate 1202. This signal is applied to the delay elements 1204 and 1206 to create the signals which permit the print out of the information stored within the agreement matrix 92. The output of the delay element 1204 will be fed as the signal SPRTOE to set the flip-flop 1208 which will be applied to a first input terminal of the AND gate 1214, as well as the first input of the AND gate 1216. The even sprocket pulse during which the signal SPRT is generated will also cause the AND gate 1216 to produce an output signal PRTODA which permits the print out of the odd row characters. This PRTODA signal will be provided to the AND gate 780 in FIGURE 7 to permit read-out of all the cores to their respective odd hammers. The output of the delay 1206 will be fed through an OR gate 1218 to a delay flop 1220 to cause a signal PRT to be generated which will exist for a period of 5 bit times. Due to the inherent delay in the flip-flops, that is the one bit time required for the flip-flop upon receipt of an incoming signal to produce an output which is at maximum stable level, the signals PRTODA and PRT will be available at the same time. The signal PRT will cause the set cores in the agreement matrix 92 to be switched and produce output signals on the respective read-out lines R0. The signal PRTODA will cause the gating of the odd read-out gates to cause these signals to effect their associated odd print hammer actuators. Thus, the information stored in the agreement matrix 92 when the odd register 56 was compared against the code wheel counter will cause the actuation of the print hammers at the beginning of the following even sprocket. The remaining portion of the even sprocket will be occupied by the comparison between the even 64 character recirculating register and the code wheel counter. During the following odd cycle the odd sprocket will be applied to the gate 1214 to provide a signal PRTEVA. The PRTEVA signal in conjunction with the n signal, and the odd sprocket, will permit a read-out this time to the even hammer actuators print device.

OPERATION, INITIATION AND ACCESS OF THE 70 INSTRUCTION

The manner of initiation and access of the 70 Instruction will now be described with references to FIGURES 11, 13 and the timing diagram of FIGURE 14. As will be recalled from the General Description, the 70 Instruction is the instruction which operates to remove an instruction, which the printer will carry out, from the memory and insert it in the special standby location reserved for the printer. It will further set the standby flip-flop 24 to indicate there is an instruction available for the printer to carry out when the printer is available. The control counter 27 of FIGURE 13 is a sequentially operated counting circuit employed to address the memory for the instructions which are located therein. In the normal manner of operation, the contents of the control counter 27 will be read out, the memory will be addressed to select an instruction to be carried out by the computer, the value of the control counter 27 will be incremented by one and returned to the control counter 27 so that it may be ready to acquire from the memory the next successive instruction. We shall assume initially that some value is stored in the control counter 27, the specific value not being important to the discussion herein. It shal further be assumed that an ending signal will be available, indicative of the fact that the last instruction which the computer was to carry out has been completed and the machine is now available for executing further instructions. Under these conditions, a first input signal, the ending signal, will be available to the first input of the AND gate 1112 of the priority circuit shown in FIGURE 11. Upon the occurence of the next timing signal *t*7, a signal will be provided by the output of the AND gate 1112 to the input of flip-flop 1116, the input being designated RM7 or request for memory with a priority of 7. The priority level of 7 is assigned for the requesting an instruction by any peripheral device. The output of the flip-flop 1116 in the manner described with reference to the 5 priority level device, will be applied to the input of an AND gate 1118. The remaining inputs to the AND gate 1118 are inhibitory inputs from the devices of higher priority 1 through 6. In any event that none of the devices 1 through 6 are requesting memory access at this particular time, a signal will be provided by the AND gate 1118 designated PR7. The request for access for the device of the 7th level wil continue in the event that some other device requires the memory and is causing the inhibitation of the AND gate 1118. As can be seen, the reset of the flip-flop 1116 is controlled by means of a further AND gate 1120 whose inputs are timing signal *t*7 and the signal PR7. Thus, it is obvious that the device cannot be reset until priority PR7 has been granted. Thus, in the event that priority cannot be obtained for a long period of time, the RM7 signal will continue to permit the AND gate 1118 so as to pass a signal through the AND gate 1118 as soon as the inhibitory inputs created by the higher priority gates are no longer applied. Following the granting of a priority, at the next time *t*7, due to the presence of the PR7 signal the AND gate 1120 passes a signal to the reset terminal of the flip-flop 1116 to cause it to be placed in the reset condition. Thus, it is obvious that priority can be granted for only one word period. Priority must be continually requested and granted if the utilizing device requires more than a single word of information or requires use of the memory for more than a single word time. It is further obvious that the device may lose priortiy once it has obtained it after the transfer of one word or one word time has passed, and that it is only upon the subsequent granting of priority that additional words may be obtained from the memory. The output signal PR7 is also fed to the input of a further AND gate 1122 where it is gated by means of a timing signal *t*7 to produce an output to set a flip-flop 1124 to produce a signal designated GR7 or the granting of memory for a device of a priority of 7. This flip-flop is reset at the following time *t*7. Referring now to the FIGURE 14, lines 2 through 6 show the relative timing of the events which have taken place with respect to the priority circuit of FIGURE 11. The ending signal shown on line 2 may arrive at any time, and is arbitrarily shown as starting at some time *t*2 and proceeding until the end of the time period *t*7. At a time *t*7 this signal is gated to produce the RM7 signal as illustrated in line 3 of the figure. This RM7 signal causes the setting of the flip-flop 1116 one bit time later, the device taking one bit time to respond to an incoming signal for setting purposes. The PR7 signal continues then from time *t*8 to the end of time *t*7 and it is turned off due to the application of the PR7 and the timing signal *t*7 to the input of the AND gate 1120 connected to the reset terminal of the flip-flop 1116. The resetting of the flip-flop 1116 as shown on line 5 of the timing diagram 14 takes place at the next time *t*7. The GR7 signal of the flip-flop 1124 extends from a time *t*8 to an end of the next *t*7 time pulse at which time flip-flop 1124 is reset by the timing signal *t*7 applied to the reset input of the flip-flop 1124. During the time the PR7 signal is available and more specifically during the time periods *t*0, *t*1, *t*2 and *t*3 of the PR7 time, the contents of the control counter 27 are read through and AND gate 1302 to the input of an OR gate 1304, through delay element 1314 and pulse former 1316 to an adder 4 and finally to the address shift register 6. The value stored in the control counter 27 is 15 binary bits. This information is transferred in parallel serial fashion, four bits at a time. That is, the least significant four bits followed the next most significant, followed by the next most significant and finally the most significant three bits. These transfers take place at the respective time periods *t*0, *t*1, *t*2, *t*3. The fact that four parallel lines are used to conduct the information from the control counter 27 to the gates 1302 is indicated by the two output lines of control counter 27 connected by a dashed line with a number 4 placed adjacent the dashed line. This convention will be employed throughout in order to simplify the drawings. It should be realized that where a four line connect to the input of an AND gate such as 1302 it is assumed that there will be four such AND gates to receive each one of the four lines which conect the control counter 27 to the AND gate 1302. The adder circuit 4, a binary coded decimal adder, of well known type, is employed to either add a one or add a zero to the input value depending upon the actuation of the control lines 1310 and 1312 respectively. In formation read via AND gate 1032 is fed to the OR gate 1304 and also serves to actuate the line 1310 to cause the addition of a one to the contents of the control counter 27 which is entered into the adder 4. In this manner, the incrementing of the control counter 27 contents is performed just prior to the use of the value stored in the control counter 27 to address the memory. The output of the adder 4 which is now the control counter original value incremented by one is fed to the address shift register 6 where it will be employed to address the memory. The input to the adder 4 from OR gate 1304 is passed via a 4 bit delay element 1314 and a pulse former 1316 which has an inherent delay of one bit time. The delay unit 1314 is employed to time the signal of OR gate 1304 whereas the pulse former 1316 serves to produce a proper input pulse shape. The readout of information from the control counter 27 is illustrated on line 7 of the timing diagram of FIGURE 14, whereas the output of delay 1314 and pulse former 1316 are shown at lines 8 and 9 respectively. The application of the add 1 signal to the adder 4 is illustrated at line 10 of FIGURE 14. The address shift register 6 is connected to the memory 8 by means of 15 lines; thus, it is possible to address the memory in one bit time as is illustrated in line 11 of the timing diagram. At time *t*0 the contents of the address shift register are read through an AND gate 1318 to address the memory 8. Two bit times will be allowed for the selection and switching of the cores which are addressed by the value stored in the address shift register 6. This value will be read out over 27 parallel lines designated 1320 to the input of an AND gate 1322 and passed under control of a timing signal *t*3 to the input of the CCR register 10. The transfer of information from the memory 8 to the CCR register 10 is illustrated in the line 13 of the timing diagram of FIGURE 14. In addition, control counter 27 contents being used to address the memory 8 the value originally placed in the address shift register 6 (from the control counter 27) is read out over the line 1324 to the input of a further AND gate 1326 to be returned to the control counter 27 to be incremented again and used as the address of the next following instruction. The output of the address shift register 6 is gated through the AND gate 1326 at time periods *t*8, *t*0, *t*1 and *t*2 of the GR7 signal. This information will be retained in the control counter 27 until a further instruction requesting sequence is initiated.

The contents of the 27 bit CCR register 10 may be presented its output in parallel or serial fashion. In the parallel mode all 27 positions stored are read out the same time to an AND gate 1328. In the serial mode the device may be read out four bits at a time in parallel, during 7 sequential time periods, permitting the reading out parallel by bit serial by digit fashion to the input of a further AND gate 1330. The manner in which each of these respective modes of readout are used, will be described below. During the GR7 signal and more specifically at *t*5 of that GR7 signal, the value stored in the CCR register 10 will be read through the AND gate 1328 and placed in the instruction decoder 12. The instruction decoder is of known type and serves to interpret the 27 incoming bits of the instruction to determine (1) the particular operation that is to take place; and (2) the address of any further information required for the completion of the instruction. It is the output of the instruction decoder 12 which indicates that a 70 Instruction will take place. The manner of operation of the computer control circuitry for any other form of instruction will be the same up to this point.

The 70 Instruction is made up of the following sections each of which has the described function. The first portion is the M address, composed of 15 bits, which is the address of the instruction which the printer is to perform. Next the instruction contains 8 bits termed the function signals which indicate that a 70 Instruction is called for. Finally, there are 4 bits employed to determine which standby location is to be employed to store the M address. The portion designating the M address of the instruction is read out over the line 1332 to the input of and AND gate 1334. The 70 Instruction functional designator is directed to one input of the AND gate 1114 of the priority circuits of FIGURE 11 along with a timing signal *t*7 to generate the RM6 signal. The six priority level will be employed for any request an operand by the peripheral devices. An operation to be performed which requires an operand will cause a signal to be applied to the first input terminal of the AND gate 1114. The RM6 signal from the AND gate 1114 will cause the flip-flop 1126 to be placed in a set condition and apply an input to the input of an AND gate 1128. This AND gate also receives as the inhibitory inputs, of the higher priority levels 1 to 5. In the event that no inhibitory signals are present at inputs of AND gate 1128, the PR6 signal will be generated. The PR6 signal will extend from time *t*8 to the following time *t*7 and at the time *t*7 the PR6 signal will be gated by a *t*7 timing pulse to an AND gate 1130 to produce a setting signal to the input of the flip-flop 1132. The output of the flip-flop 1132 will be the GR6 signal which will persist until the following *t*7 time, at which time the flip-flop 1132 is reset by the timing signal *t*7. Flip-flop 1126 was reset prior to the beginning of the GR6 signal due to the application of the PR6 signal and a timing signal *t*7 to the input of AND gate 1134. The use of these timing signals *t*7 to reset the flip-flops which generate the PR6 and GR6 signals is to insure that any device cannot obtain memory access for more than one minor cycle, that is, the time required to transfer one word from the memory to the device. It further requires that for additional information to be transferred from the memory to the utilizing device additional request memory signals be produced. The relative timing of signals just discussed, that is, the signal PR6 and GR6 with respect to resetting of the flip-flop 1126 and 1132 are shown in lines 18, 20, 21 and 22 of the FIGURE 14 timing diagram. As was discussed above, the M address portion from decoder 12 is read over the line 1332 of FIGURE 13 to the input of an AND gate 1334 during the time period *t*8, *t*0, *t*1 and *t*2 under the control of the PR6 signal, the generation of which has just been described and a further signal known as PC0 or program count zero state. The program counting device is shown in the upper portion of FIGURE 13, and consists of a two-stage binary counter, the first state of which is designated PC0, the second designated PC1. Although the program counter 1344 has been shown as a two stage counter, it should be understood that the program counter may be as large as necessary to accurate all the required program steps. Only two steps are required for the 70 Instruction and so only a two stage device was shown. The AND gate 1334 will pass the M address portion from the instruction decoder 12 to the operand address register 16. The operand address now located in the operand address register 16 is the address of the instruction which is to be placed in the particular standby location preassigned in the memory for use with the printing device. There is one such location assigned for each peripheral piece of equipment, thus, when it is desired to have a piece of peripheral equipment perform a desired instruction this instruction is withdrawn from the memory and placed in the associated standby location. Additional circuitry as will be described below is used to indicate the fact that the standby location is now ready to supply an instruction to the particular peripheral equipment with which it is associated. In the usual course of events at this time the reference to the memory will be for an operand, however, during the 70 Instruction it will be for an instruction to be placed in the standby location.

The output of the operand address register 16 is fed to one of the inputs of the AND gate 1338. The output of the operand address register to the AND gate 1338 is serial by digit, parallel by bit; therefore, there will be four bits transferred in each one of the successive time periods, t0, t1, t2 and t3 as clocked by those time signals. In addition, the AND gate 1338 will receive the PR6 signal, as well as the program count zero (PC0) signal, to transfer over its output line the operand address to an OR gate 1304. The output of the OR gate 1304 will again be delayed by the four element delay until 1314 and the pulse former 1316 with the one unit delay and pass to the adder 4. At this time the add 0 line 1312 is actuated due to the output of the OR gate 1304. Thus, the information from the operand address register 16 is passed to the address shift register 6 without modification. This is desired since the address that was received from the M address portion of the 70 Instruction is the location at which the instruction desired is found and it is not desired that this be modified. The control of the add 0 line 1312 is controlled by a further AND gate 1340 which receives an output of the OR gate 1304 on a first input and the output of the AND gate 1302 on a second inhibitory input. Thus, if the signal is being passed from the operand address register 16 the signal when passing through the OR gate 1304 will cause the AND gate 1340 to actuate the add 0 line 1312. A signal passing through the control counter 27 and the AND gate 1302 will inhibit the output of this AND gate 1340 and will in turn actuate the add 1 line 1310 as has been described with reference to the recirculation of the control counter contents.

The time sequence of the passage of information from the operand address register 16 through the address shift register 6 is shown on the lines 19, 20 and 21 of the timing diagram of FIGURE 4. The value set up in the address shift register 6 is gated at time t0 to the OR gate 1318 to set up the circuits in the memory unit 8 and cause readout at the address described by the operand address register 27 contents. The stored information is read over the line 1320 in a 27 bit parallel arrangement to the AND gate 1322 where at time t3 this information is passed to the inputs of the CCR register 10. Further, at time t3, the 70 Instruction functional representation as well as the PC0 signal cause a signal to be generated by the AND gate 1342 found in the uppermost portion of the FIGURE 13 which will cause a stepping pulse to be applied to the program counter 1344 and cause the generation of the PC1 count. The readout and loading of the instruction in the CCR register 10 as well as the stepping of the program counter 1344 are shown in lines 25, 26 and 27 of the timing diagram.

The information now stored in the CCR register 10 is the instruction which it is desired to place in the standby location, that is, an instruction for the printing device to carry out. The address of the standby location is described by a fixed address generator 20 for standby location 5, that is, there will be a fixed address generator 20 for each one of the standby locations. In that we are considering standby location 5 as being associated with the printing device which has a priority of 5 it will be this fixed address generator 20 which will cause the generation of the address of the standby location 5. The fixed address generator 20 is shown in the upper left-hand portion of FIGURE 13. This device will pass a signal to AND gate 1348 which will also receive a signal indicating that standby location 5 has been called for, the indication that a 70 Instruction is to be performed and finally the signals PR6 and PC1 to generate a signal on the line 1350 which is the address of the standby location where the instruction currently stored in the CCR register 10 is to be placed. At the same time the signal from the AND gate 1348 is fed to the set input of the standby flip-flop 24 to cause the generation of an ITLK signal indicative of the fact that the standby location now contains an instruction to be carried out by the associated device, in this case, the printer. The standby location address is fed over line 1350 to one of the inputs of the OR gate 1304 then passed to the four unit delay 1314, the pulse former 1316 through the adder 4 (which again is controlled to add 0 by means of the AND gate 1340 applying a signal to the add 0 line 1312) and thence, to the address shift register 6. This sequence of events is illustrated in the timing diagram of FIGURE 14 at lines 28, 29, 30, 31, 32 and 33. During the following time period t0 the contents of the address shift register 6 are read through an AND gate 1318 to set up the selection circuits for the memory 8. This is shown in the timing diagram of FIGURE 14 on line 34. While the address is being located in the memory 8 as a result of the standby address produced on the line 1350, the instruction to be placed at this address is read four bits at a time during the time intervals t5, t6, t7, t8, t0, t1 and t2 from the CCR register 10 to the AND gate 1330 along with the 70 Instruction functional representation and the program control counter signal PC1. The output of the AND gate 1330 is passed to a write circuit 87 for writing into the memory, the signals received from the CCR register 10. The output of the write circuits 87 will be impressed upon a further AND gate 1356 which receives a timing signal t2 to pass over 27 lines the instruction which has previously been stored in the CCR register 10 to the location in the memory 8 as described by the standby location address fed over the line 1350.

At the end of this cycle of operation, that is, the execution of the 70 Instruction, the instruction which was originally received has now been placed in the memory location as described by the standby location associated with the printing device. These operations are shown in lines 35, 36, 37 and 38 of the timing diagram of FIGURE 14. Thus, it can be seen that at the end of the 70 Instruction the memory standby location assigned to the printing device, that is standby location 5, has been set with an instruction for the printing device to carry out, and the standby flip-flop 24 has been set to indicate that there is such an instruction in the standby location for execution by the printer when the printer is available for the execution of such an instruction. It should also be noted that in response to the timing signal t3 and the program count state of 1, a further gate 1358 will produce a clear signal which will set the program counter 1344 back to its initial condition with an output of PC0.

THE EXECUTION OF THE PRINT INSTRUCTION

The operation of the high speed synchronizer in carrying out a print instruction will now be described with reference to FIGURES 5 through 13 and the timing diagram of FIGURE 15. As a result of the completion of a former print operation or paper advance operation, a signal will be generated by the action complete flip-flop 54 which will cause the stature counter 800 of FIGURE 8 to be placed in a clear condition and generate the stature signal ST0. This signal, as has been discussed above, will cause the resetting of the various units of the print synchronizer preparatory to accepting a further instruction to be executed by the synchronizer. The stature signal ST0 will be responsible for clearing the Y counter 96 of FIGURE 7 to a count of 16, resetting the action complete flip-flop 54 of FIGURE 8, resetting the print control flip-flop 50 on FIGURE 5, resetting the paper feed line counter 48 via the AND gates 452, 453, 454, 455, 456 and 457 of FIGURE 6, clearing the X counter 94 of FIGURE 7 to a condition of zero, clearing the 9 bit registers 38, 40, 42 and 44 of FIGURE 5 to zero, clearing the ready flip-flop 1200 on FIGURE 12, and finally clearing the flip-flop 1208 on FIGURE 12 to terminate the generation of signals PRTEVA and PRTODA which control printout of information from the agreement matrix 92. During the time when the stature counter 800 is in the stature count 0, the standby flip-flop 24 will be set to generate a signal ITLK to indicate that the standby location has been loaded. As was shown in FIGURE 14, the standby flip-flop will be set at time $t4$ and produce a signal ITLK beginning at time $t5$, this signal will continue for a period until the flip-flop 24 is reset by a signal RSSP to be described below. The gate 812 on FIGURE 8 is responsive to the stature signal ST0 and the ITLK signal to produce a signal STA0 which is responsible for making a memory request to have an instruction transferred from the associated standby location to the high speed print synchronizer. The signal STA0 as shown on line 12 of the timing diagram of FIGURE 15 is generated beginning at a time $t5$ and will extend to the end of the period $t7$. Also, during this time period, the clear flip-flop 60 on FIGURE 5 will be set to cause the generation of the clearing signal CLA which effectively will clear the 64 character registers 56 and 58 to prevent the storage of any information and to destroy any information which may have been stored in these registers prior to this time. The STA0 signal is introduced to one input of the OR gate 840 of FIGURE 8 which passes its output to an input of the AND gate 834. A second input to the AND gate 834 is the signal NINZ generated by the NINZ flip-flop 66. This flip-flop is set by a signal generated and passed through the AND gate 838 in response to a $t4$ timing signal and the barred condition of EV64A and OD64A. The barred signals OD64A and EV64A are indicative of the fact that there are no 8 bits stored in the character currently being sampled in each of the 64 character storage devices 56 and 58 of FIGURE 5. Thus, with the outputs in the zero condition indicating there is nothing stored at this location and that each of the registers is capable of storing a further character, a signal is passed through the AND gate 838 to set the NINZ flip-flop 66 and thus put a signal at the NINZ input to the AND gate 834. The NINZ signal will thus be generated as long as there is an empty storage location in one of the 64 character registers 56 or 58. A third input to the AND gate 834 is the timing signal $t7$. The final signal input to the AND gate 834 is an inhibitory input provided by the output of AND gate 836. This AND gate 836 has inputs of stature signal ST5 and the barred condition of L18 ($\overline{L18}$). The function of these inputs to the AND gate 836 will be described in detail below. It is sufficient to say at this time that AND gate 836 will not produce an inhibitory input at this time and, therefore, the inputs on the line $t7$, NINZ and the output of the OR gate 840 will be sufficient to pass a signal to the AND gate 834 causing AND gate 834 to produce an output designated RM5, thus making a request of memory for a device with a priority of 5. The RM5 signal will be passed to the set input terminal of the flip-flop 1100 on FIGURE 11. In response to the RM5 signal, flip-flop 1100 will produce a signal at the input of the AND gate 1104. The signal RM5 persists for a duration of time determined only by the final granting of priority to this gate. As will be recalled from the discussion of FIGURE 11, it takes the granting of priority in the form of generation of the PR5 signal in conjunction with the following time signal $t7$ to cause the flip-flop 1100 to be reset. Thus, if priority is not granted to this particular gate, the flip-flop 1100 cannot be reset. Under the best possible conditions, that is with all the inhibitory inputs to the AND gate 1104 absent, the signal PR5 will be generated one bit time after the receipt of the signal RM5 to the flip-flop 1100. The timing diagram of FIGURE 15 illustrates the best possible condition for the generation of the PR5 signal. It shows the the request memory signal RM5 was generated at a time signal $t7$ and that the PR5 signal became available at $t8$ or one bit time later (see lines 15 and 17). The RM5 signal is also applied to the input of the OR gate 814 on FIGURE 8, to cause the stature counter 800 to be set to a stature count of 1 and generate the stature signal ST1. During the stature count of 1 which is of variable time length, the high speed printer waits until the memory grant signal GR5 is finally generated. As is obvious from the above discussion of the priority gates, the PR5 and GR5 signals cannot be generated until higher priority devices no longer require the memory, thus the print synchronizer will idle at stature count 1 until the GR5 signal is generated and permits the stature counter 800 to advance. The generation of the priority PR5 signal continues for a period from $t8$ through the following $t7$ as illustrated in line 17 of FIGURE 15. In response to this PR5 signal at the times $t0$, $t1$, $t2$ and $t3$, the 15 bits which constitute the address as generated by the fixed address generator 20 are passed through AND gate 1358 to the input of the OR gate 1304, then through the delay element 1314, the pulse former 1316 to the input of the adder 4. At this time, the output of the OR gate 1304 causes the AND gate 1340 to actuate the add 0 line 1312 to cause the signal passed to the adder (which is the fixed address location, of the standby location in the printer) to pass unchanged through the adder 4 to the input of the address shift register 6. This series of events is shown on lines 18, 19 and 20 of FIGURE 15. Concurrently, with the completion of the transfer of information through the delay element 1314 the signal PR5 ceases due to the application of the timing signal $t7$ to the AND gate 1110 which causes the setting of the flip-flop 1100. During the time $t7$ as shown by line 22, a signal SGR5 is generated and at the following time period $t8$ the signal PR5 which had been gated through AND gate 1106 at $t7$ causes the flip-flop 1108 to switch to its set condition and generate the signal GR5 at $t8$. This signal GR5 is the memory not busy signal and is the grant of priority to the device of priority 5. A GR5 signal is illustrated at line 23 of the timing chart of FIGURE 15. At the concurrence of the GR5 signal and stature signal ST1 which occurs at $t8$, the first call flip-flop 1360 is set by the passage of a signal through the AND gate 1362. The output of the first call flip-flop 1360 is applied to the inhibitory input of a further AND gate 1364. The function of this signal, as will be described below, is to prevent the addition of a one to the L address of the print instruction that will be stored in the memory address counter 46. This is to provide that on the first use of the address so stored, it will not be incremented. At the time $t0$, a timing signal will be applied to the second terminal of the AND gate 1318 to cause the selection circuits of the memory 8 to establish the address designated by the value set in the address shift register 6. This value as read from the memory 8 is gated over a line 1366 to the first input of AND gate 1368 where at $t3$, it will be gated to the CCS register 36. The GR5 flip-flop 1108 will be reset by the following time signal $t7$.

The GR5 and the stature signal ST1 permit at $t3$ the operation of the OR gate 818 of FIGURE 8 to set the stature count 2 and cause the generation of the stature signal ST2. During this stature count, the contents of the CCS register 36 are transferred to the 9 bit registers 38, 40, 42 and 44 as shown in FIGURE 5. The information in the CCS register 36 is passed via an AND gate 1370 during stature count 2 at time periods $t4$ through $t1$.

At these time periods the bits 1 through 7 are each passed to one of the four recirculating 9 bit registers four bits in parallel, seven digits in serial. Thus, for example, the time period *t*4, the least significant bit of each one of the four characters stored in the CCS register 36 will be read to a separate one of the 9 bit recirculating registers 38, 40, 42 and 44. The information passed by the AND gate 1370 passes to the input of a series of AND gates 310, 314, 318, 322 which are shown on FIGURE 5. The gate 310 is the input gate for the 9 bit register 38 and will receive the bits 19 through 24 serially. The AND gate 314 is the input gate for the 3rd 9 bit register 40 and will receive bits 7 through 12 serially. The AND gate 318 is the input gate for the 9 bit register and will receive the bits 13 through 18 serially. The input AND gate 322 passes the bits read from the CCS register 36 to the 9 bit register 44 thus passing the bits 1 through 6. The AND gates 310, 314, 318 and 322 are controlled by the application signal ST26. This signal is available from the OR gate 832 of FIGURE 8 during stature counts 2 and 6.

Considering for example, more specifically, the manner of application of the signal L1 to the AND gate 310 at the input of the 9 bit register 38 the following is found. Bit 1 is read out of the CCS register 36 at time *t*4 and read directly through the AND gate 310, the OR gate 308 into the recirculating loop of the 9 bit register composed of the delay 300, the second delay 302, the further AND gate 304 back to the input of the OR gate 308 (see FIGURE 5). The second, third, fourth, fifth and sixth bits continue to be transferred through the AND gate 1370 of FIGURE 13 to the inputs of the AND gate 310 of FIGURE 5, thus placing the first six bits recirculating in the register 38. The 7th bit is passed at the time *t*1 to complete the transfer of information from the CCS register to the 9 bit register 38. As described above, the first 6 bits contain the actual character to be printed and the 7th bit may be employed for checking. We shall not, however, consider the use of the 7th bit as a checking device within the purview of this disclosure and thus, it shall be regarded as being a zero at all times. At time *t*2 a timing signal is applied to one of the inputs of the OR gate 308 to insert a one bit into the formerly blank 8th bit position allocated for each respective character. Thus, merely by the use of a timing signal it is possible to put in an 8th bit identifying character to be used for identifying empty locations within the 64 character register and the last character stored in the 64 character register in the manner to be described below. The arrangement of the bits as they recirculate in the 9 bit registers 38, 40, 42 and 44 are shown in line 31 of the timing diagram of FIGURE 15.

The bits 19 through 24 which have been stored in the 9 bit recirculating register 38 are read out over a first line 328 to provide a signal to set the paper feed counter 48 of FIGURE 6. The bits from the register 38 read out in serial fashion beginning at *t*5 to the inputs of the various flip-flops which are to store the 19 through 24 bits. At *t*5, the first bit (the 19th bit) is read into the AND gate 440 which also receives stature signal ST2 to pass a signal through a further OR gate 462 to the set terminal of flip-flop 451 to store the 19th bit. At the time *t*6 the AND gate 441 will receive the 20th bit along the line 328 as well as the time signal *t*6 and stature signal ST2 to pass a signal to the OR gate 461 to set the flip-flop 450. The 21st bit will be passed at time *t*7 through AND gate 442, which receives the stature signal ST2, to and through the OR gate 460 to set the flip-flop 449 to store the 21st bit. The next output signal on line 328 is the 22nd bit which is passed through the AND gate 443 responsive to stature signal ST2 and timing signal *t*8 to pass a signal to and through OR gate 459 to the set input of the flip-flop 448, to store the 22nd bit. AND gate 444 responsive to the *t*0 signal, the stature signal ST2, and the 23rd bit passes a signal through the OR gate 458 to set the flip-flop 447 to store the 23rd bit. Finally, at time *t*1, the AND gate 445 receives the 24th bit output of the recirculating register 38 and passes it under the control of stature signal ST2 to the set terminal of the flip-flop 446 to store the 24th bit. Thus, at the times *t*5 to the following *t*1, the paper feed counter 48 will be set up in accordance with the presence or absence of bits in positions 19 through 24, indicative of the total number of paper feed lines which will take place in the following operation. As a result of the setting of the flip-flop 446 to 451, one bit time later signals will be available on the output lines designated L24 through L19, as inputs to the OR gate 470. There will be an output from the gate 470 designated PPZ, if this count is anything other than zero. As a result of the generation of the PPZ signal, the paper advance mechanism (not shown) will be caused to advance one line at a time. The sprocket pulse generated as a result of the movement of paper is applied to the line 478 and in turn to the countdown gates 463, 464, 465, 466 and 467 as has been described heretofore. As a result of each line of paper advance countdown gates will pass a pulse to cause the value originally stored in the flip-flops 446 to 451 to be counted down towards the zero value. The paper continues to be advanced at a rate of approximately 6.52 milliseconds per line and continues until the paper feed counter stores a zero value.

At time *t*1 the 18th bit signal is available on the line 330 at the output of the 9 bit recirculating register 42 to cause the setting of the print control flip-flop 50 as shown in FIGURE 5. As has been explained before, it will be the value of this 18th bit which will determine whether or not the print operation will take place as well as a paper advance or merely a paper advance. In the event that the 18th bit is a zero, a paper advance only will take place, however, if the 18th bit is a one then there will be a paper advance as well as a print operation. Thus, during the time period *t*1, the value in the 18th bit will be sensed and if this is a one, a print control flip-flop 50 will be set via line 330 thus producing the L18 signal. If the 18th bit is a zero, it will fail to set the flip-flop 50 of FIGURE 5, and it will continue to generate the $\overline{L18}$ signal resulting from the resetting of the flip-flop by the stature signal ST0.

The receipt of the following *t*3 timing signal will cause the stature counter 800 of FIGURE 8 to be set to the stature count 3. This is accomplished by means of the passage of a signal by the OR gate 816 responsive to the stature signal ST2 and a *t*3 timing signal.

The stature count 3 continues for a fixed length of time during which information will be transferred from the 9 bit registers 38 and 42 to the respective odd and even 64 character recirculating registers 56 and 58. Further, during stature count 3 the line feed counter will continue to be advanced as the paper is advanced.

Turning now to FIGURE 5, the manner of transfer of information from the 9 bit registers 38 through 44 to the 64 character registers 56 and 58 will be set forth. The output of the 9 bit register 38 is passed over an output line 312 to the input AND gate 358 of register 56 in response to the stature signal ST3 and thence to the OR gate 356. The output of the OR gate 356 is fed to a one bit delay element 362 which introduces its input to a further AND gate 368. During this interval, a clearing signal CLA is applied to one of the inhibitory inputs of the AND gate 368 so that the information read from the 9 bit register 38 is not passed through the AND gate 368 to the further elements of the 64 character register 56. It should be recalled that the clear flip-flop 60 was set by the signal STA0 generated during stature 0. The reason for the destruction of the information being read from the 9 bit registers at this time is that the information read is the print instruction itself and not a part of the information to be printed out. It is not desired to have this instruction placed into the 64 character registers where it might possibly be printed out in a subsequent operation. In a similar fashion, the output of the 9 bit register 42 is read over the line 320 to one of the input terminals of an AND gate 384 which also receives the stature signal ST3. The output of the AND gate 384 is passed to the input of an OR gate 382 and thence to a one bit delay element 388. The output of delay element 388 is applied to one input terminal of the AND gate 392 which also receives at an inhibitory input the clear signal CLA. Thus the instruction portion transferred from the 9 bit register 42 is also destroyed during this particular stature count. It should be recalled, however, at this time that although the information is read from the CCS register 36 to the various 9 bit registers 38 through 44, the bits 1 through 15 (which constitute the address of the first word to be transferred to the 64 character registers for a printing operation to follow) are also transferred to a further storage device, during the time periods $t8$, $t0$, $t1$ and $t2$ of stature count 2 while the GR5 signal is available. The outputs of these 15 positions will be read through AND gate 1372 to the input of an OR gate 1374 and thence to the input of the memory address counter or MAC46.

At the time $t3$, of stature count 3, a signal will be passed by the OR gate 842 of FIGURE 8 to cause the resetting of the 3rd stage 806 of the stature counter 800 to place the device at the stature count 4. The events which take place during the stature count 4 are similar to those described with reference to stature count 3. However, during this time the contents of the 3rd and 4th 9 bit register, that is the registers 40 and 44 will be passed to a 64 character registers 56 and 58 respectively. Referring more specifically now to FIGURE 5 again, it can be seen that the output of the 9 bit register 40 is fed via line 316 to the input of the AND gate 360 which also receives the stature signal ST4. The output of this AND gate will be fed to an input of the OR gate 356 and then pass to the delay element 362 to an input of the AND gate 368. It should be recalled that the clear flip-flop 60 being set during the stature count 0 (by the STA0 signal) and not having been reset continues to inhibit the passage of any information to the further portions of the 64 character register 56. Thus, this information which constitutes bits 7 through 12 of the print instruction will also be destroyed. The information contained within the 9 bit register 44, that is the bits 1 through 6, will be passed via line 324 to one of the inputs of an AND gate 386. This signal will be gated with a stature signal ST4 to an input of the OR gate 382 thence to the delay element 388, to an input of the AND gate 392. The clear signal CLA will operate to inhibit the passage of this signal to the other portions of the 64 character store 58, thus destroying it.

Recapping the events that have taken place thus far, it can be seen that the instruction which was located in a standby location has been read to the 9 bit registers 38, 40, 42 and 44 (during stature count 2). This instruction constitutes characters 1, 2, 3 and 4 of the first word received from the memory and is the print instruction. The bits 19 through 24 are employed to set up the paper feed counter 48 (FIGURE 6) and counting operation begins immediately as the paper is advanced. This information is passed into the 64 character registers 56 and 58 (during stature count 3) which are being cleared at this time and is thus destroyed. The content of the 9 bit register 42 is also passed into the 64 character even register 58 and destroyed. However, the 18th bit is sensed over a special line by the print control flip-flop 50 to determine whether a print operation or a paper advance and print operation will take place. In a further stature count (stature count 4), the information contained within the third register, that is the 9 bit register 40 is passed into the 64 character register 56 where it is destroyed by the clearing signal CLA. In a like manner, the output of the register 44 is passed into the 64 character register 58 and is destroyed by the effect of the clearing signal CLA. The value stored in the positions 1 through 15 constituting the address of the first data word to be printed out in the print operation are also read to and stored during stature count 2 in a memory address counter 46 where it is preserved for addressing of the memory at a later time. These events are summarized in the timing diagram of FIGURE 15 at lines 29 through 41.

At time $t3$ of stature count 4, a signal will be passed through the OR gate 814 to cause the setting of the flip-flop 802 of the stature counter 800, thus causing the generation of stature count 5. During stature count 5, one of two series of events will occur depending upon the content of the print control unit 50. One series of events will take place if the value stored in the print control 50 is a zero and another if the value stored is a one. In that stature count 5 is an idling condition where the synchronizer waits for the grant of memory access for a data transfer it is of a non-fixed time length and will extend for a period to be determined by the granting of memory to the print synchronizer.

In the event that there is to be no print operation, that is if the 18th bit is a zero, the paper feed operation alone will take place, until the value standing in the flip-flops 446 through 451 of the paper feed counter 48 as shown in FIGURE 6 is zero. During the whole count down of a paper feed counter 48, the OR gate 470 will generate the signal PPZ to continue the paper advance. When this operation has been completed and the $\overline{PPZ}$ signal has been generated, indicative of the fact that there is no longer a value stored in the counter or that the output of the counter is zero, the next available $t5$ timing signal in conjunction with the presence of the stature signal ST5 and the $\overline{L18}$ signal at the AND gate 52 will pass a signal designated end of paper feed or EOPF to a first input of the OR gate 810. OR gate 810 will provide a setting input to the action complete flip-flop 54 which will provide an input signal to clear the stature counter back to its original count of stature 0 thus terminating the operation of the high speed print synchronizer and placing it in condition to receive further instructions for it to carry out. The duration of the stature signal ST5 in this case will be as long as is required for the particular number of lines of paper feed which are called for by the original setting of the flip-flops of the paper feed counter 48 to be advanced. In the timing diagram of FIGURE 15, the duration of stature count 5, in the advance of paper was arbitrarily shown as existing from a first $t4$ time to the following $t5$, that is one bit time longer than a full minor cycle. However, it should be understood that this period shall extend for as long as is required to advance the paper the number of times required by the value set into the paper feed counter 48.

The manner of operation of the device for the print operation (bit 18 is a one) as well as paper advance shall now be considered starting again from the point of the generation of the stature signal ST5. Under this condition, during stature count 5, the transfer of the L address portion (that is, the bits 1 through 15) stored in the CCS register 36 to the memory address counter will be called for. It will further be required that the memory address counter 46 be read out to the address shift register 6 and that the value in the memory 8 found at this address be read out and placed in the CCS register 36. It further requires that the contents of the memory address counter 46 be passed through the adder 4 where a zero is added to it and returned to the memory address counter 46 to be available for further addressing of the next words to be transferred to the 64 character registers. This operation proceeds in the following manner. The 8 bit positions of the recirculating 64 character registers 56 and 58 will be sensed at time $t4$. In that these registers have been cleared, the signals $\overline{OD64A}$ and $\overline{EV64A}$ will be present (all 8th bit positions being zero), therefore, a signal will be passed through the AND gate 838 to cause the setting of the flip-flop 66 to produce the NINZ signal and apply it to the first input of the AND gate 334. The presence of the stature signal ST5 will cause a signal to be passed by the OR gate 840 to the second input of the AND gate 834. Due to the fact that there is not an L18 signal present (since it was assumed that this is the condition where the L18 signal is present) even though stature signal ST5 is present AND gate 836 will fail to produce an output to inhibit the action of AND gate 834. Thus, upon the arrival of the t7 timing signal, a signal designated RM5 or request memory for a device with a priority of 5 will be generated. This RM5 signal will be impressed upon the set terminal of the flip-flop 1100 as show in FIGURE 11. As was explained above, the output of the flip-flop 1100 will be applied to the AND gate 1104 at the same time as any possible inhibitory inputs created by devices of higher priority level. The signal output of the flip-flop 1100 will persist until the memory access is finally granted to the print synchronizer. For the sake of simplicity, in the case illustrated in FIGURE 15, it is assumed, that at the time of the application of the signal from the flip-flop 1100 to AND gate 1104 no inhibitory inputs of higher level devices are applied to AND gate 1104 to prevent the generation of the signal PR5. The signal PR5 is generated one bit time after the arrival of the RM5 signal at time t7. Thus at t8, the PR5 signal is available and this signal persists until flip-flop 1100 is reset by the action of the PR5 signal and the following t7 timing signal applied to the AND gate 1110. The same timing signal with which the flip-flop 1100 is being reset also permits the PR5 signal to be gated through the AND gate 1106 to cause the generation of the signal SGR5 at the t7 time, and to cause the setting of flip-flop 1108 to produce the GR5 signal. The GR5 signal is available one bit time after the PR5 signal is applied to its set terminal and is thus available at the t8 time. The GR5 flip-flop 1110 is reset by the following t7 signal. During the PR5 time, that is the time in which the signal PR5 is available, the contents of the memory address counter 46 will be read to an AND gate 1376 along with stature signal ST5 and the timing signals t0, t1, t2 and t3. It should be recalled that the value now stored in the memory address counter 46 is the value of the L address portion of the print instruction or the address of the first word to be retrieved from the memory for printout purposes. The output of the AND gate 1376 is fed to one imput of the OR gate 1304 and then through the delay element 1314, and the pulse former 1316 to the input of the adder 4. Due to the output of the OR gate 1304, the absence of an output from AND gate 1302 the AND gate 1340 causes the actuation of the add 0 line 1312 to add a zero to the contents of the memory address counter 46 insuring that the address as specified by the value of the memory address counter 46 will be read from the memory on this pass. Further, the first call flip-flop 1360 having been set as a result of the GR5 signal during stature count 1, produces an inhibitory input to the AND gate 1364 to insure that the flip-flop 1378 cannot be set to cause the production of the add 1 by actuation of the add 1 line 1310. Thus, the value from the memory address counter is passed into the address shift register 6 unchanged and employed to select a value which is the first word for transfer in the printing operation. At the time t0, the value stored in the address shift register 6 is read out through the AND gate 1318 to cause the addressing of the memory 8. At time t3, the information at the address specified is read over the line 1366 to the input of an AND gate 1368 and gated to the CCS register 36.

At time t3 during stature count 5 and with the arrival of the GR5 signal, a signal is passed to AND gate 844 to cause the flip-flop 804 of the stature counter 800 to be set to the zero condition thus causing the stature count 6 to be generated. During stature count 6 while the GR5 signal persists a signal is passed through the AND gate 1380 to cause the resetting of the first call flip-flop 1360 so that on all further passes of the address stored in the memory address counter 46 through the adder 4 a one will be added, thus permitting the incrementing of the value and the addressing of locations of successively higher order to be selected for transfer to the 64 character registers. In addition to this operation of resetting the first call flip-flop the information stored in the CCS register 36 will be passed via the line 1369 to the input of the AND gate 1370 which also receives the timing signals t4 through t1, and the output of the OR gate 1382 which at this time is receiving the stature signal ST6. Thus, during stature count 6 the 27 bits stored in the CCS register 36 are gated out to the respective 9 bit registers 38, 40, 42 and 44 as was described with reference to stature count 2. It should be recalled from a discussion of FIGURE 5 above, that the signal ST26 which is necessary to gate in the signals on the lines L1, L2, L3 and L4 through the respective input AND gates 310, 314, 318, 322 is available during both stature 2 and stature 6 times. It should also be noted in addition to an initial clearing of the 9 bit registers during stature count 0, the 9 bit registers are also cleared at stature count 5 to insure information which was originally stored therein and transferred to the 64 character registers during stature count 3 and stature count 4 has been completely cleared. The information as it is read into the 9 bit registers 38 through 44 receives a t2 signal applied to the OR gates such as 308 in the 9 bit recirculating register 38. Each of the registers 38, 40 and 44 receive such a t2 signal but register 42 does not receive such a t2 signal. As explained above, the effect of such an introduction of the t2 signal is to insert an 8 bit or a bit one in the 8th bit position of the values stored in the registers 38, 40 and 44 which are the first, third and fourth characters constituting the word. These events are depicted in timing diagram of FIGURE 15 at lines 51 through 65.

At time t3 of stature count 6, a signal is passed to the input of an OR gate 816 which generates a signal to reset the flip-flop 802 of the stature counter 800 and to generate the stature count 7. The events that take place upon the arrival of stature count 7 will be different for the first time the counter arrives at stature count 7 than for all subsequent cycles of the stature counter. The series of events that occur when the stature counter arrives at stature count 7 for the first time will now be described.

The stature signal ST7 will be available at time t4 and will be gated by a t4 signal as well as the CLA signal, from the clear flip-flop 60, through AND gate 820 to cause the generation of a signal CLB. This CLB signal will be applied first to an AND gate 828 along with the same t4 timing signal. The output of the AND gate 828 is designated SFT4. This signal is applied to OR gate 415 (FIGURE 5) to cause the resetting of the clear flip-flop 60 and terminate the clear signal CLA. Further, the CLB signal will be applied to a first input terminal of the OR gate 766 of FIGURE 7 to cause the setting of flip-flop 756 of the X counter 94, the X counter is thus set to four). The signal CLB will be applied to the OR gate 822, to provide an output on the line 824 which will cause the second stage 804 of the stature counter 800 to be returned to a condition of one via the OR gate 818 and further to cause the third stage 806 of the stature counter 800 to be returned to zero so that the stature counter now indicates the stature count 3. To recapitulate these events, upon the reaching of stature count 7 for the first time, signals will be generated which will cause the X counter 94 of the agreement matrix 92 to be placed in the initial count of four. Further, the clear flip-flop will be reset so that information now entered into the 64 character registers will be retained. Further, the signal will be employed to cause the stature counter 800 to return to the stature count 3.

Upon the reaching of stature count 3 again, information stored in the 9 bit registers during the previous stature count 6 can now be transferred to the 64 character registers. The manner of transfer of this information will be the same as that described with reference to the first time the stature counter cycled through stature count 3. The only difference in this case over that described before was that the information applied at the outputs of the delay elements 362 and 388 will now be passed into the registers themselves due to the absence of the clearing signal CLA to inhibitory inputs of the AND gates 368 and 392, respectively.

The device will continue to cycle through stature count 3, 4, 5, 6 and finally to a count of 7. The events have been described with reference to the initial cycling for the same stature counts taking place again. The only exceptions between that formerly described with respect to the first cycle of operation and all later cycles is that clear signals will be absent and the information will be retained in the 64 character stores and further the address read from the memory address counter 46 when passed through the adder 4 will have added to it a value of one to insure that the address in the next higher location will be selected.

Upon reaching the stature count of 7 for the second time, a different set of gates will respond than those which had in the first instance. AND gate 826 is made responsive to the stature signal ST7, the OD64A and EV64A signals which are the signals indicative of the 8 bit of the first word being stored in the registers and a timing signal $t4$ to cause the generation of a signal designated STA7. The signal STA7 will cause the stature counter 800 to be reset to the stature count 3 by means of the signal transferred to the OR gate 822 and the OR gate 818 to the 3rd flip-flop 806 of the counter 800. With the counter 800 again jammed to the stature count 3, the transfer into the 64 character registers of the information found in the 9 bit registers loaded during the previous stature count 6 will take place. The counter 800 will then be advanced in the manner previously described, to stature count 4, during which count the additional transfer from the 9 bit registers to the 64 character registers will take place. The counter 800 is then advanced to stature count 5. A request for memory access will be made during stature count 5 and this information will be placed in the 9 bit registers during the following stature count 6.

At stature count 7, a further examination of the contents of the 64 character registers will be made by AND gate 826 to determine when the 8 bit signals represented by OD64A and EV64A signals are available. It should be recalled from the previous discussions of the 8 bit coding scheme, that only the last word entered may have bits in the 8th bit position of characters 3 and 4. The 8 bit signals of each word will be examined during the occurrence of successive timing signals $t4$. Only when the last word has been found will all the inputs to AND gate 826 be available. That is, the stature signal ST7, the OD64A signal from delay element 362 of odd register 56 (FIGURE 5), the EV64A signal from delay element 388 of even register 58 will all be available at the occurrence of timing signal $t4$. As a result, AND gate 826 will generate the STA7 signal employed to blank out the 8th bit of the third character of the previously last word entered by inhibiting its passage through AND gate 368 in odd register 56. The STA7 signal is also employed to cause the stature counter 800 (FIGURE 8) to return to a stature count of three to permit the transfer of an additional word. This series of events will continue during the entire duration that there are spaces available in the 64 character registers for the receipt of additional information, that is, until all 32 words which are required for printout of a single line have been received.

This continual requesting of information for the 64 character registers will continue as long as there is space available in the 64 character registers. This condition of space available is continuously monitored by the AND gate 838 which sense the $\overline{OD64A}$ and $\overline{EV64A}$ conditions at the time $t4$. If either of these lines have signals impressed upon them (signals indicative of the unbarred OD64A or unbarred EV64A outputs) it will be indicated that there are eight bits at one of these locations. The AND gate 838 will not permit the setting of the NINZ flip-flop 66 which had been reset at time $t0$. Thus, a further request for memory access cannot be made and no additional information can be secured from the memory for transfer to the 64 character registers. However, as soon as a position exists where 8 bits do not exist, the signals $\overline{OD64A}$ and $\overline{EV64A}$ will be applied to AND gate 838 at time $t4$ to cause AND gate 838 to set flip-flop 66 and permit the initiation of a further memory access via AND gate 834.

Continuing the explanation of the manner of operation of the print synchronizer, it shall be assumed that this operation has continued for 32 successive transfers and that the 64 character registers 56 and 58 are now completely filled and that only the last characters stored contain eight bits in the first, third and fourth character positions in the 8 bit slot. As a result of the absence of the barred conditions of OD64A and EV64A, the NINZ flip-flop will remain reset and no further request for memory access can be made. It shall further be assumed that the paper feeding operation has since ceased and that the $\overline{PPZ}$ signal as shown in FIGURE 6 has been applied to 10 millisecond delay unit 474 and its output has been secured to set the flip-flop 476 and make available the signal PMCSD which indicates that the paper movement has been completed and stabilized. Under these conditions, the content of the 64 character registers may now be sensed for printout purposes to be described below. It should be recalled, that the complete filing of the registers 56 and 58 is not a prerequisite for the start of the printout operation. Printout may be started with only one word in the registers 56 and 58 when a comparison has been found between that word and the outputs of the code wheel counter 82 (FIGURE 10). It should further be pointed out that during the entire operation under which the 64 character registers were filled, the X and Y counters 94 and 96 have been continuously stepped in synchronism with the locations available for storage within the 64 character registers. Therefore, for example, the core 3 would be available for write-in information when location 3 of the 64 character registers were available to receive information. This stepping which was begun by the CLB signal was generated in the first reaching of the stature count 7 condition each subsequent $t4$ signal caused the X counter 94 to count and for each complete cycle of four counts by the X counter 94 the Y counter 96 was made to count. The cores within the agreement matrix 92 have not been set in any way during the loading operation and the stepping of the X and Y counters have had no effect.

PRINTING OPERATION

The manner in which the information stored within the 64 character registers 56 and 58 are printed out will now be considered with respect to FIGURES 5, 7, 9, 10, 12 and the timing diagram of FIGURE 16. The printing operation may be summarized as follows: Upon the arrival of the pulse indicating the odd sprocket condition (from binary counter 1030 of FIGURE 10), the odd line of the particular character (for example, the A) next available for printing by the type cylinder, will cause the code wheel counter 82 (FIGURE 10) to produce outputs indicative of this character. The code wheel counter signals will be compared against the contents of the odd 64 character recirculating register 56 and those points of comparison between the outputs of the code wheel counter 82 and the value stored in the 64 character odd register 56 noted. An indication of this comparison will be made by causing the corresponding core in the 64 core agreement matrix 92 to be set. Further, a signal will be placed in the 9th bit position of the word circulating in the 64 character register 56 to indicate that a comparison has been found and the printing of this character will be made. This 9 bit signal as explained before will prevent active comparison of this character with the code wheel counter outputs on later revolutions of the code wheel and circulations of the character within the register 56. As the type cylinder continues to move, it will next make available at an even sprocket time (defined by the output of the binary counter 1030 of FIGURE 10) the even line of the same character which was considered above. For example, the even line of the character line A. At the beginning of this even sprocket period, the information stored in the 64 core agreement matrix 92 will be read out to effect a maximum number of 64 odd hammers to print in all odd columns in which an A should be placed. Thus, if there were A's located in the odd columns 1 through 63 at this time all those columns will be printed. During the remaining portion of the even sprocket time, the comparison between the even line of the A would be made against the even recirculating 64 character register 58 and the agreement matrix 92 would be set to indicate this comparison. Again the 9 bit would be inserted in the characters of the 64 character recirculating register where such comparison was found. Upon the arrival of the next odd sprocket indicative of the odd line of the next following character, the information stored in the agreement matrix 92 during the even sprocket time would be printed before comparison could begin between the code wheel counter 82 and the values recirculating in the odd register 56. An additional detector will continually sense the presence of the 9 bits in each of the 64 character recirculating registers. This device detects the presence of 9 bits in each of the characters recirculating in the two 64 character registers and will produce a signal designated end of line to indicate that a complete line has been printed and that the device has completed printing a single line and is now capable of accepting further instructions.

Now considering the print operation in greater detail, it shall be assumed that the loading operation which will fill the 64 character registers has been completed and that the signal indicative of the fact that paper has been stabilized (the PMCSD signal) has been generated by the flip-flop 476 in FIGURE 6. It is also assumed that the flag signal which is the special resetting and synchronizing signal loctated between the last character of the type cylinder and a first character of that same type cylinder has caused the resetting of the code wheel counter 82 of FIGURE 10 as well as the binary counter 1030. As the type cylinder 1006 continues to rotate, the code wheel 1004 moved in synchronism therewith will be read by the read head 1008 to produce a series of sprocket pulses, one of which will correspond to each print position along the type cylinder. Upon receipt of the first such sprocket pulse, which for example, may correspond to the odd line of the character A, this sprocket signal will be amplified by the amplifier 1010 and passed to a pulse shaper 1012 where it will emerge as a signal designated SPKT of desired shape. This signal is applied to one input of AND gate 1014. It further is applied to an input of a delay flip-flop of 450 microseconds 1016. The signal supplied at the output of this delay flop is a signal SPKTD. The SPKTD signal is also applied to an inhibitory input of the AND gate 1014. The purpose of the inhibitory input signal SPKTD is to prevent the passage of any spurious signals through AND gate 1014 once a sprocket pulse signals has been detected. The time between the individual sprockets, that is signals SPCH8, is approximately 600 microseconds. Thus, once a sprocket pulse has been passed to the input of the gate 1014 it is impossible to pass a further one for a minimum period of 450 microseconds during which time the signal SPKTD is active to inhibit the AND gate 1014. The sprocket pulse SPKT is able to pass through the AND gate 1014 because the delay flop 1016 is responsive to the trailing edge of the sprocket pulse SPKT and is ineffective to stop the generation of an output from AND gate 1014 at this time. The output of the AND gate 1014 is applied to the set terminal of a first sync flip-flop 1018. The flip-flop is of the type which will produce an output immediately and does not require the usual one bit time delay for the output signal to rise. The set output signal of this first sync flip-flop is the signal SPKTF, the function of which will be described below. The signal SPKTF is applied to one input of the AND gate 1020 which also receives a timing signal t7 to apply a pulse to the set terminal of the second sync flip-flop 1022. The output of this flip-flop is the signal SPST1. The signal SPST1 is fed to a delay element 1024 of one bit time to generate the signal SPST1D. The signal SPST1 is fed to a first input terminal of the AND gate 1028 which receives at its second input terminal a t5 timing pulse to generate the signal SPSTR. The signal SPSTR will cause the resetting of the first sync flip-flop 1018. The generation of the signal SPSTR also causes in conjunction with the output SPST1 the resetting of the flip-flop 1022. In addition the signal SPSTR is also applied to one terminal of the binary counter 1030 to cause this counter to be set to its first count condition and produce an output signal described as the odd sprocket pulse. This pulse will continue for a period of approximately 600 microseconds until the binary counter 1030 is set by another incoming signal (caused by the next sprocket) to take up the even sprocket output signal for an additional 600 microseconds. This toggling of the binary counter 1030 back and forth creates alternate periods of odd and even sprockets in conformance with the availability of the odd and even lines of a particular print character on the type cylinder 1006. The even output of the binary counter 1030 or the even sprocket signal is applied to one input terminal of an AND gate 1032 which also receives the signal SPST1D to cause the generation of the input to the OR gate 1034 which will be applied as the stepping signal CDSTA to the code wheel counter 82. Thus, each time an even sprocket occurs there will be a stepping of the code wheel counter 82 to take up a pattern indicative of the next character which will be available for printing.

It will be assumed that the resetting signal applied to the code wheel counter 82 by the flag signal causes the generation of a pattern indicative of the first character to be available for printing. Each subsequent time an output signal is available from an even sprocket output of the binary counter 1030 the code wheel counter 82 will be caused to generate a pattern indicative of the next following character. In that the code wheel configuration is the same for both the first odd and the first even sprocket count, the code wheel generator is not changed until both lines have been made available for printing. The outputs of the code wheel counter designated CD1 through CD6 as well as the barred outputs $\overline{CD1}$ through $\overline{CD6}$ are transmitted over a series of lines to the input terminals of the comparison AND gates 906 through 916 of FIGURE 9. The AND gates 906 through 916 receive the unbarred output signals of the code wheel counter CD1, CD2, CD3, CD4, CD5 and CD6 in that order. In addition, the comparison device receives the output from the delay element 362 of FIGURE 5 which is the output of the 64 character odd register 56 or the output of the delay element 388 for the 64 character even register 58, as is shown on lines 15 and 16 of the timing diagram of FIGURE 16. The bit CD1 from the code wheel and the first bit of the recirculating value stored in the 64 character odd register 56 will be presented to the first comparison AND gate 906 at time t6. The output of the delay element 362 is fed via line 364 to a first input of the AND gate 900 of the comparator which also receives at its other input the odd sprocket signal generated by the binary counter 1030 of FIGURE 10. This signal will be passed through the OR gate 904 of FIGURE 9 to the inputs of each of the respective comparison AND gates 906 through 916. However, during this time only the AND gate 906 receives its other required inputs namely CD1 and *t*6 to cause it to produce an output. This output sets the flip-flop 920 which operates to give a static pattern indicative of the fact that a comparison has existed in this bit position. During the following time periods *t*7 through *t*2, the code wheel counter outputs CD2 through CD6 as well as the bit positions 2 through 6 of the incoming character of the odd register 56 will be compared. At each point at which a comparison is found, corresponding flip-flops 922 through 930 will be set to indicate this condition. The AND gate 932 is employed to sense the results of the comparison. This gate receives the set outputs of each of the flip-flops 920 through 930 and in addition a timing signal *t*3 to produce at time *t*3 a signal to the AND gate 934 if each position has compared, that is, there is a comparison existing in all bits 1 through 6 of the code wheel counter outputs and the information in the character then sensed in the odd register 56. This signal will be passed through the AND gate 934 if one of the six inhibitory signals is not present. These inhibitory signals are as follows: A signal 70D received from a delay flip-flop of 70 microseconds 936, which is actuated by the signal SPKTF generated by the first sync flip-flop 1018. This signal is to prevent the generation of a comparison signal while the code wheel counter 82 itself is being changed, that is a new code wheel counter output pattern is being set up. Further, the output of the AND gate 934 is inhibited by the presence of a signal PPZ. This signal is the signal which controls the paper advance device for movement and as long as PPZ is in the unbarred condition, such paper movement will continue. A further inhibitory input to the AND gate 934 is a signal ST0. This will prevent accidental indications of a comparison during the clearing operation. A further inhibitory input to AND gate 934 is the clear signal to insure that during the time the instruction is being received by the 64 character registers, this information cannot be employed for comparison with the code wheel counter 82. The final inhibitory input is the signal PRT to provide that a comparison operation cannot take place during the time that the information stored in the agreement matrix 92 is being printed out. Assuming all these inhibitory signals to be absent, a signal will be passed by the AND gate 934 to the set terminal of the flip-flop 938 which will provide an input to a further AND gate 940. This gate is further inhibited by the PRT signal for the same purposes as was stated with respect to the AND gate 934. Again, assuming the PRT signal to be absent, the output signal of the flip-flop 938 will be transferred during a time period *t*4 to the input of a further flip-flop 942. This signal is designated CPOK or 9 bit signal. The output of the flip-flop 942 is sensed by a further AND gate 944 which also receives inhibitory inputs of *t*4 and *t*5. The *t*4 signal is applied to prevent an output of the flip-flop 942 being sensed until it has reached its static output condition (the flip-flop 942 is also being set at the time period *t*4). The *t*5 signal is applied to inhibit AND gate 944 to prevent the indication of an output in the event that flip-flop 942 is to be reset due to the detection of a 9 bit already existing within the character being sensed. The manner of generation at this signal for resetting the flip-flop 942 is explained below.

Beginning with time period *t*6, the output signal designated CPID of the AND gate 944 is applied to an AND gate 946 which also receives the signal PMCSD (the output of the 10 millisecond delay element 476 of the FIGURE 6 and indicates that the paper has been stabilized after movement) and causes the generation of the 9 bit A on the output line 736 of AND gate 946. The 9 bit A signal is made available to permit the gates of the agreement matrix 92 to set an indication that agreement has been found in the various cores of the matrix. The comparison between exemplary words shown in lines 16 and 17 of the timing diagram of FIGURE 16 illustrates that the first two words are found to compare whereas the third word is not found to compare, that is there is no comparison between the type cylinder character and the words then stored in the 64 character register. For the words 1 and 2 the signal CPOK is generated, with the result that the signal CPID or 9 bit A, is generated. The 9 bit A signal will permit a setting of the cores in the positions X1, Y1 and X2 Y1 in a manner to be explained below. The setting of these cores is shown on lines 18 through 23 of the timing diagram of FIGURE 16.

The manner of setting the cores in the agreement matrix 92 will now be discussed with reference to FIGURE 7. Assuming the first word in the 64 character odd register 56 is being sensed, the four stage binary Y counter 96 will produce a count which decoded by the decoder matrix 734 will cause the application of a first input signal to the AND gate 700. The second input to this gate will be provided by the input of the 9 bit A signal on the line 736. As shown in the timing diagram of FIGURE 16, lines 16 and 17, there was agreement in the first word between the code wheel counter output and the bits of the 64 character odd register 56. Therefore, there would be during the time period starting at time *t*6, the generation of this signal 9 bit A. Further, the X counter 94 would have its first stage 750 set to produce a first input to the AND gate 770. The output signal 9 bit A on the line 736 will also be coupled to the second inputs of each of these AND gates 770, 772, 774 and 776, thus providing that the AND gate 770 was fully permitted to provide half the selection current required for switching the core at the junction X1 Y1. The AND gate 700 would provide the second half of the required switching current and the core at the junction X1, Y1 would be the only core to so receive the necessary switching current and would be set. The next timing signal *t*4 would cause the flip-flop 752 to be placed in its set condition. This would result from the set output of the flip-flop 750 being applied to one input of the AND gate 760 as well as the timing signal *t*4 applied to the second input, this causing the setting of the flip-flop 752. Thus when there is comparison found between the code wheel combination and the second word as shown in the FIGURE 16, the signal 9 bit A again will be generated and applied to the line 736 causing the core at the intersection of the points X2 Y1 to be switched to indicate a comparison at this point. As shown in the timing diagram of FIGURE 16, the third word does not result in the comparison; therefore, the 9 bit A signal would not be present on the line 736. The set output of the flip-flop 752 would apply a first input to the AND gate 762 which would also receive a timing pulse *t*4 to cause the setting of the flip-flop 754 and thus provide a first input to the AND gate 774. However, this AND gate 774 would not receive a 9 bit A signal on the line 736 and would fail to produce an output. Similarly, the AND gate 700 although receiving a first input from the decoder matrix 734 would not receive the second input required, that is the 9 bit A signal on the line 736 and would fail to produce an output. Therefore, the core at the point X3 Y1 would not be set and as such would fail to indicate that a comparison has resulted. It should be recalled that the X and Y counters are continuously running during the entire operation from the time that the generation of the CLB signal generated as a result of the stature counter reaching the stature count 7 for the first time. These devices are synchronized in accordance with the transfer of the first character of information into the 64 character registers and are continuously stepped in synchronism with the recirculation of said first entered character so as to always indicate the location within the memory which has arrived at a particular point, that is, the read station with respect to the first entered data.

The operation of comparison and marking of the cores of the 64 character agreement matrix 92 will continue until the odd sprocket pulse disappears. In that the total time required for recirculation of a single word within a 64 character loop is 256 microseconds and the time that individual sprocket pulses are available is 600 microseconds there will be slightly more than 2 complete revolutions of the contents of the odd register 56 during this odd sprocket period. This is to insure that each position in the 64 character register is adequately sensed and the proper core associated therewith is marked. As was indicated above, once an agreement was found and a 9th bit was inserted in the character, no further such insertion or attempted setting of the cores could be made. Thus, despite the fact that the information is rotated twice, the associated core will be set only once for each position.

The manner of preventing subsequent settings of the cores and the attempted reinsertion of the 9 bit in the character will be set forth as follows with respect to the gates of FIGURE 9. Although only the bit positions one through six are sensed by means of the comparison AND gates 906 through 916, all nine bits of a character are fed to the input of the AND gate 900. Thus, there will be available a signal on a line 64LP to one of the inputs of the AND gate 918 at all time periods during each character transfer. However, only at time $t5$ will the AND gate 918 receive its required inputs to produce an output signal. The signal present on the line 64LP at $t5$ will be the 9 bit position of the character being examined. Thus, if there is a one bit in the 9th bit slot a signal will be produced at $t5$ which will pass through the OR gate 948 to cause the resetting of the flip-flop 942 and prevent the generation of the 9 bit A signal. It is because of this possible resetting of the flip-flop 942 during time $t5$ that the signal $t5$ is applied as an inhibitory input to the AND gate 944 as described above. The comparison device will be reset by the application of timing pulses $t4$ to the reset inputs of the flip-flops 920 through 930, the application of a $t3$ timing signal to the OR gate 948 which will generate an output to the reset terminal of flip-flop 942 and finally, the application of the timing signal $t6$ to the reset terminal of the flip-flop 938, thus making the device available at time $t6$ for each subsequent character as it is presented. The operation of the device is quite the same for the application of the outputs of the even 64 character recirculating register 58. At this time, however, the AND gate 902 will furnish the input to the OR gate 904. AND gate 902 will respond to the output of the even 64 character register 58, that is the signal EV64A on the line 390 from the delay element 388 of the 64 character register 58, as well as the even sprocket from binary counter 1030 (FIGURE 10) to gate the even characters to the respective comparison AND gates 906 through 916.

The 9 bit A signal on the line 736 also serves an additional purpose as will be described now. When a comparison has resulted, a signal is generated to indicate that the device is now ready for printing purposes. The signal 9 bit A on the line 736 is introduced to the set input of a ready flip-flop 1200 appearing on FIGURE 12, to produce a signal one bit time later marked "Ready." The Ready signal applied to one input of the AND gate 1202 which also receives an SPKTF signal generated by the first sync flip-flop 1018 of FIGURE 10. This signal SPKTF is not available to gate the Ready signal through the AND gate 1202 at this time. The SPKTF signal as shown in the FIGURE 16 at line 7 has terminated before the Ready signal is made available. Thus, for example, when considering the comparison of the odd register with the odd line of a particular character the agreement matrix 92 can only be set at this time but no printing may take place. As has been described above the procedure of comparison between the odd type cylinder position and the odd 64 character recirculating register 56 continues, until the next sprocket pulse (which is the even sprocket pulse and is indicative of the fact that the character even line is now being read) is available. As soon as the signal SPKTF caused by the following sprocket signal, that is, the even sprocket signal is available, the necessary inputs to the AND gate 1202 are available. These signals are the Ready signal which resulted from a first comparison during the previous odd sprocket time and the SPKTF signal generated due to the arrival of the even line sprocket. AND gate 1202 will then provide an output signal designated SPRT which is applied to a first delay element 1204 of 14 bit times and a second delay element 1206 of 15 bit times. The output of the delay 1204, designated SPRTOE, is fed to the input of a further flip-flop 1208 to cause it to generate one bit time later an output signal to the inputs of the AND gates 1214 and 1216. These AND gates also receive as additional inputs, the odd and even sprockets respectively. AND gate 1214, thus, is responsive to the output of flip-flop 1208 and the odd sprocket to produce an even print signal PRTEVA, whereas the AND gate 1216 is responsive to the output of the flip-flop 1208 and the even sprocket to produce the odd print signal PRTODA. This apparent reversal of the signals is due to the fact that upon the occurrence of an even sprocket the device is now ready to print out the formation stored in the matrix 92 which was set as a result of the comparison of the odd line and the odd 64 character register 56. In a similar fashion, the following odd sprocket will cause the readout of the information which has been set up in the 64 character agreement matrix 92 during the even sprocket time wherein there was a comparison between the even line of the character and the even 64 character register 58. The output of the delay element 1206 is fed through an OR gate 1218 to one input of a delay flop 1220 which is of 5 bit time duration and which will provide a signal PRT for this entire 5 bit time. Thus, as shown in FIGURE 16 at lines 45 and 43, the PRTODA and PRT signals will be both be present to cause the readout of the information in the 64 character agreement matrix 92. The flip-flop 1208 will be reset to terminate these input signals to the AND gates 1214 and 1216, 9 bit times after the original setting pulse is available to the flip-flop 1208. This is due to the application of the output of the delay element 1204 being passed to the input of a 9 bit delay element 1210 which in turn produces an output designated RPRTOE. The signal RPRTOE is applied to a first input terminal of the OR gate 1212, the output of which is applied to the reset terminal of the flip-flop 1208. Thus, the signals PRTEVA and PRTODA are made available for 9 bit times whereas the output PRT is available for merely five. These periods, however, are long enough to permit the readout and sensing of the information in the agreement matrix 92 during their respective sprocket times and not interfere with the comparison operation which will take place once the PRT signal has ceased. It should be recalled that the PRT signal is applied as an inhibitory input to the AND gate 934 as well as the AND gate 940 to prevent the generation of the 9 bit signal indicative of agreement between the particular 64 character register and the code wheel combination. Thus, it is after printout has been completed for the contents of the matrix that the matrix may again be set to show comparison between the odd or even register and the odd or even line depending upon which sprocket pulse is available at that time. During the remaining portion of this sprocket period, the values in the even register 58 are compared against the even line of the particular character on the type cylinder and all points of agreement noted. The same procedure which was employed for noting comparison with regard to the odd register, will be followed with regard to the even register. It will be during the next odd sprocket that the signal SPKTF will again be generated to permit the readout of those comparison values found in the even sprocket time as described above.

The printing procedure will now be set forth in greater detail. The generation of the PRT signal as well as the PRTODA signal will take place as described above. These signals are applied to the respective gates 780 and 782 (FIGURE 7) to provide the printout of this information in the following manner. The PRT signal is applied to a winding which threads every core of the 64 core agreement matrix 92 and has sufficient current provided to cause the switching of all cores back to their reset condition. Each one of the cores of the 64 core matrix is additionally provided with another output winding R0 which terminates in an individual pair of AND gates such as 780 and 782. Thus, there will be 64 such readout windings R0 one connected to each one of the cores and 64 pairs of such readout AND gates such as 780 and 782. For example, the readout winding illustrated in FIGURE 7 links the core in the position X1 Y16 and will provide its output to a pair of AND gates 780 and 782. The AND gate 780 is made responsive to the signal PRTODA generated by the AND gate 1216 of FIGURE 12 that is available during the even sprocket time as explained above. This gate will provide a signal designated print odd to operate an odd hammer actuator in the actuator group 1050 in FIGURE 10. During the following period when the even information is to be read out generation of the PRTEVA signal will be applied to the AND gate 782 to cause the print even signal to be generated, thus, actuating an even column hammer in the bank 1050. The reason for the use of these two gates is obvious. If the same matrix is used for both odd and even marking purposes, that is, to register agreement during the odd and even comparisons it is necessary that each readout be gated either to an odd or an even hammer to cause the proper placement of the character on the printed page. Thus, only one of the AND gates 780 or 782 can be made available for printing purposes during an odd sprocket time as determined by the signals PRTODA and PRTEVA.

As was stated above, the six flip-flops of the code wheel counter 82 gives a possibility of 64 discrete count levels and as further described there are only 51 discrete characters which are located around the circumference of the type cylinder 1006. That is, there are 51 discrete characters, alphabetic, numeric, and special characters which may be printed by the device. To prevent the printing out erroneously of any one of the remaining 13 characters which are not provided for by the type cylinder 1006 but which are included within the possible 64 counts of the code wheel counter 82, the untranslatables matrix 950 in FIGURE 9 is included to account for these unused combinations. As shown in FIGURE 9, matrix 950 is made responsive to the output line 64LP, that is it receives signals passed by the OR gate 904 which are the signals OD64A gated at the odd sprocket and EV64A gated at the even sprocket. In addition, the matrix receives the signals CD1 through CD6 or the outputs of the code wheel counter 82. The matrix may take the form of a core, diode or resistance matrix prewired, as is well known in the art, wherein the undesired combination of inputs cause the generation of a single signal indicating that the received signal groups are one of the prohibited combinations. This output signal will be fed to a pair of AND gates 952 and 954. The AND gate 952 is also controlled by the odd sprocket signal and a $t4$ signal to produce an odd space signal which will be fed to the hammer actuator bank 1050 to prevent printing of any information during this time and in effect cause the printing of a space. A similar fashion the AND gate 954 will be responsive to the indication of untranslatable combination, the even sprocket signal and a $t4$ timing signal to produce an even space signal which will also cause the inhibition of the hammer actuators in the bank 1050 and cause the generation of a space for this combination. In addition, the signal produced by the untranslatable matrix will be fed as a signal designated "SKIP" to the OR gate 1034 of FIGURE 10. This signal will cause the code wheel counter 82 to advance to some further sequential combination which is the combination representing the next character which is available for printing. In this manner, by inhibiting printing of possible characters in the columns which contain the untranslatable character and by causing the code wheel counter 82 to be advanced, no unwanted printing takes place.

The operation of comparison and printout will continue until every character stored in each of the 64 character recirculating registers 56 and 58 contain a 9 bit indicative that the operation is now complete and all information within the 64 character registers 56 and 58 have been printed out and that the device is now free to accept a further instruction. The device for carrying this out is the end of line generator shown at the rightmost portion of FIGURE 5. This generator consists of an OR gate 406 responsive to an input on the line 352 from the output of the delay element 350 of the 64 character odd recirculating register 56. The output on the line 352 is designated OD64B. The OR gate 406 is further responsive to the EV64B signal on line 376 from the output of the delay element 374 of the 64 character even recirculating register 58. As shown, the signals necessary for operation in the OR gate 406 are the barred conditions of either or both of the signals OD64B and EV64B. The output of the OR gate 406 is fed to a first input of the AND gate 408 which also receives the timing signal $t6$ as well as the inhibitory input PRT. The inhibitory input PRT serves to prevent the false generation of a signal from the sensing of the 64 character registers 56 and 58 while the content of the agreement matrix 92 is being printed out. The output of the AND gate 408 is fed to the set input terminal of the end of line flip-flop 410, the output of which is introduced to one input of an AND gate 412. The AND gate 412 also receives a timing signal $t0$ and a further timing signal from the second sync flip-flop 1022 designated SPST2. The output of the AND gate 412 is designated $\overline{EOL}$ meaning this is not the end of the line. When the end of line flip-flop 410 is reset by the output of the AND gate 301, which receives timing signal $t4$ and the signal SPST2, it generates the reset signal end of line or EOL.

The manner of operation of this circuit will now be set forth: It should be stated that as long as there are positions in the 64 character recirculating registers 56 and 58 which do not have 9 bits in them, the end of the line has not been reached and the end of line barred signal should be generated. In the event, however, that there can be found no place where there is a 9 bit absent in the 64 character registers, then it is desired that the flip-flop be reset or remain in a reset condition and the end of line signal, indicative of the fact that each of these registers are full, be generated. Thus if the $\overline{OD64B}$ or $\overline{EV64B}$ are available indicative that the 9 bit position is zero in a particular character, there will be an output created by the OR gate 406 which at the time period $t6$ will set the flip-flop 410. The $t6$ timing signal is employed to gate the output of the OR gate 406 to the AND gate 408 because it is at $t6$ that the 9th bit position is being sensed at the output of the delay element 350 in the odd register 56 and the output of the delay element 374 in the even register 58. The output of the end of line flip-flop 410 is sensed by means of a further AND gate 412 which receives inputs of $t0$ and a signal SPST2. The SPST2 signal is the reset output of the second sync flip-flop 1022 of the FIGURE 10 and arrives at time $t6$ following the resetting of the flip-flop 1022 during the time period $t5$ due to the action of the signal SPSTR and the output SPST1 as explained above. The signal SPST2 will persist during the remaining portion of the sprocket time until the sync 2 flip-flop 1022 is placed in a set condition by the action of the SPKTF signal and a timing signal $t7$. Thus, once the end of line flip-flop 410 has been set, the AND gate is capable of producing an output at each time signal *t*0. The end of line flip-flop 410 is reset by the output of the AND gate 301 which receives signals of SPST2 and a timing signal *t*4. This signal SPST2 will be on for the duration of the sprocket once it has been turned on as explained above, thus it will be the timing signal *t*4 which controls the resetting of the end of line flip-flop 410 in the same sense that signal *t*0 will control turning on of the signal EOL. The sequence of events which occur are as follows. As the 9th bit passes the output of the respective delay elements a signal is fed to the inputs of the OR gate 406. The signal produced thereby is passed through AND gate 408 at time *t*6 to set the end of line flip-flop. This set signal of the end of line flip-flop will be sensed at *t*0 time to produce an end of line barred signal (EOL) indicating that the flip-flop 410 has been set, and there are characters in the 64 character registers which have not as yet been printed out and, therefore, the end of line has not been reached. In the following time period *t*4, the flip-flop is reset to produce the end of line signal. At the beginning of a cycle of operation, the flip-flop 410 is reset by the application of the SPST2 and *t*4 signals to the AND gate 301 to produce the end of line signal EOL to indicate that there are no places available in the 64 character registers which do not contain the nine bit. If during the following inspection cycle there can be found no place where the 9 bit has not been inserted, the device cannot be set to generate the not end of line condition (EOL). The EOL output of the EOL flip-flop 410 is sensed by a further AND gate 414 at time SPKTF, that is, at the beginning of the following sprocket time to determine whether or not the last circulation of the 64 character registers produced an indication that the line has been completed. Thus, if the flip-flop 410 is originally set by the *t*4 pulse and the SPST2 signal and an entire pass of the 64 character registers has been made during which there is no word with a 9 bit not inserted in the 9th position, then the EOL flip-flop 410 will not be set to produce an output EOL and the signal EOL will be available during the SPKTF time period to generate a signal which will be fed to a first input of the action complete flip-flop 54 as shown in the FIGURE 8, thus terminating the operation and placing the device in such a condition to be ready to accept further information for it to carry out.

While there have been shown and described and pointed out the fundamental novel features of the invention as applied to the preferred embodiment, it will be understood that various omissions and substitutions and changes of the form and details of the device illustrated and its manner of operation may be made by those skilled in the art, without departing from the spirit of the invention.

The embodiments of the invention in which an exclusive property or privilege is claimed are defined as follows:

1. A synchronizer for transmitting data in the form of pulses from a source to a receiver where the rate of data transmission from the source is different from the rate of data reception by the receiver, said data comprising sets of groups of pulses, each group having a number of pulse positions wherein a first portion of the pulse positions is available for pulses indicative of a character and a second portion is available for control pulses, and each set comprises a number of said groups, said synchronizer comprising: a recirculating shift register means having an input and an output for receiving a plurality of sets of groups of pulses from said source; means for automatically inserting a pulse into a selected pulse position of a second portion of some of the said groups in a set as said groups of a set are received by said register means, the inserted pulses identifying the last set received by said register means; and control means coupled to said recirculating register means and governed by said inserted pulses of said last set, for causing the transfer into said recirculating register means of the next set in a position next to the last set previously received and for altering the past combination in a second portion of the groups comprising the set previously received.

2. The synchronizer defined in claim 1 further comprising apparatus coupled to the output of said recirculating shift register means and selectively responsive to each of the digits therein as it passes said output and for inserting indicia at another selected pulse position in said second portion of the pulse positions comprising a digit to which said apparatus responds.

3. A synchronizer for transmitting data in the form of pulses from a source to a receiver wherein the rate of data transmission from the source is different from the rate of data reception by the receiver, said data comprising sets of groups of pulses, each group having a number of pulse positions wherein a first portion of the pulse positions is available for pulses indicative of a character and a second portion is available for control pulses, said synchronizer comprising: a recirculating shift register means having an input and an output for receiving a plurality of sets of groups of pulses from said source; and apparatus coupled to the output of said recirculating register means selectively responsive to each of the digits therein as it passes said output and for inserting an indicia in a selected pulse position of said second portion of the pulse positions comprising a digit to which said apparatus responds.

4. In a high speed printer synchronizer for transmitting data comprising digits to be printed from a source to an apparatus for printing said data wherein the rate of data transmission from the source is different from the rate of data reception by said apparatus, a buffer storage device comprising: high speed storage means capable of storing an entire line to be printed out; means to feed individual digits of data to said storage means; means to insert after selected digits a special character to identify the location of said digits; means to alter said character of a selected digit upon the entry of further digits into said storage means; and means responsive to the detection of said special characters in the digits stored in all the storage locations of said storage means to prevent further feeding of data to said storage means.

5. In a high speed printer synchronizer for transmitting data comprising digits to be printed from a source to an apparatus for printing said data wherein the rate of data transmission from the source is different from the rate of data reception by said apparatus, a buffer storage device comprising: two high speed storage devices capable of storing an entire line to be printed out; means to alternately feed individual digits of data to each of said storage devices; means to insert after selected digits a special character to identify the locations of said digits; means to alter said character of a selected digit upon the entry of further digits into said storage devices; and means responsive to the receipt of all the digits constituting a complete line to be printed out to prevent further feeding of data to said storage devices.

6. In a high speed printer synchronizer for transmitting data comprising digits to be printed from a source to an apparatus for printing said data wherein the rate of data transmission from the source is different from the rate of data reception by said apparatus, a buffer storage device comprising: a high speed storage means capable of storing the digits of an entire line of data to be printed; means including a plurality of digit registers for accumulating and transferring data to said storage means; means to insert a special character with selected digits of said data in said digit registers as said selected digits are transferred to said high speed storage means; means responsive to the transfer of further data to said high speed storage means to alter said special characters of selected digits; and means responsive to the detection of said special characters in the digits stored in all the storage locations of said storage means to prevent further feeding of data to said storage means.

7. In a high speed printer synchronizer for transmitting data comprising digits to be printed from a source to an apparatus for printing said data wherein the rate of data transmission from the source is different from the rate of data reception by said apparatus, a buffer storage device comprising: two high speed storage devices capable of storing the digits of an entire line of data to be printed; means including four recirculating registers for accumulating and transferring data alternately to said storage devices; means to insert a special character with selected digits of said data in said recirculating registers; means responsive to the transfer of further data to said storage devices to alter said special characters of selected digits; and means responsive to the altered condition of all of the selected digits of data and to one unaltered selected digit stored in said storage devices to prevent further feeding of data to said storage devices.

8. In a high speed printer synchronizer for transmitting data comprising digits to be printed from a source to an apparatus for printing said data wherein the rate of data transmission from the source is different from the rate of data reception by said apparatus, a buffer storage device comprising: two high speed storage devices capable of storing the words of an entire line of data to be printed; means including four recirculating registers for accumulating the digits which constitute a word of data, and transferring each word as completed alternately, digit by digit to said storage devices; means to insert in selected digits a special character in selected ones of said digits; means responsive to the transmission of each word after the first, for altering the special character in selected digits of the preceding word transferred; and means responsive to the altering of one less than all of the special characters in said selected digits and to one unaltered selected digit for terminating the transfer of words to said storage device.

9. A high speed synchronizer for transmitting data in the form of pulses from an input source to a receiver wherein the rate of transmission from said source to said synchronizer is different than the rate of data reception by said receiver from said synchronizer, said data comprising sets of groups of pulses, each set comprises a number of said groups, and each of said groups having a number of pulse positions wherein a first portion of said pulse positions are available for pulses indicative of a coded character and a second portion is available for control pulses, said synchronizer comprising: two recirculating register means, each having an input and an output for receiving alternate groups of said sets of pulses from said input source; means for automatically inserting a pulse into a selected pulse position of said second portion in selected groups of a set received by said register means, the inserted pulses identifying the last set received by said register means; means controlled by said inserted pulses of said last set placed in said recirculating register means, for causing the transfer into said recirculating register means of the next set from said input source, to a position in said recirculating means immediately next to said last set and for altering the inserted pulse in a selected group of said last set so that said last set no longer identifies the last set received by said register, but permitting said presently received set to now indicate it is the last set received by said recirculating register means; and means responsive to the altered inserted pulse position in the sets of one less than the total number of set positions in said register means and the unaltered inserted pulse position in the remaining set position of said register means to terminate the further transmission of data from said input source to said synchronizer.

10. A high speed synchronizer for transmitting data in the form of pulses from an input source to a receiver wherein the rate of transmission from said source to said synchronizer is different than the rate of data reception by said receiver from said synchronizer, said data comprising sets of groups of pulses, each set comprises a number of said groups, and each of said groups having a number of pulse positions wherein a first portion of said pulse positions are available for pulses indicative of a coded character and a second portion is available for control pulses, said synchronizer comprising: recirculating register means, having an input and an output for receiving alternate groups of said sets of pulses from said input source; means for automatically inserting a pulse into a selected pulse position of said second portion in selected groups of a set received by said register means, the inserted pulses identifying the last set received by said register means; means controlled by said inserted pulses of said last set placed in said recirculating register means, for causing the transfer into said recirculating register means of the next set from said input source, to a position in said recirculating means immediately next to said last set and for altering the inserted pulse in a selected group of said last set so that said last set no longer identifies the last set received by said register, but permitting said presently received set to now indicate it is the last set received by said recirculating register means; and means responsive to the presence of inserted pulses in all set positions in said register means to terminate the further transmission of data from said input source to said synchronizer.

11. A high speed synchronizer for transmitting data in the form of pulses from an addressable input source to a receiver wherein the rate of transmission from said source to said synchronizer is different than the rate of data reception by said receiver from said synchronizer, said data comprising sets of groups of pulses, each set comprises a number of said groups, and each of said groups having a number of pulse positions wherein a first portion of said pulse positions are available for pulses indicative of a coded character and a second portion is available for control pulses, said synchronizer comprising: a cyclic multi-stage counting means to control the opertaion of said synchronizer, said synchronizer performing distinct operations for each step of said counting means; an address register coupled to said input source to select data from discrete addresses therein; recirculating register means, having an input and an output for receiving alternate groups of said sets of pulses from said input source; means for automatically inserting a pulse into a selected pulse position of said second portion in selected groups of a set received by said register means, the inserted pulses identifying the last set received by said register means; means controlled by said inserted pulses of said last set placed in said recirculating register means for causing said counting means to begin a further cycle of operation; means connecting a predetermined stage of said counter to said address register to cause said address register contents to be altered and select the data stored in said input source at the altered address; said selected data being transferred into said recirculating register means immediately next to said last set; means responsive to the transfer of said selected data for altering the inserted pulse in a selected group of said last set so that said last set no longer identifies the last set received by said register, but permitting said presently received set to now indicate it is the last set received by said recirculating register means; and means responsive to the presence of inserted pulses in all set positions in said register means to prevent said counter means from recycling and terminate further transmission of data from said input source to said synchronizer.

12. A high speed synchronizer for transmitting data in the form of pulses from an input source to a receiver wherein the rate of transmission from said source to said synchronizer is different than the rate of data reception by said receiver from said synchronizer, said data comprising sets of groups of pulses, each set comprises a number of said groups, and each of said groups having a number of pulse positions wherein a first portion of said pulse positions are available for pulses indicative of a coded character and a second portion is available for control pulses, said synchronizer comprising: first means to receive and store a plurality of said sets of data in sequential storage locations and second means coupled to said first means for producing a first signal indicative of available storage locations within said first means; means to control the transfer of said sets from said input source to said first means; a priority circuit responsive to said first signal and capable of actuating said control means upon the satisfaction of certain preset conditions to permit the transfer of one said set of data each time said first signal is made available.

13. A device as set forth in claim 12, further comprising a second means to automatically insert a pulse into a selected pulse position of said second portion in selected groups of a set received by said first means, the inserted pulses identifying the last set received by said first means.

14. A high speed synchronizer for transmitting data in the form of pulses from an input source to a receiver wherein the rate of transmission from said source to said synchronizer is different than the rate of data reception by said receiver from said synchronizer, said data comprising sets of groups of pulses, each set comprises a number of said groups, and each of said groups having a number of pulse positions wherein a first portion of said pulse positions are available for pulses indicative of a coded character and a second portion is available for control pulses, said synchronizer comprising: first means to receive and store a plurality of said sets of data in sequential storage locations; second means to sense the storage locations of said first means and produce a first signal if there are storage locations in said first means capable of receiving and storing a single set of said data and produce a second signal if there are no storage locations in said first means capable of receiving and storing a single set of said data; third means responsive to said first signal of said second means to produce a third signal indicative that a single one of said sets may be transferred to said first means; a priority circuit responsive to said third signal to cause the transfer of a single one of said sets to said first means when certain preset conditions of said priority circuit have been met and to prevent such transfer until said conditions have been met, means to automatically insert a pulse into a selected pulse position of said second portion in selected groups of a set received by said first means, the inserted pulses identifying the last set received by said first means; fourth means for sensing the presence of said inserted pulses at predetermined storage locations in said first means to cause said second means to issue said first signal to initiate the transfer of a further single set of said data to said first means from said input means said first signal also altering the inserted pulse in a selected group of said last set transferred to said first means preparatory to the transfer of said further set to said first means; said third means further being responsive to said second signal to terminate the transfer of sets of data to said first means.

15. A high speed synchronizer for transmitting data in the form of pulses from an input source to a receiver wherein the rate of transmission from said source to said synchronizer is different than the rate of data reception by said receiver from said synchronizer, said data comprising sets of groups of pulses, each set comprises a number of said groups, and each of said groups having a number of pulse positions wherein a first portion of said pulse positions are available for pulses indicative of a coded character and a second portion is available for control pulses, said synchronizer comprising: first means to receive and store a plurality of said sets of data in sequential storage locations; second means to sense the storage locations of said first means and produce a first signal if there are storage locations in said first means capable of receiving and storing a single set of said data and produce a second signal if there are no storage locations in said first means capable of receiving and storing a single set of said data; program control means to produce signals to control the operation of said synchronizer; third means responsive to said first signal and said program control means to produce a third signal of a preassigned priority indicative that a single one of said sets may be transferred to said first means; a priority circuit responsive to said third signal and to the priority indicating signals of further peripheral equipment to cause the transfer of a single one of said sets to said first means if signals of higher preassigned priority are not present and to delay said transfer, if higher preassigned priority are present, until such higher preassigned priority signals are no longer present; fourth means to automatically insert a pulse into a selected pulse position of said second portion in selected groups of a set received by said first means, the inserted pulses identifying the last set received by said first means; fifth means for sensing the presence of said inserted pulses at predetermined storage locations in said first means to cause said second means to issue said first signal; stepping means responsive to said first signal to cause said program means to be advanced to a program step calling for data from said input means to said first means; said first signal further causing the alteration of said inserted pulse in a selected group of said last set transferred to said first means in preparation for the transferral to said first means of said further set; said third means further being responsive to said second signal to prevent stepping of said program means and to terminate further transfers of said sets of data to said first means.

16. The synchronizer defined in claim 15, wherein said first means comprises four recirculating buffer storage devices, each capable of receiving and storing a single group of said set; said first means further comprising two recirculating storage devices each having an input and an output and each capable of receiving and storing a plurality of said sets of data; and means interconnecting two of said buffer storage devices to the respective inputs of each of said storage devices and operable under control of said program means to alternately transfer the contents of said buffer storage devices to said associated storage devices.

17. A synchronizer for transmitting data in the form of pulses from a source to a receiver with the rate of data transmission from the source is different from the rate of data reception by the receiver, said data comprising sets of groups of pulses, each group having a number of pulse positions wherein a first portion of the pulse positions is available for pulses for control pulses, said synchronizer comprising: a recirculating shift register means having an input and an output for receiving a plurality of sets of groups of pulses from said source; utilization means, capable of producing signals indiactive of the character desired; comparison means connected to said utilization means and the output of said recirculating shift register means and responsive to said character desired signals and the plurality of sets of groups of pulses in said recirculating shift register means to insert a pulse into a selected further pulse position of said second portions of the pulse positions of said group where said agreement is found between the character desired signals and the output signals of said recirculating shift register means.

18. The synchronizer defined in claim 17 further comprising a detecting means responsive to said pulse in said selected further pulse position of said second portion of the pulse positions of said group as it circulates in said recirculating shift register means to prevent the further insertion of a pulse in said selected further pulse positions on all recirculations of said group after the one in which said pulse was inserted.

19. A synchronizer for transmitting data in the form of pulses from a source to a receive where the rate of data transmission from the source is different from the rate of data reception by the receiver, said data comprising sets of groups of pulses, each group having a number of pulse positions wherein a first portion of the pulse positions is available for pulses for control pulses, said synchronizer comprising: a recirculating shift register means having an input and an output for receiving a plurality of sets of groups of pulses from said source; printing means, capable of producing signals indicative of the character available for printing; comparison means connected to said printing means and the output of said recirculating shift register means and responsive to said character available signals and the plurality of sets of groups of pulses in said recirculating shift register means to insert a pulse into a selected further pulse position of said second portion of the pulse positions of said group where agreement is found between the character available signals and the output signals of said recirculating shift register means.

20. The synchronizer defined in claim 19 further comprising an agreement matrix to record the positions of agreement between said character available signals and the output of said recirculating shift register means; marking means connected to said comparison means to cause the recording in said matrix of agreement at a point corresponding to the relative location in the recirculating shift register means where said group which agreed was located.

21. The synchronizer defined in claim 19 further comprising a detecting means responsive to said pulse in said selected further pulse position of said second portion of the pulse positions of said group as it circulates in said recirculating shift register means to prevent the further insertion of a pulse in said selected further pulse positions on all recirculations of said group after the one in which said pulse was inserted.

22. The synchronizer defined in claim 20 further comprising a detecting means responsive to said pulse in said selected further pulse position of said second portion of the pulse positions of said group as it circulates in said recirculating shift register means to prevent the further insertion of a pulse in said selected further pulse positions on all recirculations of said group after the one in which said pulse was inserted, and to prevent said marking means from re-recording the agreement in said agreement matrix.

23. The synchronizer defined in claim 22 further comprising print actuating means responsive to said agreement matrix to cause print out in all positions of the print means wherein an agreement was recorded, subsequent to the finding of at least one position of agreement.

24. The synchronizer defined in claim 23 further comprising print inhibiting means responsive to said detecting means to terminate the printing operations when said detecting means detects said inserted pulse in said further pulse positions of all the storage locations of said recirculating shift register means.

25. The synchronizer defined in claim 23 further comprising double print inhibiting means responsive to said detecting means to prevent additional printing of said group when a pulse is located in said selected further pulse position of said second portion of the pulse positions of said group.

26. The synchronizer defined in claim 16 further comprising printing means capable of producing signals indicative of the print character available for printing; comparison means connected to said printing means and the output of said storage devices and responsive to said character available signals and the plurality of sets of groups of pulses in said storage devices to insert a pulse into a selected further pulse position of said second portion of the pulse positions of said group where agreement is found between the character available signals and the output signals of said storage means; an agreement matrix to record the positions of agreement between said character available signals and the output of said storage devices; marking means connected to said comparison means to cause the recording in said matrix of agreement at a point corresponding to the location in the storage means where said group which agreed was located; and detecting means responsive to said pulse in said selected further pulse position of said second portions of the pulse positions of said group as it recirculates in said storage means to prevent the further insertion of a pulse in said selected further pulse position on all recirculations of said group after the one in which said pulse was inserted and to prevent said marking means from re-recording the agreement in said agreement matrix.

27. The synchronizer defined in claim 26 further comprising print actuating means responsive to said agreement matrix to cause print out in all positions of the print means wherein an agreement was recorded, subsequent to the finding of at least one position of agreement.

28. The synchronizer defined in claim 27 further comprising double print inhibiting means responsive to said detecting means to prevent additional printing of said group when a pulse is located in said selected further pulse position of said second portion of the pulse positions of said group.

29. The synchronizer defined in claim 27 further comprising print inhibiting means responsive to said detecting means to terminate the printing operation when said detecting means detects said inserted pulse in said further pulse positions of all the storage locations of said recirculating storage means.

30. A synchronizer for transmitting data and instructions in the form of pulses from an addressable input source to a receiver with the rate of data transmission from a source is different from the rate of data reception by the receiver, said data comprising sets of groups of pulses, each group having a number of pulse positions wherein a first portion of the pulse positions is available for control pulses, said synchronizer comprising: a multi-stage counting means capable of remaining in any one of a plurality of count conditions adapted to provide control signals for said synchronizer; a counter control matrix coupled to said counting means and arranged to place said counting means in any one of said count conditions; an address register coupled to said addressable input source and adapted to address and withdraw data or instructions from said source; means responsive to a first of said count conditions to cause an instruction to be withdrawn from said source and placed in said address register; means to couple a portion of said address register to said counter control matrix to cause said counter to be advanced to a further count condition; a circulating register means having an input and an output for receiving a plurality of sets of groups of pulses from said source; means responsive to said further count to cause said address register to address said source and to transfer data from said source to said circulating register means; means coupled to said counter control matrix to advance said counter as said data is transferred to said circulating register means; and means responsive to the completion of said transfer of data to cause said counter control matrix to return said counter to said second count condition, said recycling of said counter continuing until the storage capacity of said circulating register means is reached.

References Cited by the Examiner

UNITED STATES PATENTS 3,193,802   7/1965   Deerfield _____ 340—172.5

ROBERT C. BAILEY, *Primary Examiner.*

M. LISS, *Assistant Examiner.*